United States Patent
Webber

(10) Patent No.: US 9,315,071 B2
(45) Date of Patent: Apr. 19, 2016

(54) BICYCLE WHEEL SYSTEM

(71) Applicant: Slipstream Bicycles, LLC, Chattanooga, TN (US)

(72) Inventor: Walter H. Webber, Chattanooga, TN (US)

(73) Assignee: Slipstream Bicycles, LLC, Chattanooga, TN (US)

( * ) Notice: Subject to any disclaimer, the term of this patent is extended or adjusted under 35 U.S.C. 154(b) by 148 days.

(21) Appl. No.: 13/941,025

(22) Filed: Jul. 12, 2013

(65) Prior Publication Data

US 2015/0015125 A1   Jan. 15, 2015

(51) Int. Cl.

| | |
|---|---|
| *B60B 27/00* | (2006.01) |
| *B60B 27/02* | (2006.01) |
| *B60B 1/04* | (2006.01) |
| *H02K 7/18* | (2006.01) |
| *B62J 6/12* | (2006.01) |
| *H02K 5/173* | (2006.01) |
| *H02K 7/07* | (2006.01) |
| *H02K 7/08* | (2006.01) |
| *H02K 11/00* | (2006.01) |
| *H02K 11/04* | (2006.01) |
| *H02K 16/00* | (2006.01) |
| *B60B 27/04* | (2006.01) |
| *B60B 27/06* | (2006.01) |

(52) U.S. Cl.
CPC ............... *B60B 27/023* (2013.01); *B60B 1/041* (2013.01); *B60B 27/04* (2013.01); *B62J 6/12* (2013.01); *H02K 5/1732* (2013.01); *H02K 7/07* (2013.01); *H02K 7/083* (2013.01); *H02K 7/1846* (2013.01); *H02K 11/001* (2013.01); *H02K 11/0021* (2013.01); *H02K 11/0042* (2013.01); *H02K 11/0094* (2013.01); *H02K 11/046* (2013.01); *H02K 16/00* (2013.01); *B60B 27/047* (2013.01); *B60B 27/065* (2013.01)

(58) Field of Classification Search
CPC ........... B62J 6/12; B60B 27/023; B60B 1/003
See application file for complete search history.

(56) References Cited

U.S. PATENT DOCUMENTS

| | | |
|---|---|---|
| 5,104,199 A | 4/1992 | Schlanger |
| 5,115,159 A | 5/1992 | Takamiya et al. |

(Continued)

FOREIGN PATENT DOCUMENTS

| | | |
|---|---|---|
| DE | 10 2004 063505 | 7/2006 |
| DE | 10 2008 048453 | 10/2009 |

(Continued)

*Primary Examiner* — Kevin Hurley
(74) *Attorney, Agent, or Firm* — Husch Blackwell LLP

(57) ABSTRACT

A bicycle wheel system includes a hub assembly having a body, a collet within the body; a first hub mating member; a second hub mating member; wherein each of the hub mating members have either a surface pattern or an engagement member; and torque transfer flanges at each end of the body. A first axle assembly includes a first axle; either a surface pattern or an engagement member; and a torque transfer flange. A second axle assembly includes a second axle; either a surface pattern or an engagement member; a gear collet; and a ratchet gear drive, with the ratchet gear drive having a torque transfer flange. The surface patterns and engagement members are arranged for selective locking engagement with one another to join the hub assembly, first axle assembly, and second axle assembly together. A locking release mechanism controls the engagement of the surface patterns and engagement members.

19 Claims, 60 Drawing Sheets

(56) References Cited

U.S. PATENT DOCUMENTS

| | | | |
|---|---|---|---|
| 5,246,275 A | 9/1993 | Arredondo, Jr. |
| 5,268,602 A | 12/1993 | Schwaller |
| 5,452,945 A | 9/1995 | Schlanger |
| 5,549,315 A | 8/1996 | Ashman |
| 5,626,401 A | 5/1997 | Terry, Sr. et al. |
| 5,828,145 A | 10/1998 | Nakamura |
| 5,931,544 A | 8/1999 | Dietrich |
| 5,932,943 A | 8/1999 | Werner et al. |
| 6,010,197 A | 1/2000 | Crosnier et al. |
| 6,036,279 A | 3/2000 | Campagnolo |
| 6,068,347 A | 5/2000 | Okajima et al. |
| 6,068,348 A | 5/2000 | Okajima et al. |
| 6,189,978 B1 | 2/2001 | Lacombe et al. |
| 6,386,643 B1 | 5/2002 | Marzocchi et al. |
| 6,409,197 B1 | 6/2002 | Endo et al. |
| 6,428,113 B2 | 8/2002 | Dietrich |
| 6,605,884 B2 | 8/2003 | Nishimoto |
| 6,899,401 B2 | 5/2005 | Schlanger |
| 6,924,569 B2 | 8/2005 | Endo et al. |
| 7,047,817 B2 | 5/2006 | Lanham |
| 7,192,098 B2 | 3/2007 | Okajima |
| 7,306,292 B2 | 12/2007 | Muraoka et al. |
| 7,448,696 B2 | 11/2008 | Meggiolan et al. |
| 7,481,497 B2 | 1/2009 | Mercat et al. |
| 7,628,518 B2 | 12/2009 | Fujii et al. |
| 7,658,452 B2 | 2/2010 | Spahr et al. |
| 7,806,006 B2 | 10/2010 | Phillips et al. |
| 7,909,412 B2 | 3/2011 | Ashman |
| 7,926,886 B1 | 4/2011 | Ashman |
| 7,967,392 B2 | 6/2011 | Meggiolan |
| 7,975,561 B1 | 7/2011 | Amrosina et al. |
| 8,006,574 B2 | 8/2011 | Meyer |
| 8,065,926 B2 | 11/2011 | Meyer |
| 8,093,771 B2 | 1/2012 | Liao et al. |
| 8,141,438 B2 | 3/2012 | Roessingh et al. |
| 8,183,726 B2 * | 5/2012 | Rittenhouse | 310/68 R |
| 2002/0067068 A1 | 6/2002 | Kanehisa et al. |
| 2002/0067069 A1 | 6/2002 | Kanehisa et al. |
| 2002/0072446 A1 | 6/2002 | Kanehisa et al. |
| 2003/0057763 A1 | 3/2003 | Dietrich |
| 2003/0090142 A1 | 5/2003 | Okajima et al. |
| 2004/0079612 A1 | 4/2004 | Endo et al. |
| 2006/0006730 A1 | 1/2006 | Meggiolan |
| 2007/0102995 A1 | 5/2007 | Okajima |
| 2007/0145813 A1 | 6/2007 | D'Aluisio |
| 2007/0205655 A1 | 9/2007 | Meggiolan |
| 2008/0116738 A1 | 5/2008 | Urbani et al. |
| 2008/0129157 A1 | 6/2008 | Nakano |
| 2008/0284127 A1 | 11/2008 | Watarai |
| 2009/0243255 A1 | 10/2009 | Ashman |
| 2011/0133543 A1 | 6/2011 | Ashman |
| 2012/0238406 A1 | 9/2012 | Beard et al. |
| 2012/0306327 A1 * | 12/2012 | Lee et al. | 310/67 A |
| 2013/0044502 A1 | 2/2013 | Guzik et al. |

FOREIGN PATENT DOCUMENTS

| | | |
|---|---|---|
| EP | 0 094 649 | 11/1983 |
| EP | 0 634 978 | 1/1995 |
| EP | 1 134 096 | 9/2001 |
| EP | 1 260 382 | 11/2002 |
| EP | 1 475 245 | 11/2004 |
| EP | 1 412 202 | 3/2005 |
| EP | 2 248 715 | 11/2010 |
| WO | WO 95/27628 | 10/1995 |
| WO | WO 99/45350 | 9/1999 |
| WO | WO 03/037650 | 5/2003 |
| WO | WO 2004/041552 | 5/2004 |
| WO | WO 2008/058164 | 5/2008 |
| WO | WO 2010/008440 | 1/2010 |
| WO | WO 2011/066075 | 6/2011 |
| WO | 2011/113161 A1 | 9/2011 |

* cited by examiner

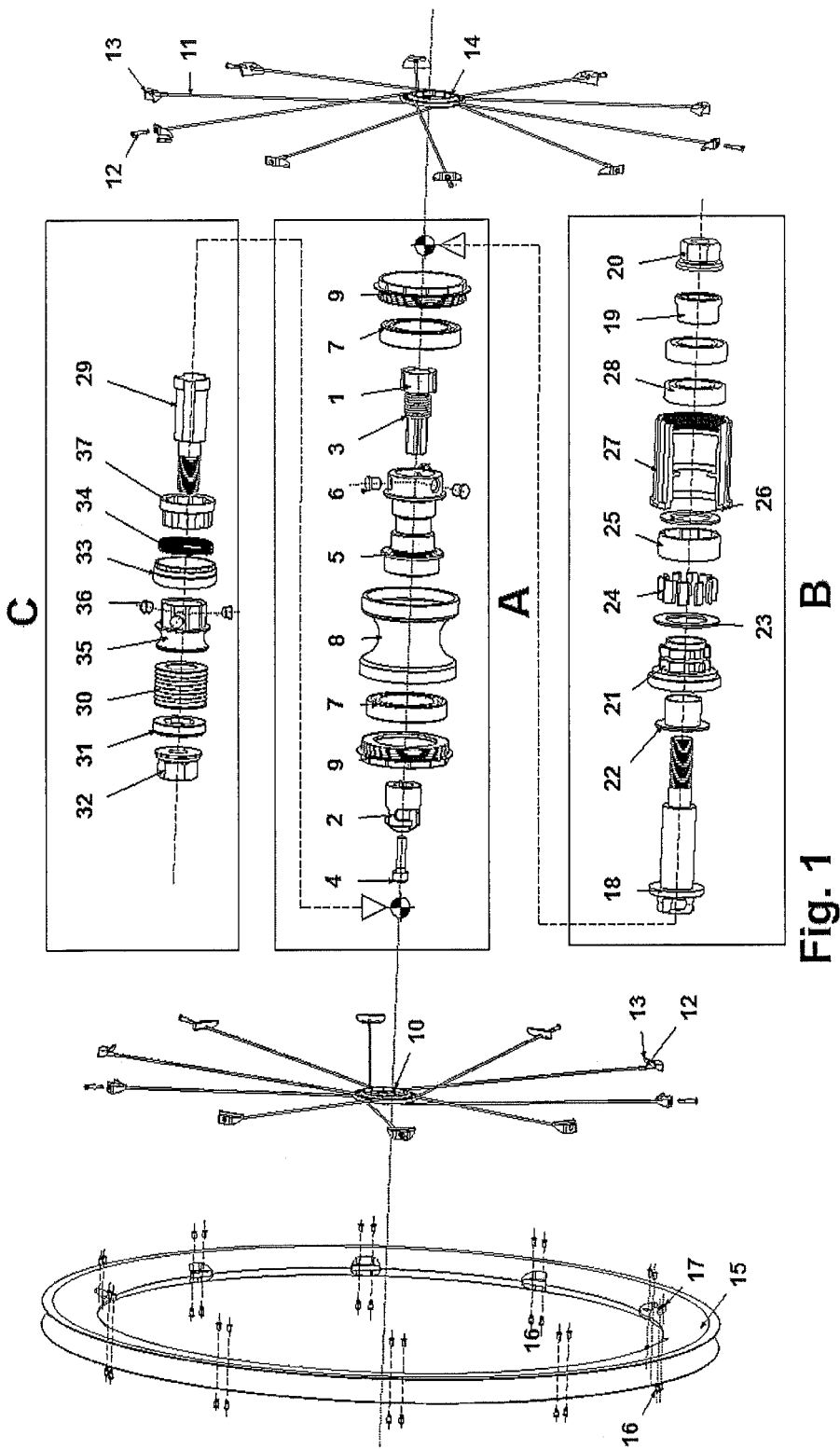

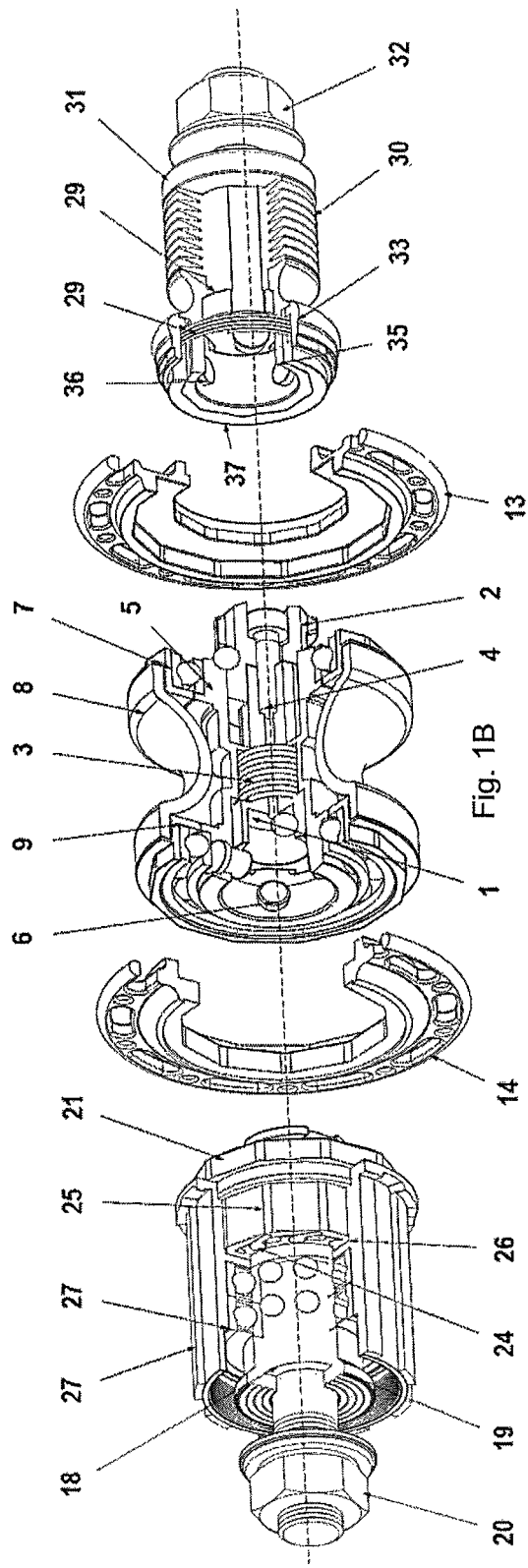
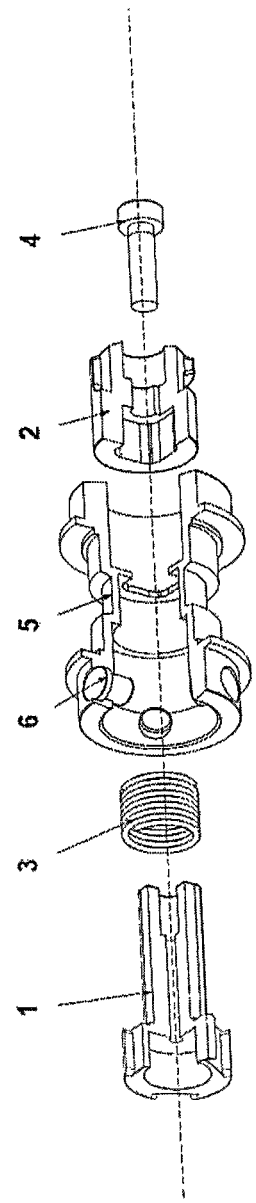
Fig. 1B
Fig. 1C

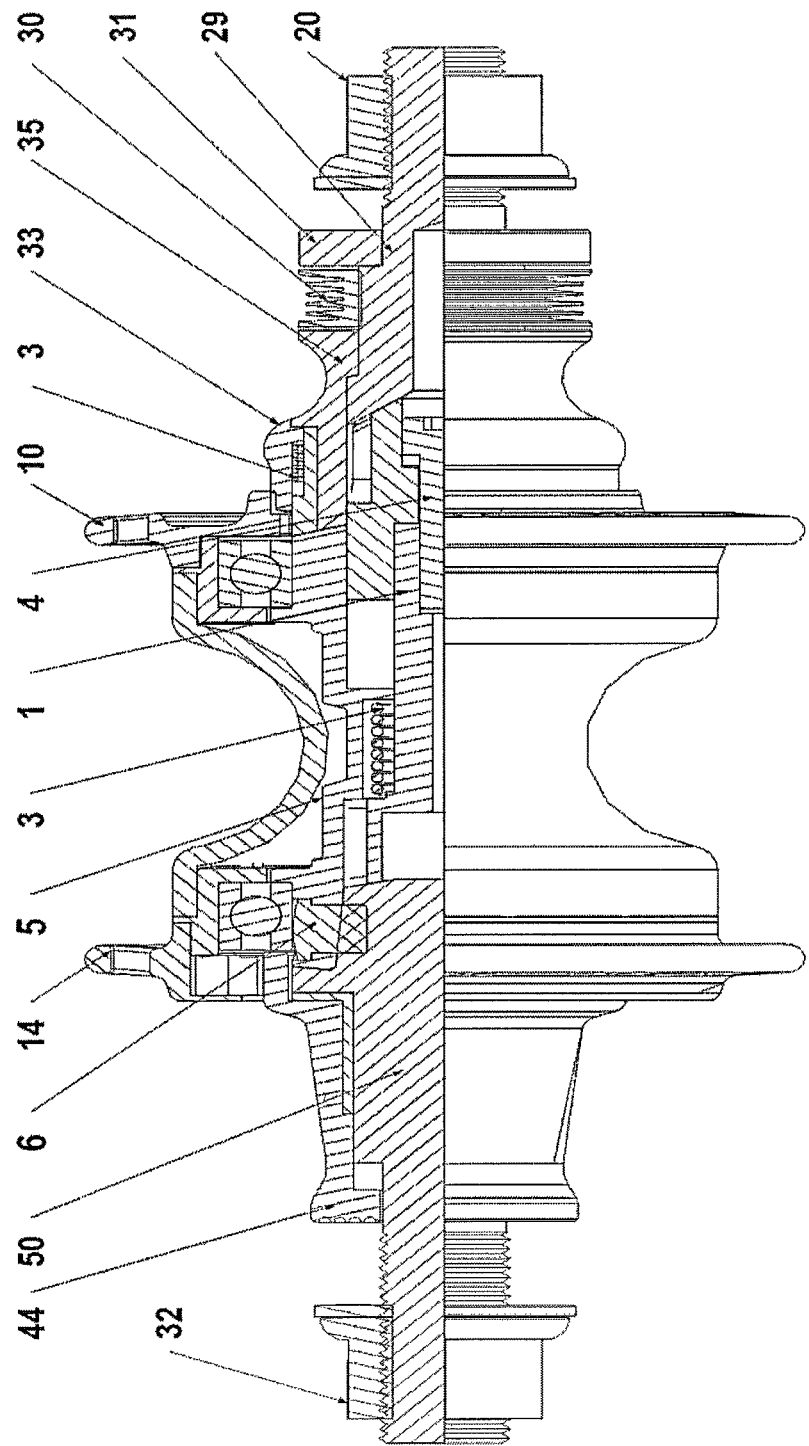

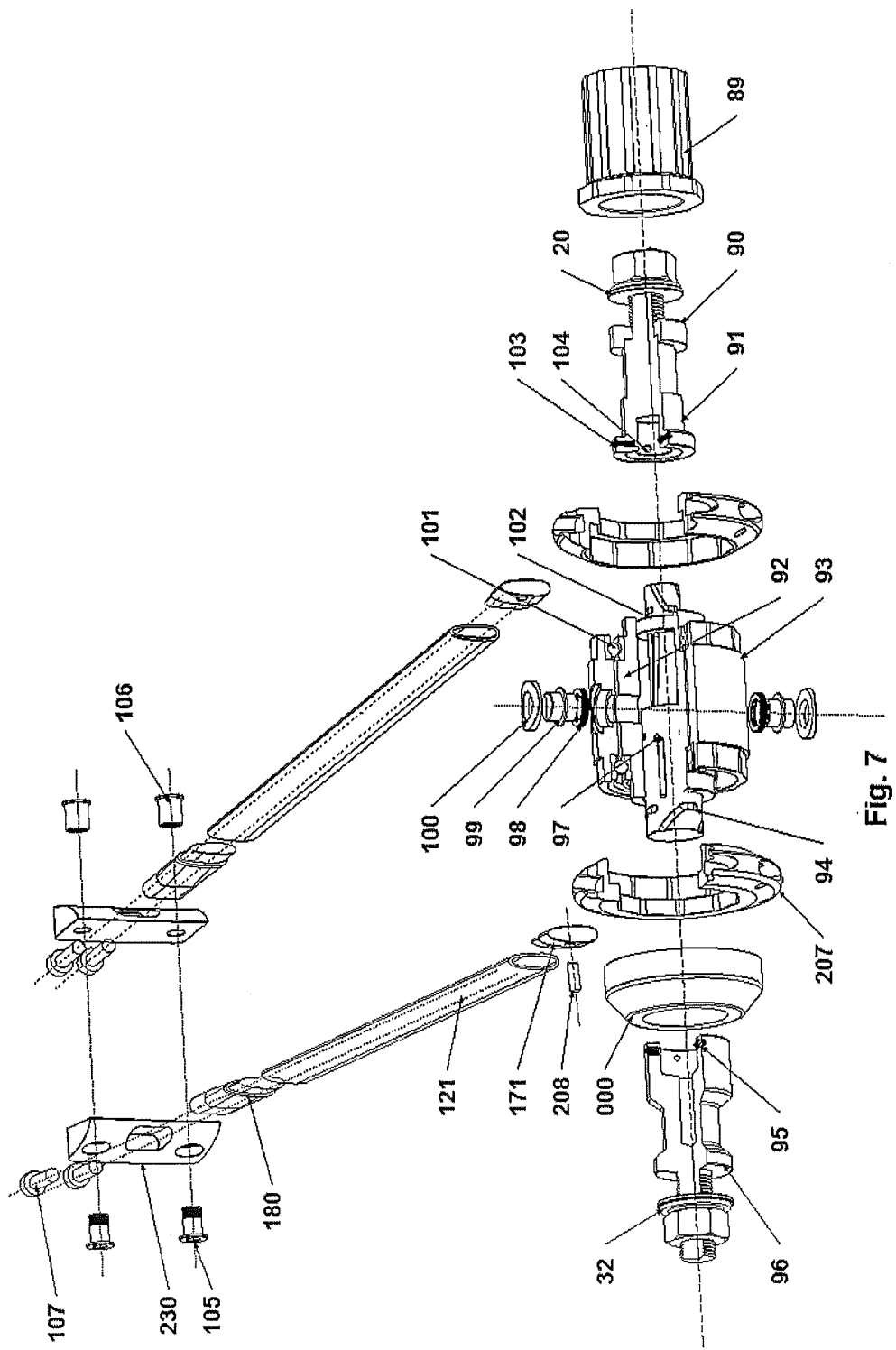

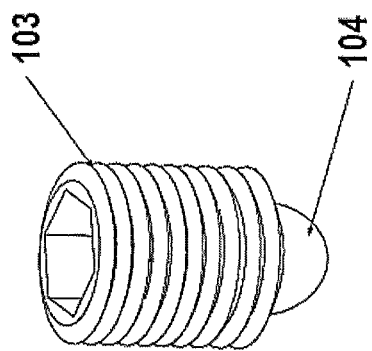
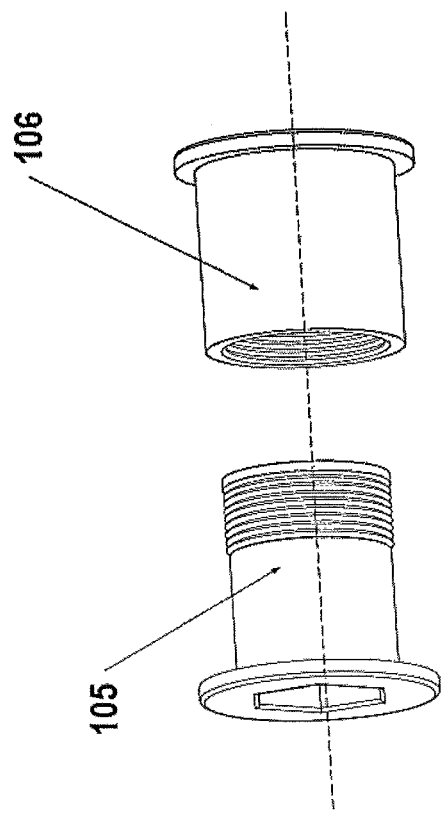
Fig. 7B
Fig. 7A

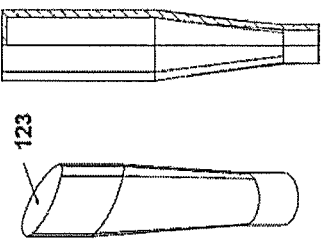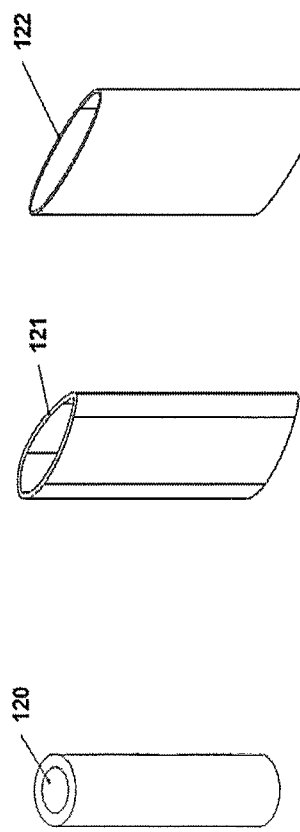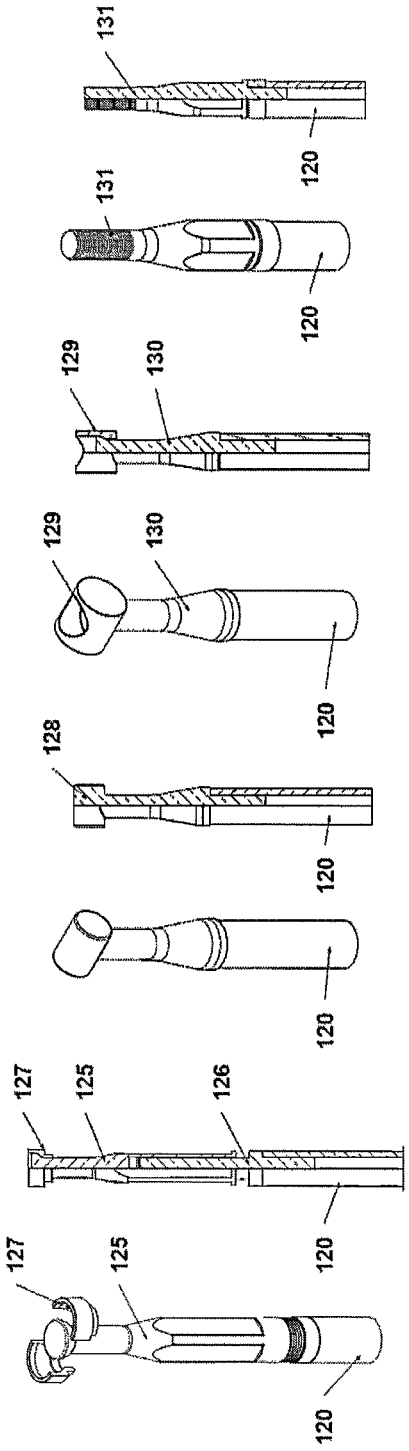

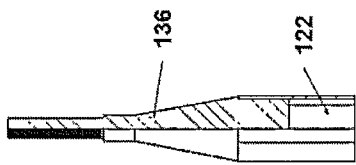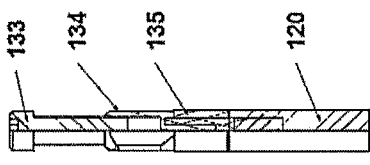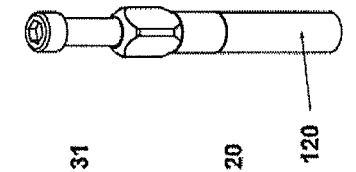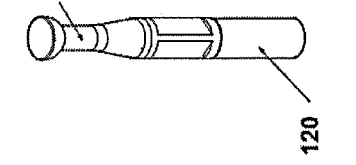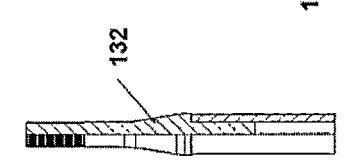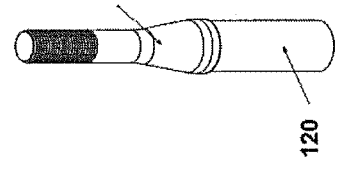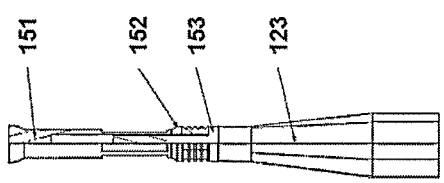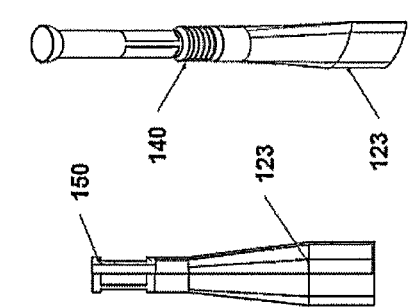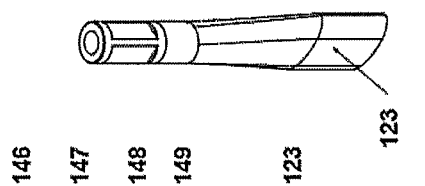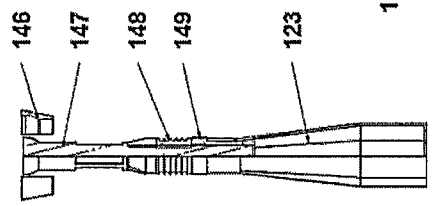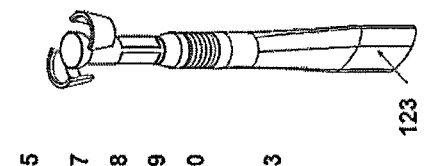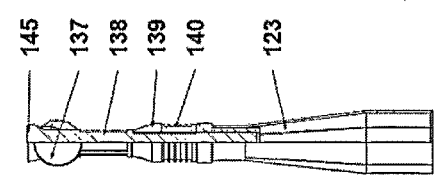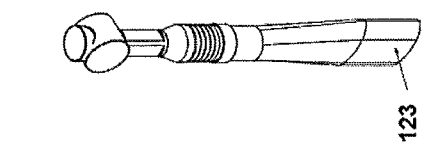

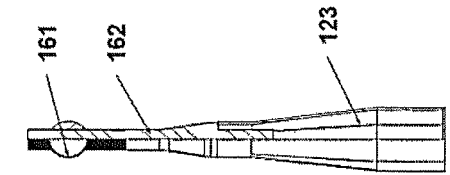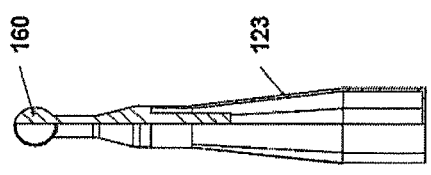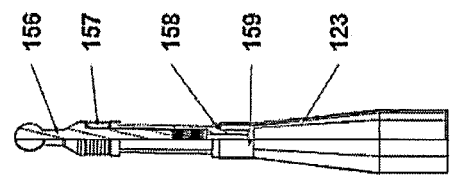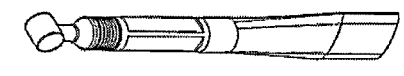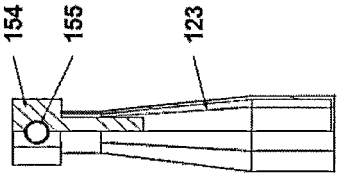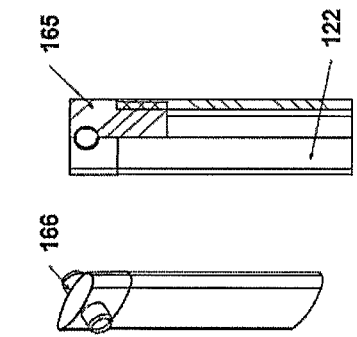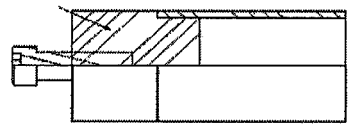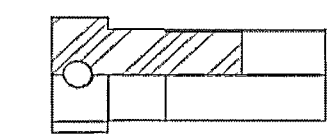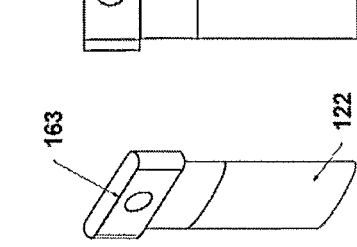

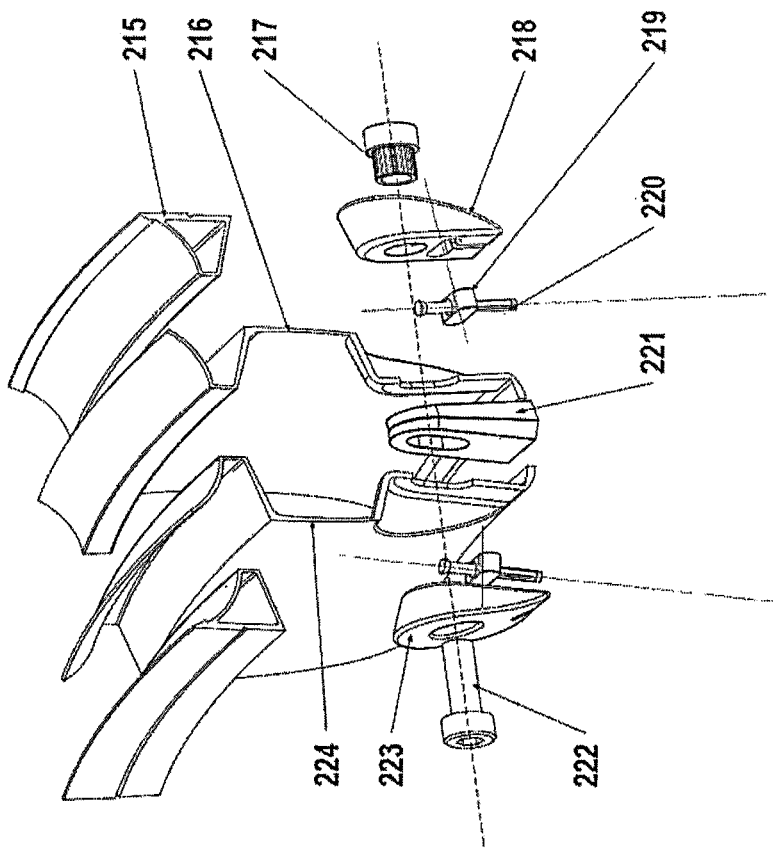
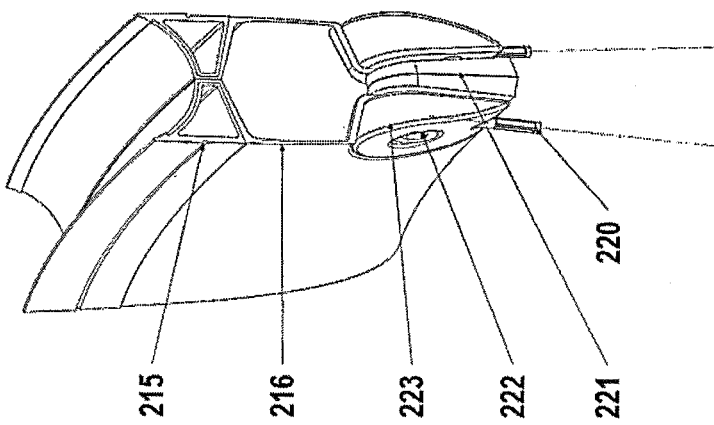

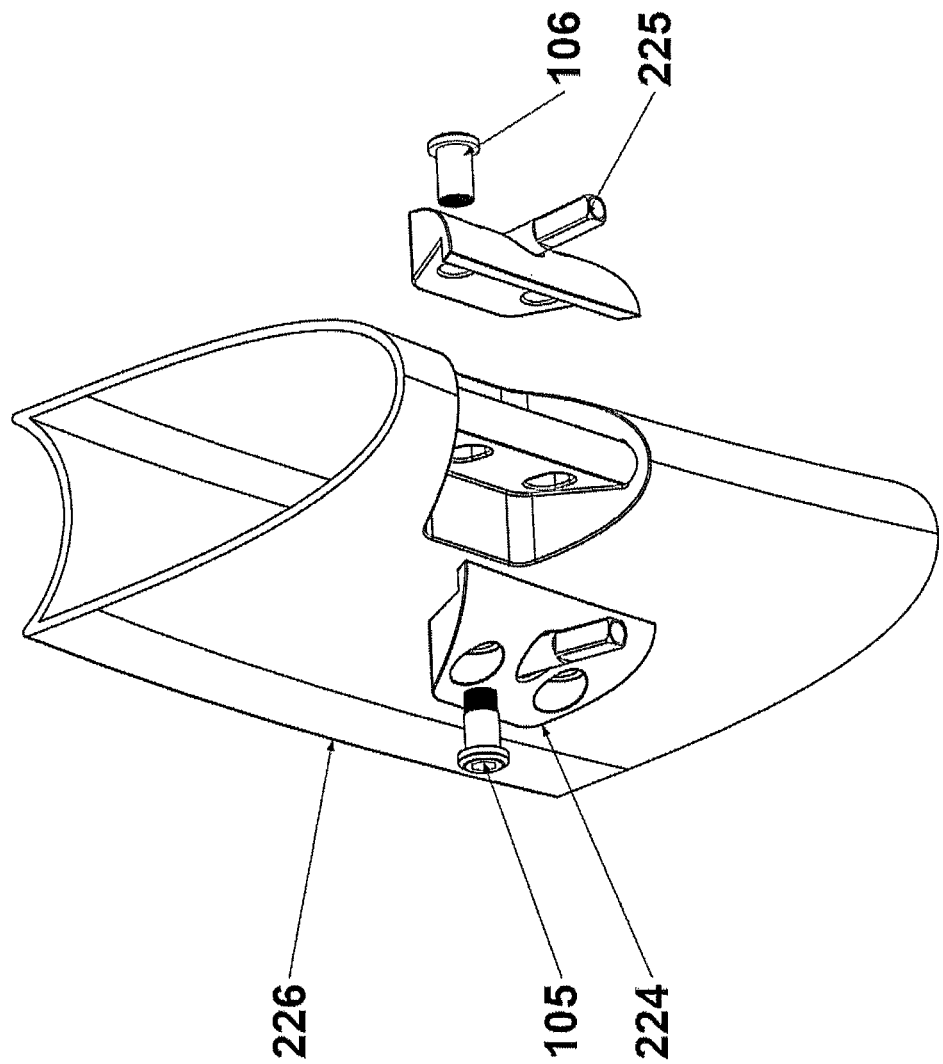

BICYCLE WHEEL SYSTEM

TECHNICAL FIELD OF THE INVENTION

The present invention relates generally to bicycles and more specifically to an improved wheel system for bicycles.

BACKGROUND OF THE INVENTION

Bicycle wheel functionality can be applied in numerous ways for a range of different applications directed towards consumer use or high-performance sporting configurations that require a range of physical and mechanical attributes. For this reason many different wheel types make up a spectrum of wheel types dedicated to different applications.

Conventional bicycles require specific wheels dedicated to front and rear wheel operations, each having different bearing, spacing, and mounting arrangements to accommodate the drive train on a rear wheel and the front fork. Conventional bicycle hubs consist of a fixed body rotating around an axle which is attached to a bicycle frame using a quick release or nut fastening system. Conventional wheel systems use a single purpose fixed hub and permanently connected rim to hub wire spoke connection setups. Bicycle spoke technology also has a wide range of configurations and applications such as radial or crossover patterns dedicated to different performance and stability characteristics. Conventional rim systems depend on perpendicular tension for stability.

Progress in communication is becoming a large part of any sport. Currently all communication systems require power and modern bicycle use battery power to manage most communication functions.

BRIEF SUMMARY OF THE DISCLOSURE

An object is to provide an improved bicycle wheel system for enhancement of the construction, fabrication, function, manufacture, performance and metrics of a bicycle wheel applied to any bicycle.

Another object is to provide a multifunctional bicycle wheel that may be fitted to a bicycle using wheel rotation as a means of fitting or removing the wheel independent of the drive and can be used for front and rear operation.

Another object is to provide a method of using variable and interchangeable multi-spoke configuration molded, fabricated, machined or manufactured as single spoke component as a means of connecting a bicycle hub to bicycle rim.

Another object is to create a rapid modular interchangeable method of connecting different bicycle rims on a bicycle wheel.

Another object is to provide a sensory and communication system for electric power generation and CPU data computation, sensory and metrics application.

Another object is to provide a wheel system that enables the bicycle wheel to be removable from the bicycle frame, wheel axle and drive system by means of a locking system powered by wheel rotation and latched through a mechanical release mechanism located on the bicycle wheel hub.

Another object is to provide a wheel system with a universal spoke flange system that accommodates a range of structural connection methods for a range of bicycle wheel solutions.

Another object is to provide a wheel system that provides local communication, power hub processing for the purposes of data transfer and frequency based connections with external and internal electronic sensors and other electronic devices.

Another object is to provide a wheel system that enables the drive system to be permanently fixed on the bike frame enabling the drive train to remain uninterrupted during the wheel change and which accommodates a variety sprocket configurations for free wheel or fixed wheel applications.

Another object is to provide a wheel system that incorporates a method of ensuring a structural connection between composite material and a single spoke mount flange.

Another object is to provide a wheel system which incorporates a method of creating a physical and structural connection between the spoke and a rim mount flange.

Another object is to provide a wheel system that incorporates a method of adjusting tension between a spoke and a rim flange.

Another object is to provide a wheel system that incorporates a modular mechanical fastening element between a single spoke and rim connection.

Another object is to provide a wheel system that incorporates modular single spoke attachment methods for interchangeability of spoke and rim systems.

In accordance with one or more objects of the invention, there is provided a bicycle wheel system that includes a hub assembly having a body, a collet within the body; a first hub mating member; a second hub mating member; wherein each of the hub mating members have either a surface pattern or an engagement member; and torque transfer flanges at each end of the body. A first axle assembly includes a first axle; either a surface pattern or an engagement member; and a torque transfer flange. A second axle assembly includes a second axle; either a surface pattern or an engagement member; a gear collet; and a ratchet gear drive, with the ratchet gear drive having a torque transfer flange. The surface patterns and engagement members are arranged for selective locking engagement with one another to join the hub assembly, first axle assembly, and second axle assembly together. A locking release mechanism controls the engagement of the surface patterns and engagement members.

There is also provided an electrical power generating system for a bicycle wheel having a coaxial hub and collet arrangement, wherein the hub rotates with the bicycle wheel and the collet does not rotate with the wheel, that includes an axle generator with a microprocessor; and at least one excitation coil. A rotating sensor is connected and rotates with the body during movement of the bicycle wheel is provided with a magnet array. Rotation of the rotating sensor around the axle generator results in a magnetic field being created by the magnet array and induces an electric current in the excitation coils for powering the microprocessor.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is an exploded perspective view of a three part axle system according to a first embodiment of the present invention.

FIG. 1B is an exploded partial cutaway view of the axle system of FIGS. 1 and 2.

FIG. 1C is an exploded partial cutaway view of invention hub collet suitable for use in the axle system of FIGS. 1-1B.

FIG. 4 is invention partial section assembly view of the axle assembly of FIGS. 1-1C.

FIG. 7 is an exploded partial cutaway view of a drive axle and single spoke flange assembly according to another embodiment.

FIG. 7A is an exploded view of a rim mount screw for use with a single spoke flange assembly as in FIG. 7.

FIG. 7B is a perspective view of a ball plunger for use in a drive axle assembly as in FIG. 7.

FIG. 9 is a perspective view of a spoke for use in a single spoke assembly according to an embodiment.

FIG. 10 is a perspective view of a spoke for use in a single spoke assembly according to another embodiment.

FIG. 11 perspective view of a spoke for use in a single spoke assembly according to another embodiment.

FIG. 12 is a perspective view of a spoke for use in a single spoke assembly according to another embodiment.

FIG. 12A is a partial cutaway front view of the spoke of FIG. 12.

FIG. 13 is a perspective view of a spoke for use in a single spoke assembly according to another embodiment.

FIG. 13A is a partial cutaway front view of the spoke of FIG. 13.

FIG. 14 is a perspective view of a spoke for use in a single spoke assembly according to another embodiment.

FIG. 14A is a partial cutaway front view of the spoke of FIG. 14.

FIG. 15 is a perspective view of a spoke for use in a single spoke assembly according to another embodiment.

FIG. 15A is a partial cutaway front view of the spoke of FIG. 15.

FIG. 16 is a perspective view of a spoke for use in a single spoke assembly according to another embodiment.

FIG. 16A is a partial cutaway front view of the spoke of FIG. 16.

FIG. 17 is a perspective view of a spoke for use in a single spoke assembly according to another embodiment.

FIG. 17A is a partial cutaway front view of the spoke of FIG. 17.

FIG. 18 is a perspective view of a spoke for use in a single spoke assembly according to another embodiment.

FIG. 18A is a partial cutaway front view of the spoke of FIG. 18.

FIG. 19 is a perspective view of a spoke for use in a single spoke assembly according to another embodiment.

FIG. 19A is a partial cutaway front view of the spoke of FIG. 19.

FIG. 20 is a perspective view of a spoke for use in a single spoke assembly according to another embodiment.

FIG. 20A is a partial cutaway front view of the spoke of FIG. 20.

FIG. 21 is a perspective view of a spoke for use in a single spoke assembly according to another embodiment.

FIG. 21A is a partial cutaway front view of the spoke of FIG. 21.

FIG. 22 is a perspective view of a spoke for use in a single spoke assembly according to another embodiment.

FIG. 22A is a partial cutaway front view of the spoke of FIG. 22.

FIG. 23 is a perspective view of a spoke for use in a single spoke assembly according to another embodiment.

FIG. 23A is a partial cutaway front view of the spoke of FIG. 23.

FIG. 24 is a perspective view of a spoke for use in a single spoke assembly according to another embodiment.

FIG. 24A is a partial cutaway front view of the spoke of FIG. 24.

FIG. 25 is a perspective view of a spoke for use in a single spoke assembly according to another embodiment.

FIG. 25A is a partial cutaway front view of the spoke of FIG. 25.

FIG. 26 is a perspective view of a spoke for use in a single spoke assembly according to another embodiment.

FIG. 26A is a partial cutaway front view of the spoke of FIG. 26.

FIG. 27 is a perspective view of a spoke for use in a single spoke assembly according to another embodiment.

FIG. 27A is a partial cutaway front view of the spoke of FIG. 27.

FIG. 28 is a perspective view of a spoke for use in a single spoke assembly according to another embodiment.

FIG. 28A is a partial cutaway front view of the spoke of FIG. 28.

FIG. 29 is a perspective view of a spoke for use in a single spoke assembly according to another embodiment.

FIG. 29A is a partial cutaway front view of the spoke of FIG. 29.

FIG. 30 is a perspective view of a spoke for use in a single spoke assembly according to another embodiment.

FIG. 30A is a partial cutaway front view of the spoke of FIG. 30.

FIG. 31 is a perspective view of a spoke for use in a single spoke assembly according to another embodiment.

FIG. 31A is a partial cutaway front view of the spoke of FIG. 31.

FIG. 48 is a partial cutaway perspective view of a rim connecting arrangement according to an embodiment.

FIG. 48A is an exploded cutaway view of the rim connecting arrangement of FIG. 48.

FIG. 61 is a perspective exploded view of a rim connecting arrangement according to another embodiment.

FIG. 76 is a partial cutaway view of invention strain gauge for a wheel sensor as incorporated into a hub flange according to an embodiment.

FIG. 76A is an exploded perspective view of the strain gauge/flange assembly of FIG. 76.

FIG. 76B is a partial cutaway view of the pin/hollow body/locking rivet assembly of FIGS. 76 and 76A.

FIG. 77 is a partial cutaway view of an axle assembly incorporating a wheel generator according to another embodiment.

FIG. 77A is a partial cut away view of the wheel generator of FIG. 77.

FIG. 78 is a partial cutaway view of an axle assembly incorporating a wheel generator according to another embodiment.

FIG. 78A is an exploded view of the wheel generator/hub flange arrangement of the axle assembly of FIG. 78.

FIG. 79 is a system schematic for a wheel system incorporating a microprocessor and/or generator system according to an embodiment.

FIG. 80 is a system schematic for a wheel system incorporating a microprocessor and/or generator system according to another embodiment.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1A:
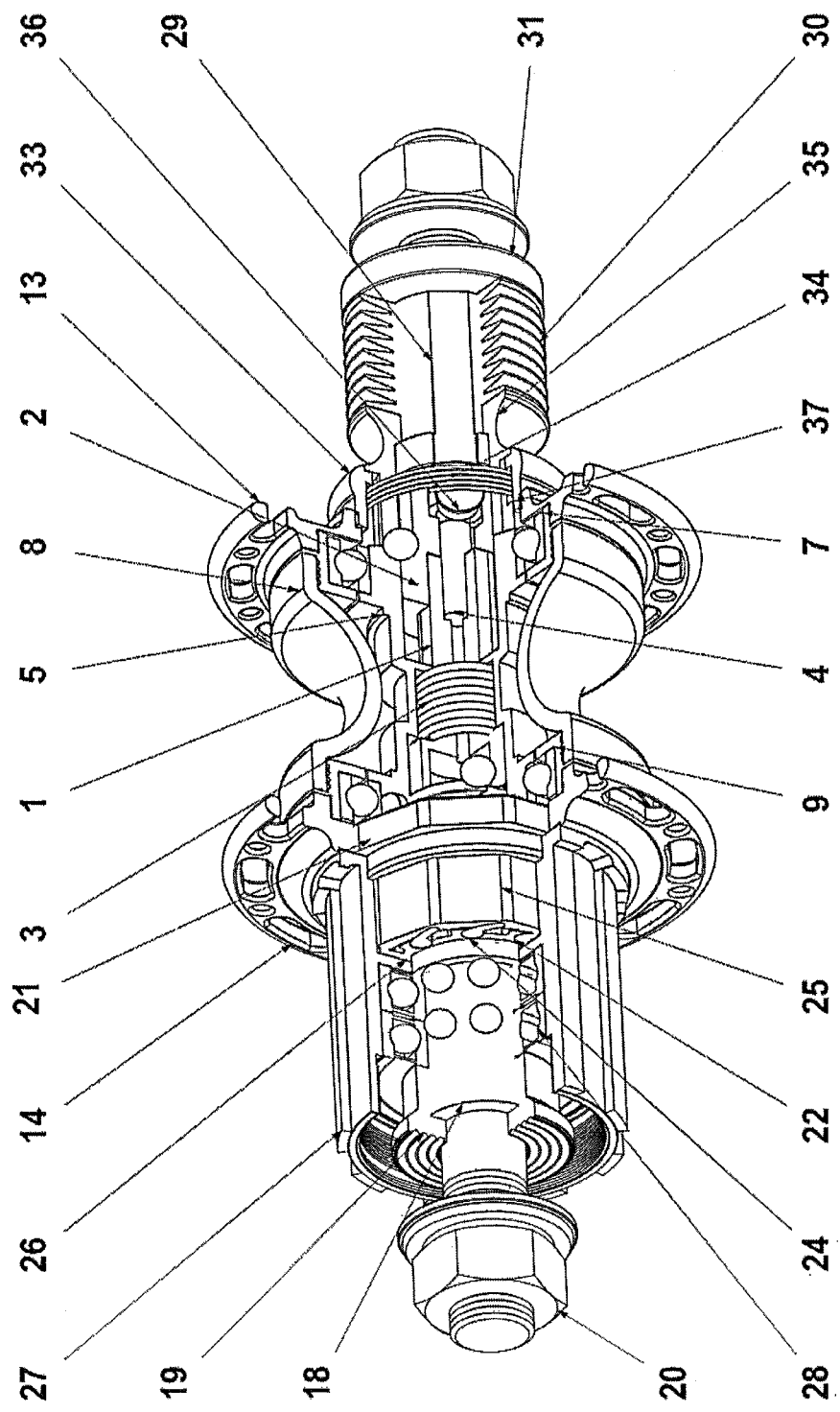
FIG. 1A is a partial cutaway view of the axle system of FIG. 1.

Embodiments of a bicycle wheel system are illustrated throughout the figures. FIGS. 1-1C illustrate a three part axle system consisting of a hub assembly A, a frame axle assembly B, a drive axle assembly C. The system also includes a single spoke flange assembly D and a rim connection assembly E.

The hub assembly includes a hub body 8 that provides a mounting journal to accommodate bearing collets 9. The bearing collets 9 are provided with an inner flange that can be press fit or adhesively bonded to the hub body 8 and with an outer flange that is a dodecagon mounting flange and compatible with the spoke flanges 10 and 14. The bearing collets 9 are drive flanges for spoke flanges 10 and 14. Bearings 7 are mounted in the bearing collets 9 to provide independent rotation between the hub body 8 and a hub collet 5 mounted within the hub body 8. The hub collet 5 is an independent parallel rotating inner axle and linear actuating bearing surface and accommodates a hub lock assembly.

FIG. 1C illustrates the hub collet 5. The hub collet 5 includes a hub lock anchor 1 which slides in the hub collet 5 and has a square shank for engagement with a corresponding square shank at the other end of the hub collet 5. A hub lock 2 is provided in the form of a round bayonet receptacle that is fastened to the hub lock anchor 1 with a screw 4. An actuator spring 3 is inserted around the hub lock anchor 1 and retained by a flange and maintains a normally open condition when the opposite end is anchored on the hub collet 5. Once assembled, the hub lock anchor 1 and hub lock 2 mounted in the hub collet become a spring-loaded actuator. When assembled inside the hub collet, a horizontal motion extends the hub lock 2 to a fully extended position.

The frame axle assembly B is a frame mounted axle system that includes a bayonet axle lock flange or receptacle 35 which interlocks with the hub lock 2. The assembly is provided with a frame axle 29 each has a key shoulder and retaining flange for the purposes of retaining the bayonet axle lock flange 35. The bayonet axle lock flange 35 has an internal matching socket and mating surface with the hub lock 2. Three hub lock pins 36 are press fit into a counterbored hole three pin 120° radial pattern perpendicular to the axis of the frame axle assembly B. These hub lock pins 36 protrude through the internal surface of the bayonet axle lock flange 35 journal and engage corresponding slots in the hub lock 2. When rotated relative to one another, the hub lock 2 and bayonet axle lock flange 35 interlock with one another. A wheel lock 33 slides on a pin retainer bushing 37 which is a linear bearing. A tension spring 34 is positioned on a bearing flange of wheel lock 33 and a flange face of the pin retainer bushing 37. The pin retainer bushing 37 is press fit onto the bayonet axle lock flange 35 and encapsulates hub lock pins 36. Bayonet axle lock flange 35 has a concave gripper surface which is used to manually retract the locking assembly against a covered tension spring 30. The wheel lock 33 is held normally open or fully extended by the tension spring 34 and when pushed forward the decagon flange engages and locks the drive flange 14 so that manual wheel rotation locks the bayonet axle lock flange 35 and hub lock 2 together.

The drive axle assembly C includes a drive axle 18 mounted independently on the frame of the bicycle. Drive axle 18 is the mounting journal for a ratchet drive mount 21. A bearing 22 is positioned between the shaft of the drive axle and the ratchet drive mount 21 to facilitate free rotation of these parts. Horizontal pawl fingers 24 are mounted in ratchet drive mount 21 within corresponding sockets. Ten pawl fingers 24 pivot in their mounting sockets at the base of ratchet drive mount 21. The pawl fingers 24 engage with a magnetized ratchet gear 25 and transfer torque and mechanical drive between the magnetized ratchet gear 25 and the ratchet drive mount 21. The magnetized ratchet gear 25 is mounted inside the gear collet 27. The magnetized ratchet gear 25 provides a magnetic attractive force drawing the pawl fingers 24 into a reciprocal ratchet gear profile which drives in one direction and freewheels in the opposing direction. The magnetized ratchet gear 25 decagon reciprocal outer flange fits into gear collet 27 transfers torque through the gear collet 27. Ball bearings 28 are mounted between a shoulder of the drive axle 18 and an internal journal of the gear collet 27 to enhance rotational movement of the gear collet 27. Drive axle 18 has a shoulder flange with an interlocking bayonet flange on its end. Its mirrored counterpart provides a retaining force which allows all the components in the assembly to move freely and attached to the bicycle frame with a locking nut 20. Drive axle 18 also has a flange an interlocking female bayonet mounting receptacle on its end. Drive axle 18 is a male counterpart to the hub collet 5, and the two pieces interlock when the hub and axle locks are connected. The reciprocal bayonet connection is made when the interlocking bayonet flange of the drive axle 18 engages the hub collet 5 and the locking pins 6 perform a cam lock mechanical connection.

Figure 2:
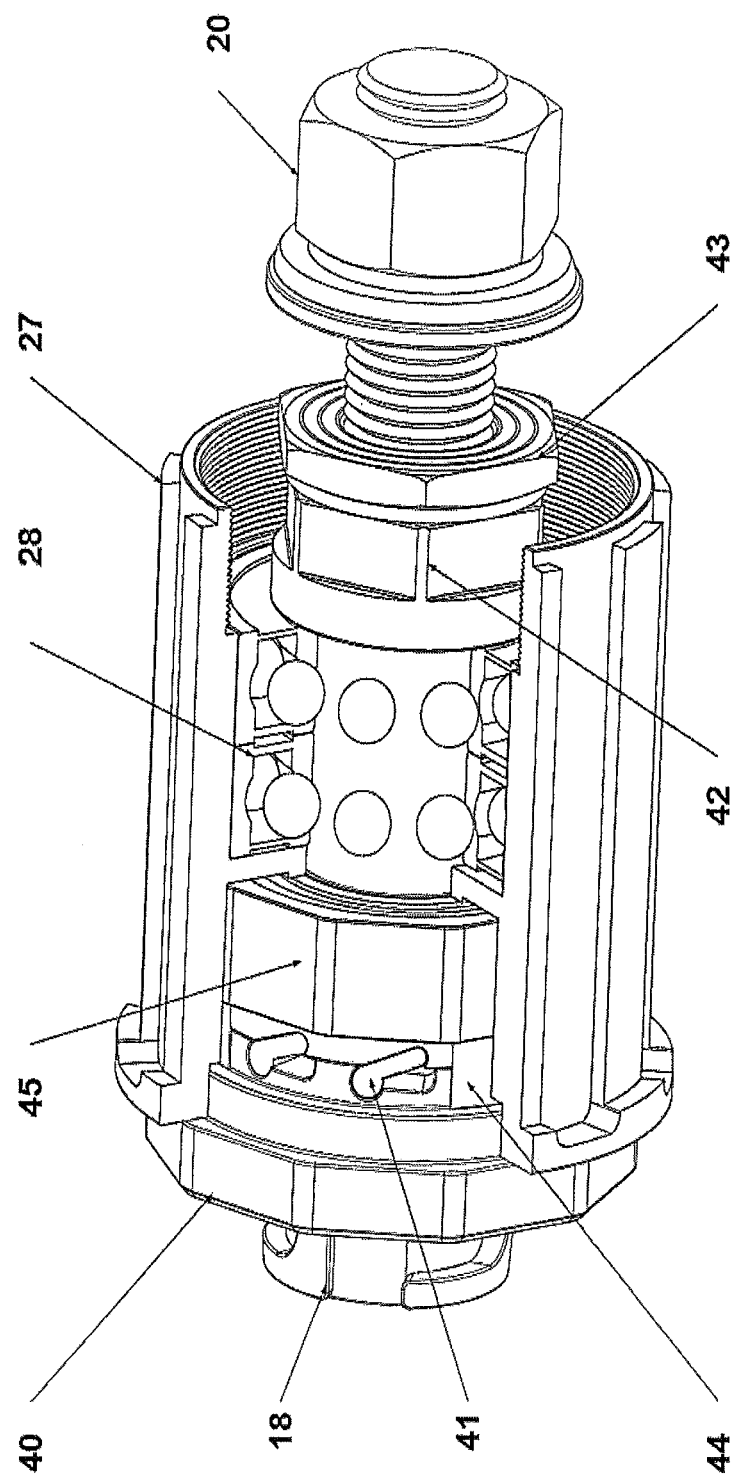
FIG. 2 is partial cutaway assembly view of a drive axle assembly according to another embodiment.
Figure 2A:
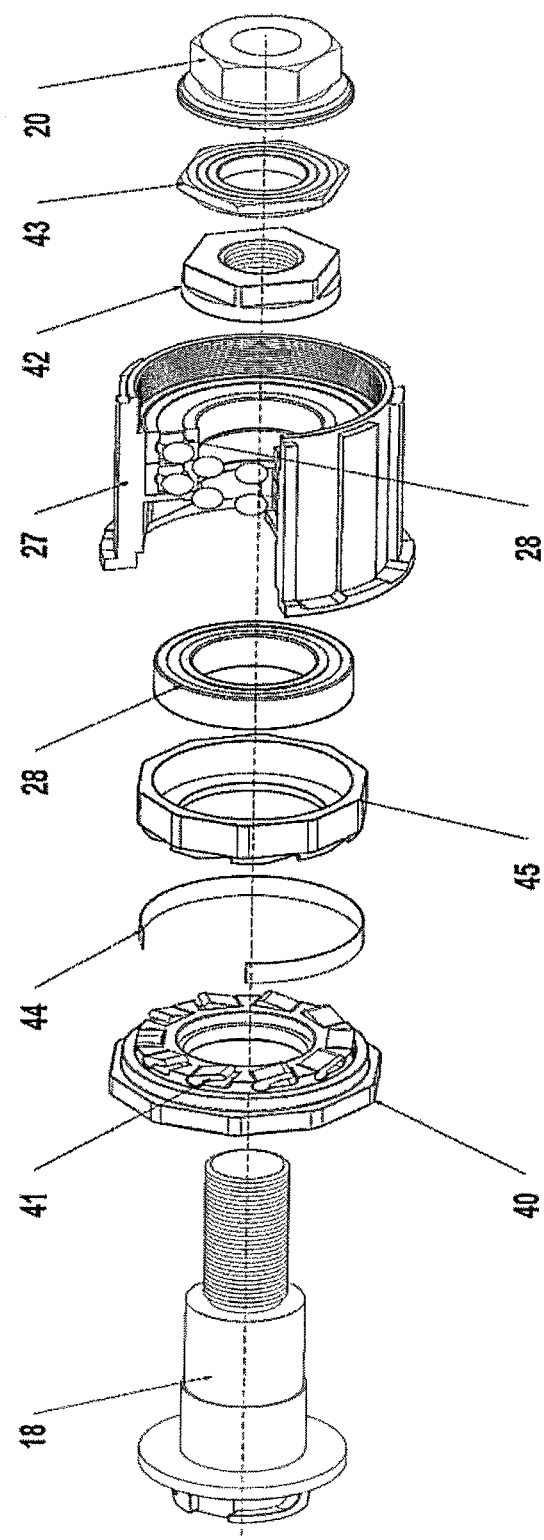
FIG. 2A is an exploded partial cutaway view of a gear collet for use in the drive axle assembly of FIG. 2.

An alternate drive axle assembly is illustrated in FIGS. 2 and 2A. This embodiment also utilizes the drive axle 18. In this case, though, the drive axle engages ratchet freewheel drive 40. Pawl fingers 41 are pivotally mounted in the ratchet freewheel drive 40. A reciprocal decagon flanged perpendicular ratchet gear collet 45 rotates around the drive axle 18 through a bearing 28 mounted inside the ratchet gear collet 45. The ratchet gear collet 45 is magnetized to attract the free ends of the pawl fingers 41. The decagon flange of the ratchet gear collet forms a cooperative connection between the ratchet freewheel drive 40 and the gear collet 27 and forms a freewheel hub connection to transfer torque from the gear collet 27. The perpendicular pawl fingers 41 engage with the magnetized perpendicular ratchet gear 45, which is mounted inside gear collet 27. The magnetized ratchet gear 45 attracts and engages the pawl fingers 41 and, in doing so, forms a reciprocal ratchet gear that delivers torque from the drive flange 41 to the gear collet 27. The face of the ratchet gear collet 45 has a series of ramped teeth to engage the pawl fingers 41. When rotation of the parts occurs in one direction, the attracted pawl fingers 41 engage the vertical edges of these ramped teeth. In the opposite direction, the pawl fingers 41 pivot to pass by the inclined, ramped portions of the teeth. Thus, positive drive and torque transfer is produced in one direction and freewheel in the opposing direction.

The gear collet 27 also rotates freely on the drive axle 18 through deep groove ball bearings 28 which are mounted on the shoulder of the drive axle 18 and the internal flange of the gear collet 27, as in the previous embodiment. An axle flange 42 and lock nut 43 mounted on the shoulder of the frame axle 18 provide a retaining force which allows all the components in the assembly to move freely and attached to the bicycle frame with a locking nut 20. As in the previous embodiment, the drive axle 18 has a flange and bayonet mounting receptacle which interlocks with the hub axle 5.

Figure 3:
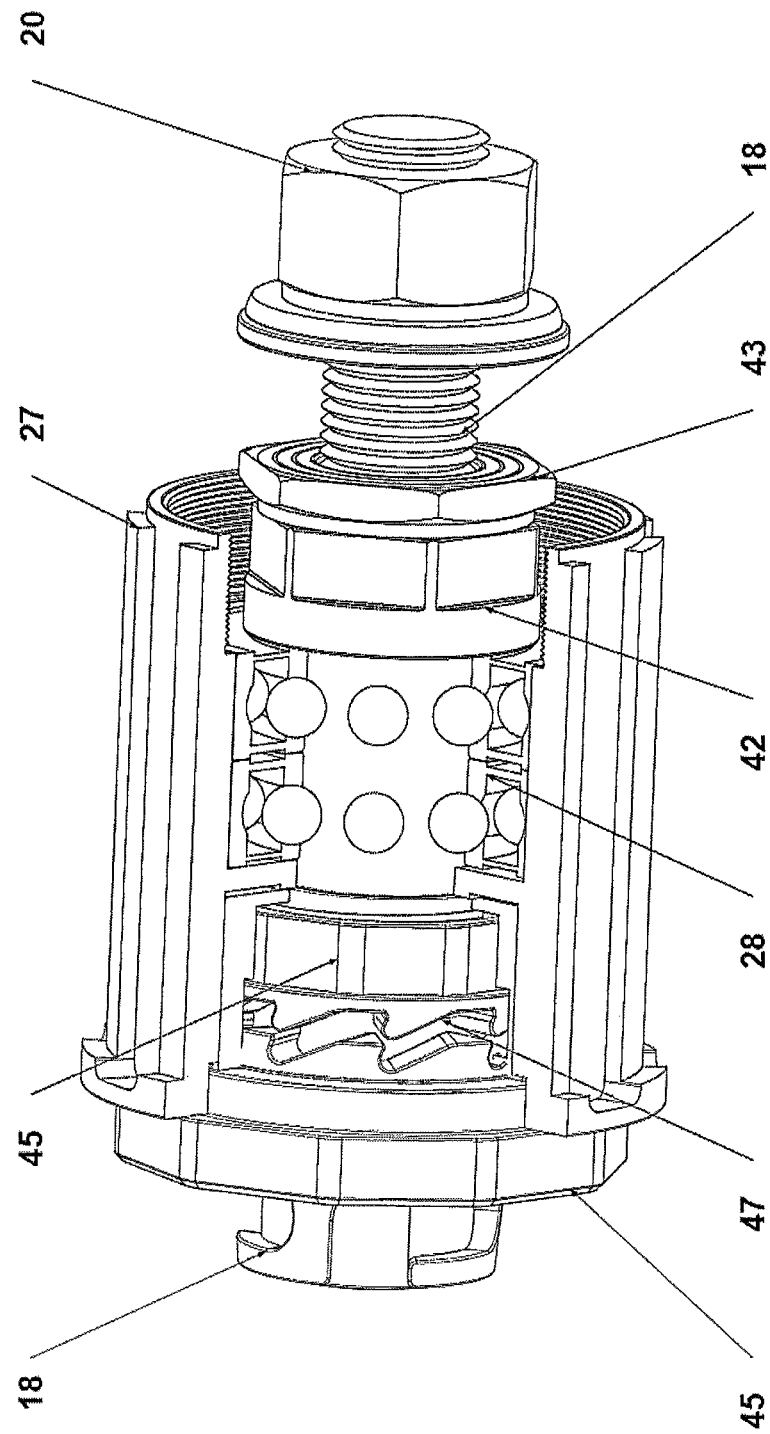
FIG. 3 is a partial cutaway view of a drive axle assembly according to another embodiment.
Figure 3A:
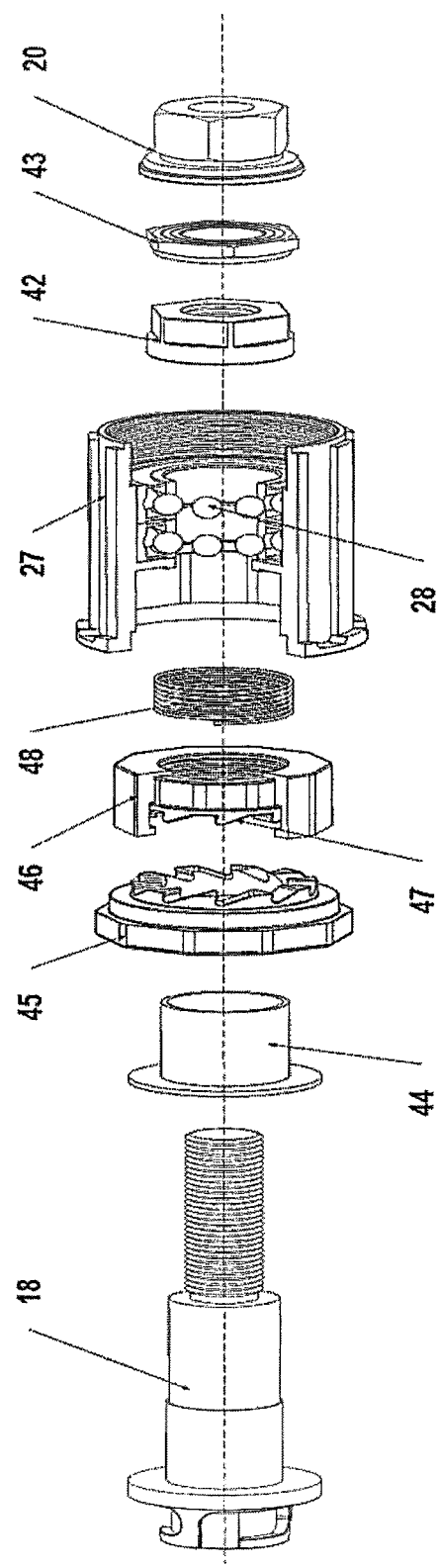
FIG. 3A is an exploded partial cutaway view of a gear collet for use in the drive axle assembly of FIG. 3.
Figure 4A:
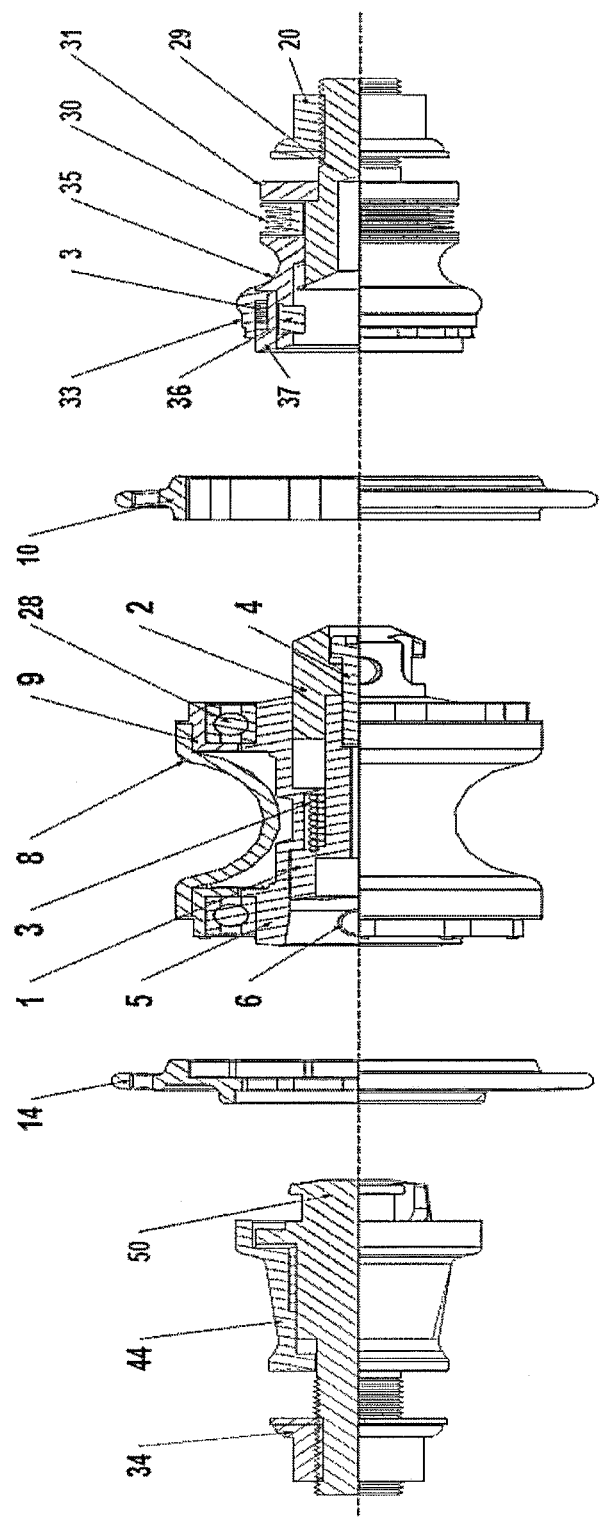
FIG. 4A is an exploded partial section view of the axle assembly of FIGS. 1-1C.

Another embodiment of the drive axle assembly is shown in FIGS. 3 and 3A. Again, the assembly includes the drive axle 18, which is inserted into a ratchet freewheel drive 45 with a bushing 44 between the two pieces. The face of the ratchet freewheel drive 45 is provided with a series of ramped teeth. A rotary ratchet gear 47 is similarly provided with a face having a series of ramped teeth and is intended to engage the matching face of the ratchet freewheel drive 45. The rotary ratchet gear is provided with a decagon collet to facilitate engagement with the interior of the gear collet 27. A spring 48 acts on the rotary ratchet gear to force its toothed face against that of the ratchet freewheel drive 45. The corresponding tooth profiles of these two pieces interlock to provide positive drive in one direction and freewheel in the opposite direction. An axle flange 42 and lock nut 43 mounted on the shoulder of the frame axle 18 provide a retaining force which allows all the components in the assembly to move freely and attached to the bicycle frame with a locking nut 20.

Figure 5:
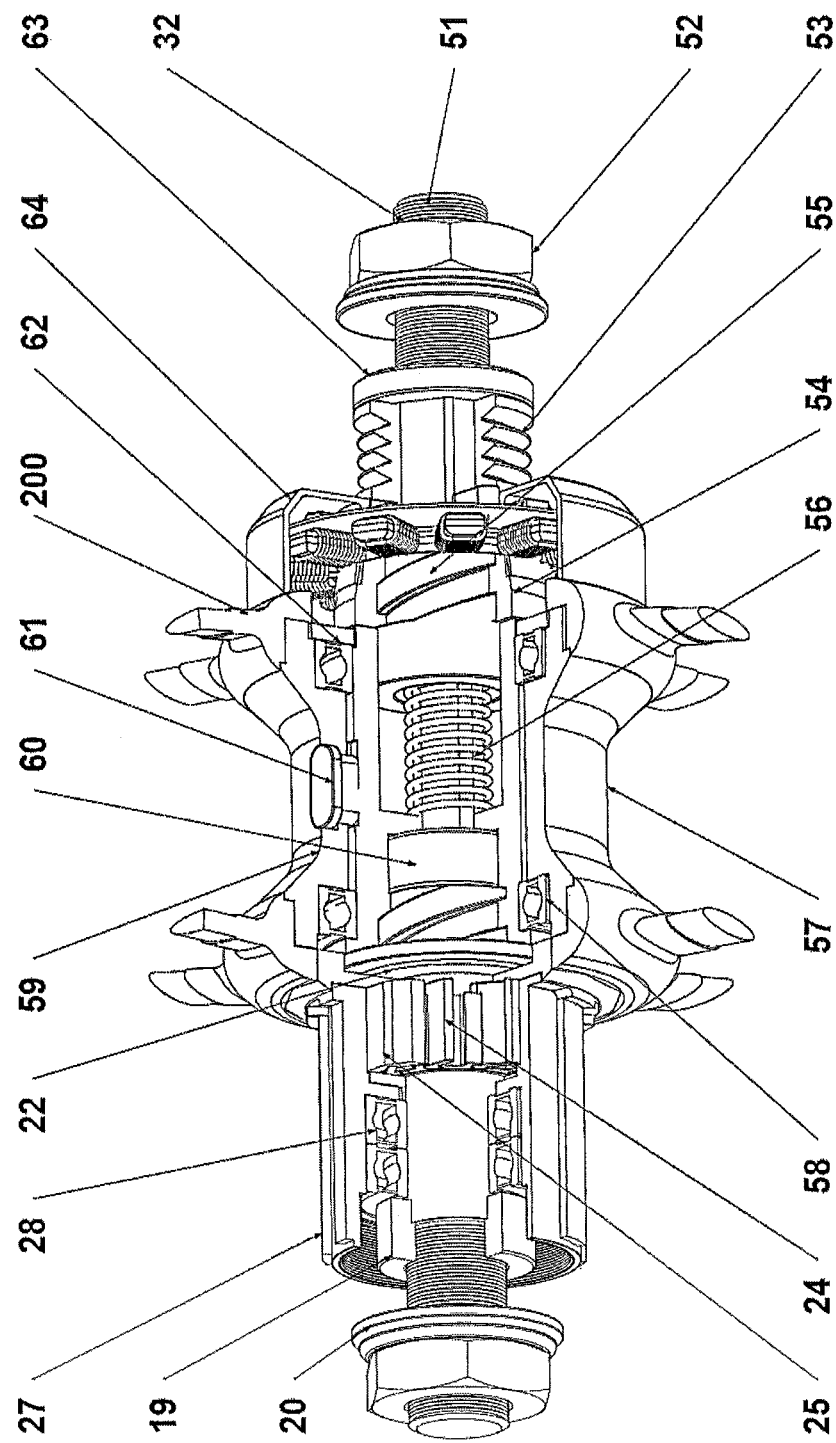
FIG. 5 is a partial cutaway assembly view of a drive axle assembly according to another embodiment.
Figure 5A:
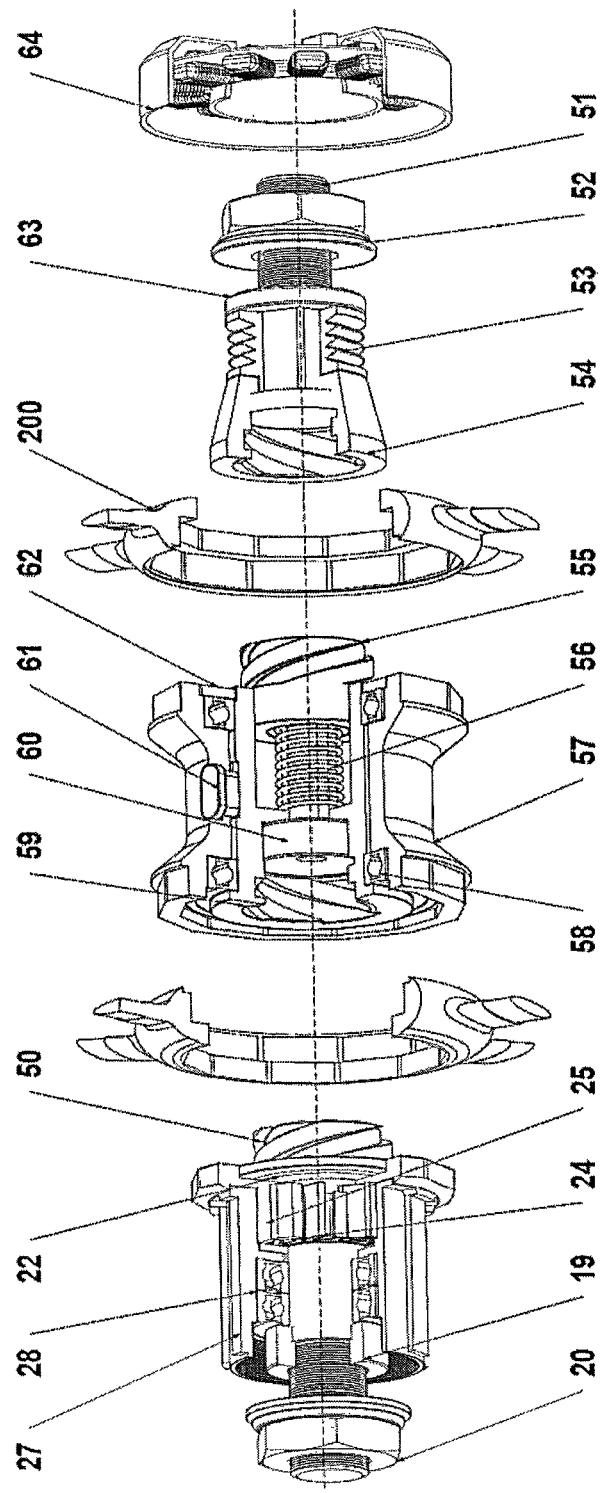
FIG. 5A is an exploded partial cutaway view of the axle assembly of FIG. 5.

Another embodiment is illustrated in FIGS. 5 and 5A. Bearing 58 are mounted between a solid hub 57 and a hub collet 59. The hub collet 59 has a flange on the drive side for the purposes of retaining one of the bearings 58. The opposite side of the hub collet 59 has a threaded lock nut 62 to retain the opposite bearing 58. Hub collet 59 provides a linear bearing surface enabling a hub locks 55 and 60 to remain fully extended by an actuation spring 56. Hub locks 55 and 60 consist of an interlocking four start box thread screw. The hub lock mating receptacle 54 and 50 connect to a drive axle 51 and a frame axles, respectively. A wheel lock 61 when triggered locks the motion of hub collet 58 to the hub 59 enabling wheel rotation to engage or disengage the hub lock screws at each end of the hub. Drive axle 51 is mounted to the bicycle frame and actuator spring 53 allows hub lock mating receptacle 54 to slide backwards and forwards and engage with its corresponding hub lock 55 via a mating bayonet locking thread.

The drive axle assembly is mounted on the bicycle frame but is also a bearing journal for a gear collet 27 which is designed to accommodate a gear cassette or fixed wheel sprockets system. The gear collet 27 is fitted to the drive axle 19 and rotates on two deep groove bearings 28 that facilitate freewheel rotation. This embodiment utilizes the same magnetized ratchet gear 25 described above in combination with pawl fingers 24 to transfer torque.

Figure 6:
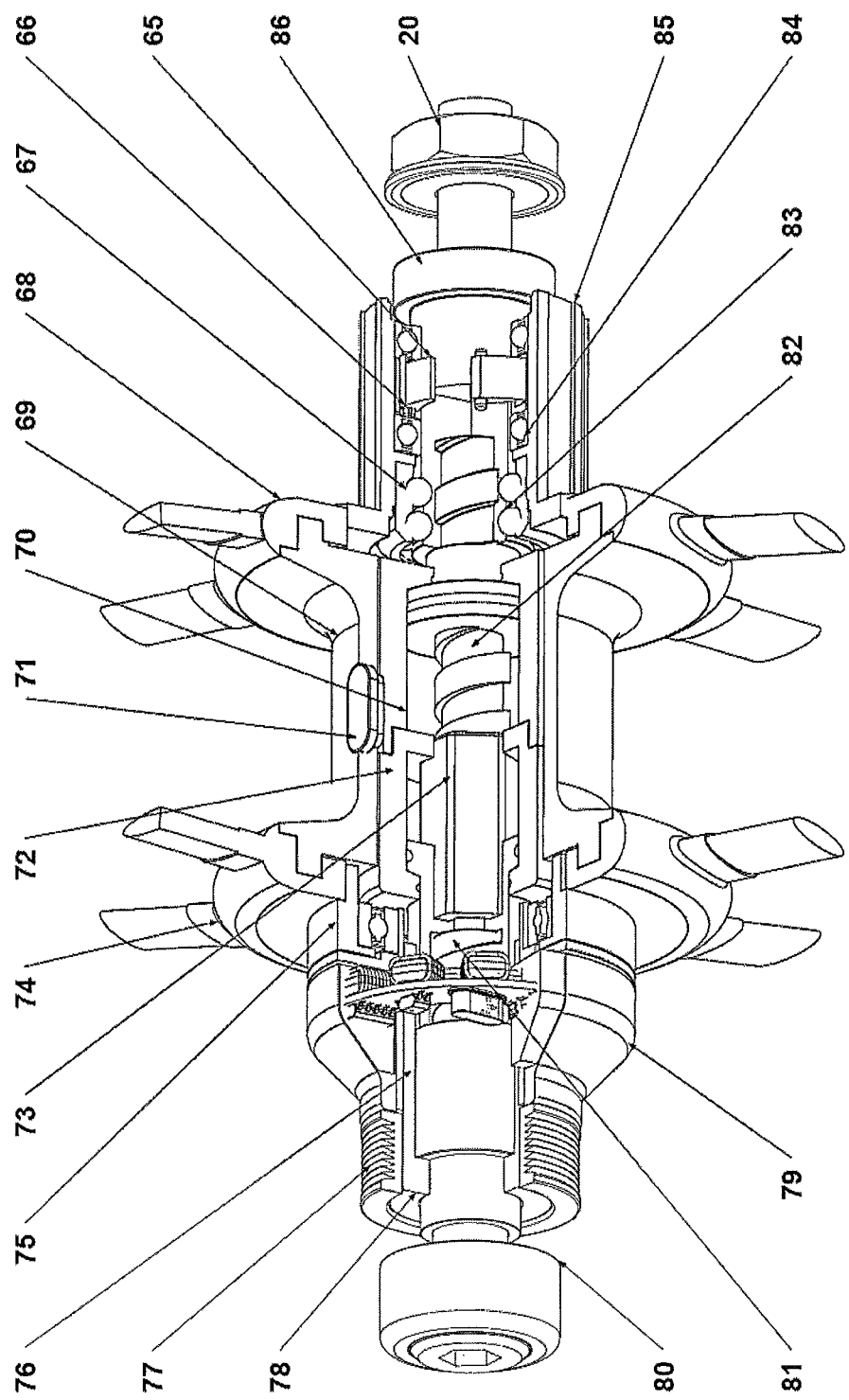
FIG. 6 is a partial cutaway assembly view of a drive axle assembly according to another embodiment.
Figure 6A:
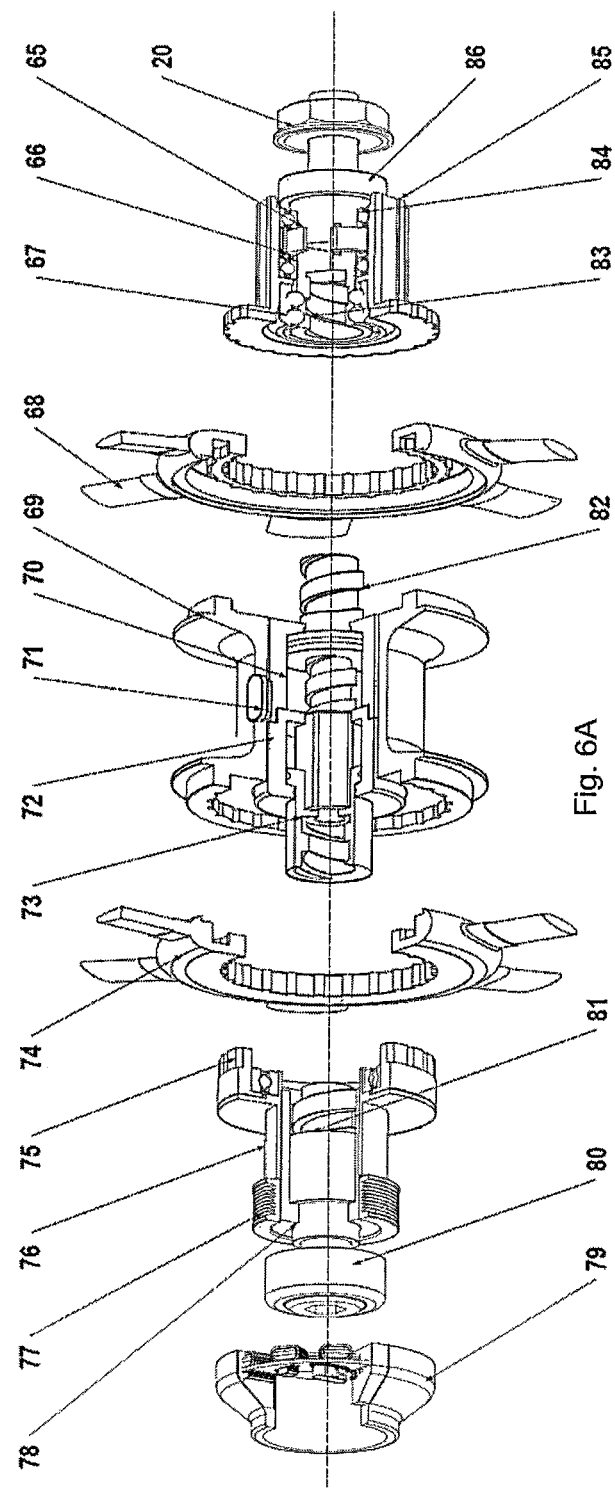
FIG. 6A is an exploded partial cutaway view of the axle assembly of FIG. 6.

FIGS. 6 and 6A illustrate a variation to the preceding embodiment. A solid body hub 69 connects to a spline drive mount flange 68 and 74. The hub collet comprises of a two-part center threaded interlocking screws 73 and 82 that float inside the hub 69. The hub lock screws 82 and 73 are mounted between hub collet sleeves 72 and 70. The hub lock screws 73 and 82 are screw connected and, when locked by axle lock 71, wheel rotation actuates the threaded screws in opposing directions. The drive axle assembly is mounted to a bike frame and a bearing 83 is mounted in a drive splined flange 67 is the load bearing wheel mounting once connected to drive mount flange 68. The frame axle 81 has a counter thread which interlocks with its reciprocating hub lock 73. Drive axle 81 has a spring 77 loaded bearing collet 76 which also has a load bearing spline flange 75 wheel mounting which interlocks with a drive mount flange 74. A spring 77 loaded bearing collet 75 slides on a frame mount retaining sleeve 78 the bearing mounted between retaining sleeve 78 and a splined bearing flange 75 provides a freely rotating splined connection mounting between the rotating bearing flanges 75. The drive axle assembly also uses a frame axle bearing 83 which supports the gear collet 85.

In an alternate embodiment illustrated in FIGS. 7-7B, the system includes a solid body hub 93. The hub 93 retains bearings 101 at each end. A hub collet 92 has an inner race on each end to accommodate bearing 101. The hub 93 has a dodecagon outer mounting flange to facilitate mating with corresponding faces of drive flanges 207 on each side of the hub 93. The drive mount flanges 207 are an independent spoke mounting drive and spoke connection flange system. The bearings 101 provide independent rotation between the hub 93 and the hub collet 92.

A hub lock activator 99 is held open by spring 97 and retained in the hub 93 by a press fitted bushing 100. When depressed, the hub lock activator 99 locks hub collet 92 and hub 93 together. A hub lock 94 is formed by a precision ground shaft with a straight ball key groove machined into an intermediate portion of its outer surface and a three start bayonet locking groove on each end. The ball key groove of the hub lock 94 is precision ground parallel linear spline actuator. The three start 45° long pitch ball thread provides an actuation motion when the hub lock 94 is driven into a bayonet locking receptacle 91. A ball plunger 104, as shown in FIG. 7B, is threaded into hub collet 93 and runs in three parallel grooves locking actuating motion between the hub collet 92 and the hub lock 94. Another ball plunger 95 is threaded in a second bayonet locking receptacle associated with a frame axle 96, thereby allowing the three 45° inter locking action to occur at each end.

The hub lock activator 99 locks the hub 93 and hub collet 92 together. Subsequently, hand rotation of the hub 93 provides a horizontal 180° linear telescoping actuation motion in opposing directions engaging the bayonet axle locks on both ends. Frame axle 96 and drive axle 90 both use ball plungers 95 and 104 to perform the bayonet thread lock action once the linear telescoping actuation drives the ends of the hub lock 94 into their female counterparts 91 and 96.

FIG. 7 also illustrates an embodiment of a single spoke flange assembly. Spoke mounts 207 are provided with an opening to accept a journal mounted spoke connect 171 that is secured in place by an anchor pin 208. The spoke connect 171 is a metal or molded composite connection to which a spoke 121 is adhesively bonded. A rim connect 180 is adhesively bonded to the same carbon spoke 121 and connected to an interchangeable rim mount 230 by screws 106. A tension screw 107 attaches the single spoke assembly D comprising of spoke mount 207, spoke connect 171 spoke 121 rim connect 180 and rim mount 232 to make a single spoke mounting system. The tension screws 107 pre-load spoke tensions ensuring that the bicycle rim 112 is running true.

Figure 8:
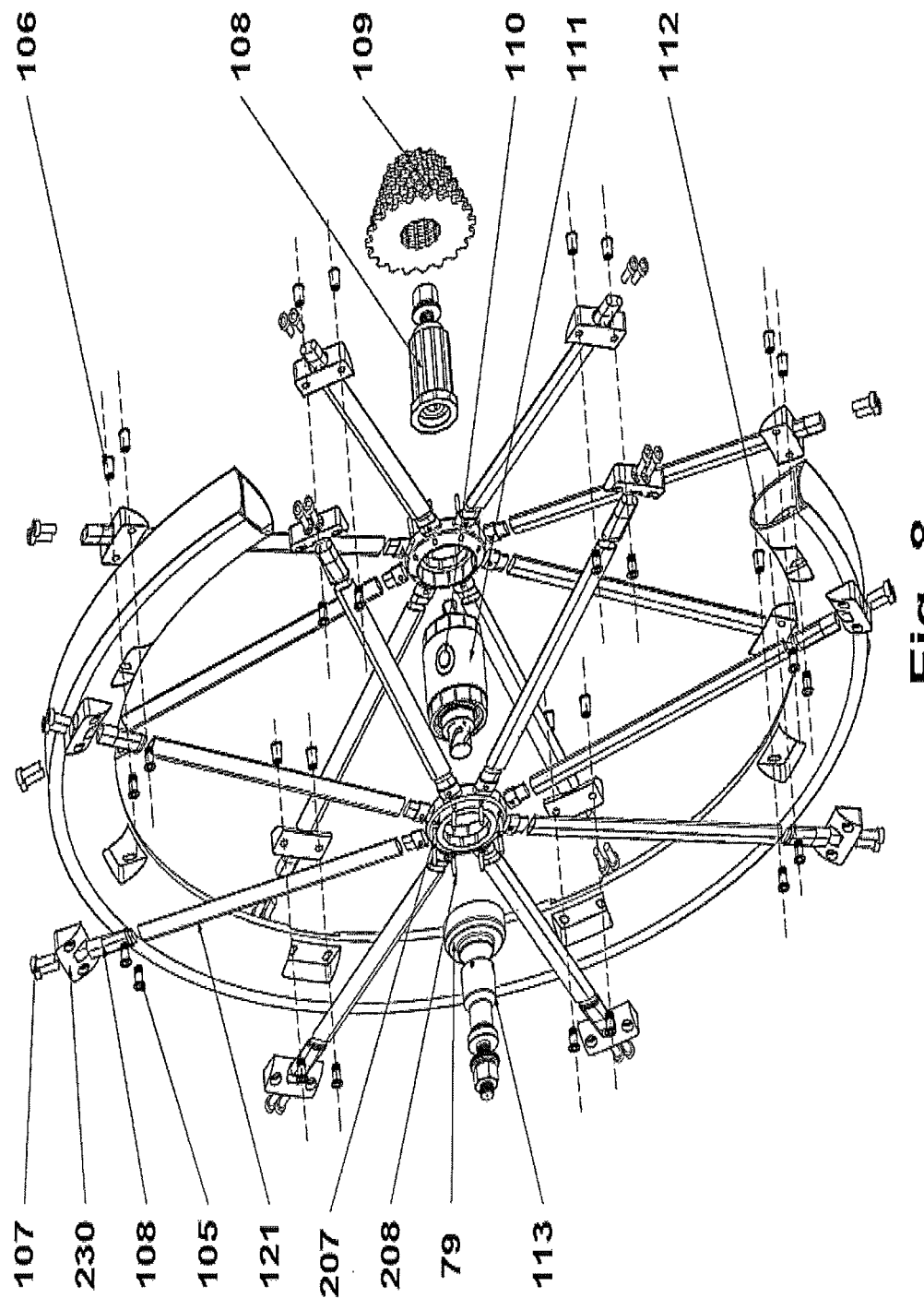
FIG. 8 is an exploded perspective view of wheel system according to an embodiment.

FIG. 8 illustrates a wheel system incorporating selected embodiments discussed above. It includes a hub assembly 111, frame axle assembly 113, drive axle assembly 108, gear cassette 109, rim 112, and a single spoke flange assembly as described above.

This single spoke flange assembly is a pre-configured component that is interchangeable and interconnectable with different wheel configurations. The spoke mount 207 is the interconnecting element between the hub and the rim and accommodates many variables and alternatives ranging from conventional to carbon spokes. The spoke mount 207 connection can be flexible, fixed or solidly molded. The spoke mount 207 has a drive flange and a hub flange and its connection to a spoke configurations are applied in many different alternatives and described in other embodiments. Carbon spokes 121 can be adhesively attached to spoke connects 171 and rim connects 108 accommodating a variety of connection systems also described in following embodiments. The rim mount 230 is an interchangeable rim connection method which ties a spoke to the rim 112.

Figure 62:
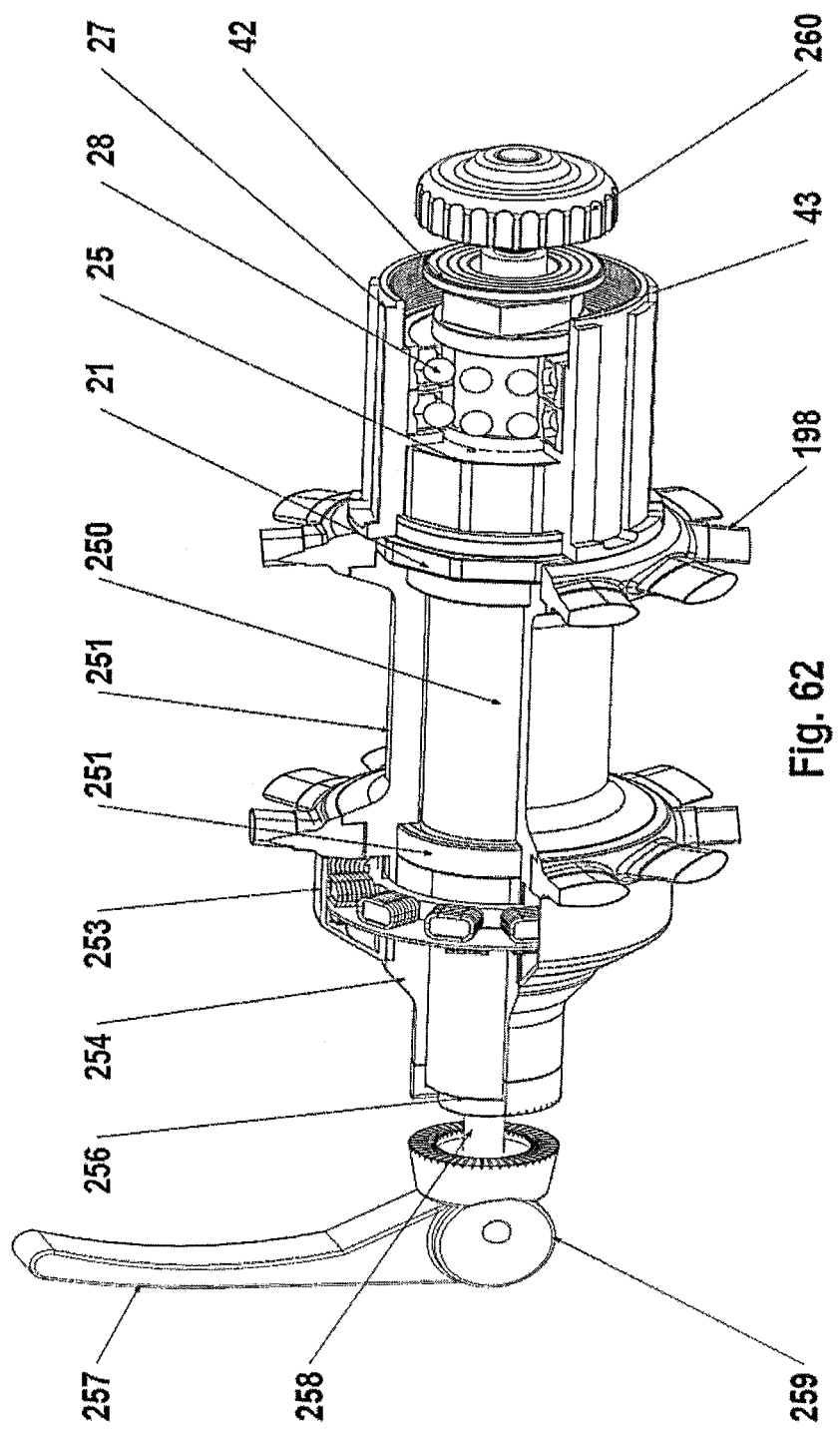
FIG. 62 is a partial cutaway assembly view of an axle assembly according to another embodiment incorporating a conventional quick release system.

Note that while the single spoke flange assembly is preferably utilized with the hub, drive axle, and frame axle assembly embodiments discussed above, it can also be used with conventional hub arrangements, such as conventional quick release hubs, as shown in FIG. 62. The spokes used in the single spoke assembly can take a variety of forms, and examples are illustrated in FIGS. 9 through 31A. These include round tubular or carbon fiber spokes adhesively bonded using a male or female socketed connection systems (FIG. 9); tubular aerodynamically profiled carbon fiber spokes adhesively bonded using a male or female socketed connection systems (FIG. 10); tubular elliptical profile carbon fiber spokes adhesively bonded using a male or female socketed connection systems (FIG. 11); or elliptical aerodynamic and profiled carbon fiber spokes that transition to a round connection at the opposing end with threaded or nut molded receptacles (FIG. 12).

FIGS. 13 and 13A illustrate a rim connect 125 that is a half spherical headed socketed fastener with a tapered shoulder and flat wrench surfaces for fastening or tensioning purposes. The internal threaded socketed body provides fastening and tensioning adjustment through a socket which has screw head 126 adhesively bonded to a round spoke 120 on one end. The other end has a half spherical split bushing 127 designed for mounting in a spherical detachable rim or hub mount connection socket.

FIGS. 14 and 14A illustrate a spoke having a tapered shoulder and a fixed point pivot mounting rim connect 120 to facilitate attachment of a single spoke to a rim or hub. FIGS. 15 and 15A shows a tapered self-aligning swivel head 130 fitted to a round spoke 120. The same self-inserting swivel 127 bushing used in FIG. 13 blocks and retains the swivel head after insertion inside the receptacle spherical socket 129. The swivel head 130 is retained and rotates inside the split Bush's 127. The arrangement can be utilized a rim or spoke mount.

FIGS. 16 and 16A illustrate a spoke with a swivel rim connect 131 that rotates in a base screw mounting socket that adhesively bonded to a socket mount round spoke 120. This connection system can be applied to any single spoke system will for the purposes of rim or hub connection. The tapered wrench faced shoulder facilitates fastening or tensioning. FIGS. 17 and 17A illustrate a spoke with a rim connect 132 that is a machined or forged fixed base screw headed structural component adhesively bonded to a socket mount round spoke 8 for the purposes of attaching a single spoke to a rim or hub connect. FIGS. 18 and 18A show a spoke with a rim swivel bearing connect 131 that is mounted on a fixed swivel base socket adhesively bonded round spoke 120. The tapered shoulder and flat wrench surfaces enable fastening or tensioning of attaching a single spoke to a rim or hub connect.

FIGS. 19 and 19A illustrate a spoke with a threaded socket lock nut 134 that allows a tension screw 133 to retain a rim spoke mount mechanical connection. Lock nut 134 has a swivel flange and is retained in a swivel bushing 135 that is adhesively bonded to the spoke 120. The keyed tension screw 133 is threaded into the lock nut 134, and rotation of the swiveling lock nut 134 allows tension screw 133 to adjust spoke tension in either direction.

FIGS. 20 and 20A show a spoke having a transition rim connect 136 in the form of a threaded screw secured to an aerodynamically profiled rim or spoke flange connection system that can be connected to an aerodynamically profiled or tubular spoke. This can be a molded, forged or machined or manufactured to mount to a male or female socket and adhesively bonded to a tubular carbon spoke. This system can be applied to any single spoke configuration on a rim or hub mount connection and use a standard a threaded nipple nut for fastening and tensioning.

FIGS. 21 and 21A show a spoke arrangement with a rim connect 138 that is a spherical headed shoulder screw retained in a round swivel nut 137 having a counter-bored spherical mounting journal. The rim connect 138 has a spherical bearing journal head, and its shoulder is a four faced wrench surface for tensioning adjustability. A screw is attached to a fixed nut 149 that is adhesively bonded to a carbon transition 123. A rubberized polyurethane spring 140 between carbon transition spoke 123 and a retaining flange 139 allows for maximum extension tension when this connection occurs. This T point connection enables the swivel nut 137 to self-center the spoke 123 and provide 20° of freedom.

FIGS. 22 and 22A show a spoke arrangement provided with square shanked spherical nipple-nut 28 and extendable axial slide bearing retained through integrated swivel socket 32. The swivel socket is mounted into a carbon transition 27. A tension spring 31 enables the nipple nut 28 to be retained and to slide axially through the a swivel socket 32 so that a spring 33 is anchored on a flange 30 and swivel socket 32, thereby maintaining maximum extension between the swivel socket 32 and nipple nut 28. Swivel nut 29 provides a fixed radial and point allowing the spherical nipple nut 28 to self-center of and rotate in this swivel nut 29.

A rim connect is provided with a square shanked spherical nipple-nut 36 and an extendable axial slide bearing retained through integrated swivel socket 33. The swivel socket is mounted into a carbon transition 27. A tension spring 35 enables the nipple nut 36 to be retained and slide axially through a swivel socket 33 so that a spring 35 is anchored on a flange 35 and swivel socket 33, thereby maintaining maximum extension between the swivel socket 33 and nipple nut 36. Swivel nut 36 provides a 60 degree freedom of rotation and can be fitted to a conventional bicycle wheel rim with connection with a split bearing bushing 37.

FIGS. 23 and 23A show a rim connect with a wrench faced nut 150 nut adhesively bonded and mounted into a carbon transition spoke 123 to accept a tensioning screw. FIGS. 24 and 24A illustrate a spoke arrangement with a spherical four faced wrench nut 151 that provides a tension adjustment when mounted in a rim or hub mount connection. A screw 153 is adhesively bonded to a carbon spoke transition 123 and provides tensioning screw thread adjustment. A spoke retaining flange 152 is held at full extension by a polyurethane spring 140.

FIGS. 25 and 25A illustrate a fixed slot head rim connect 154 adhesively mounted to a spoke transition 123. An anchor pin 155 or direct adhesive bonding methods can be applied to hub or rim mount connections. FIGS. 26 and 26A show a spoke arrangement with a rim connect 156 with a fixed horizontal round T head swivel screw mounted to a wrench faced swivel nut 159. The swivel nut 159 is adhesively fixed to a carbon transition 123. A tension spring 157 maintains maximum extension between the swivel screw 156 swivel nut 159. The T head when mounted in the hub or spoke flange mount fixes the horizontal axis and allows the perpendicular axis to rotate freely in its socket. Rotation of socket nut 158 adjusts spoke tension when rotary wrench action applied. The arrangement produces 20 degrees of freedom around its rotation axis and ensures that spoke alignment is correct when fitted to a conventional rim or hub mount.

FIGS. 27 and 27A illustrate a spoke arrangement with a rim connect 160 that is a fixed horizontal round T head rim mounted to a carbon transition 123. The round T head 160 when mounted in the hub or spoke flange mount fixes the horizontal axis allowing the perpendicular axis to rotate freely in its socket.

FIGS. 28 and 28A show a spoke arrangement with a transition rim connect 162 that is a threaded screw connected to an aerodynamically profiled rim or spoke flange connection system fixed directly to an aerodynamically profiled or tubular spoke. A round T head 161 is mounted in the hub or spoke flange fixing the horizontal axis and allowing the perpendicular axis to rotate freely in its socket. Tension adjustment is accomplished by rotating the spoke.

FIGS. 29 and 29A illustrate a spoke arrangement with a hub connect 163 that is provided with an aerodynamically profiled root headed tubular carbon or composite spoke 122. The spoke can be adhesively bonded or connected by an anchor dowel-pin connection. FIGS. 30 and 30A show a spoke arrangement with a hub connect 164 that is provided with an elliptical cross section and is adhesively bonded or mounted to a tubular carbon or composite spoke 122.

FIGS. 31 and 31A illustrate a spoke arrangement with a hub connect 165 have a extending pivot pins 166 adhesively bonded or mounted to a tubular carbon or composite spoke 122.

Figure 32:
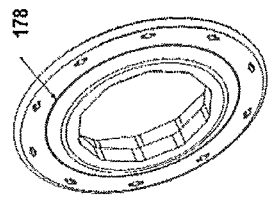
FIG. 32 is a perspective view of a spoke mount arrangement according to an embodiment.
Figure 33:
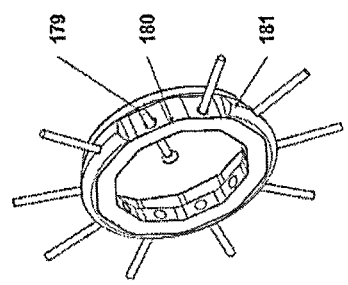
FIG. 33 is a perspective view of a spoke mount arrangement according to another embodiment.

FIGS. 32 through 47 illustrate a variety of spoke mount and spoke connect arrangements for use in embodiments of the single spoke flange assembly. Each of the depicted spoke mounts is provided with internal and external decagon flanges for mating with hub assemblies, drive axle assemblies, and frame axle assemblies as described herein. The spoke mount 178 in FIG. 32 is provided with radial holes for the purposes of mounting a conventional bicycle spoke. In the arrangement of FIG. 33, a wire spoke 179 with a flared countersunk head is retained in a counter-bored hole in each of the flat sides of the flange. The outer molding composite encapsulates all spokes in the flange creating a single spoke component assembly.

Figure 34:
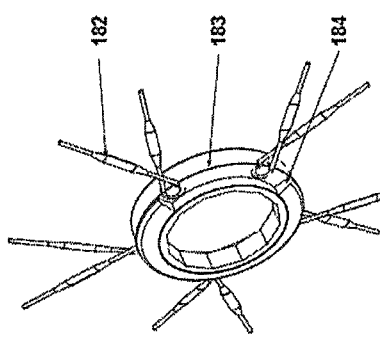
FIG. 34 is a perspective view of a spoke mount arrangement according to another embodiment.
Figure 35:
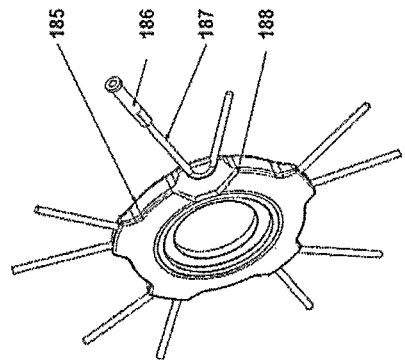
FIG. 35 is a perspective view of a spoke mount arrangement according to another embodiment.
Figure 36:
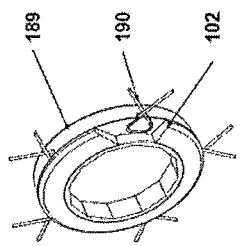
FIG. 36 is a perspective view of a spoke mount arrangement according to another embodiment.

In FIG. 34, an endless spoke 181 consisting of a wire spoke threaded at each end and folded, rolled, bent or pressed so that the final angle is greater than 360° so that the ends of the spokes are connected to a rim mounts at the appropriate angle. This wrap around its center point in rolled around a circular groove and crossover pattern corresponding to a machined groove in the spoke mount 183. The spoke 181 rolled around becomes the anchor of the spoke which is attached to the rim through a rim mount or connection and tensions using spoke nipples 182 fasten and create spoke tension In the rim mount is described in other embodiments. The 360° roll around provides a spoke crossover which provides rotational torque stability. The wraparound angle is determined by the number of spokes in a wheel configuration. All spokes 182 are pressed into the corresponding locking grooves on the spoke mount 183 surface. A press fit flange locking cap 183 permanently seals all spokes into a single spoke assembly component. FIG. 35 shows a somewhat similar embodiment in which an endless spoke 187 consisting of a wire spoke is threaded at each end and folded, rolled, bent or pressed so that the final angle is greater than 30° or appropriate to the number spokes in the wheel divided by 360°. The ends of the spokes 187 are connected to rim mounts with this wrap around at its center point is press fitted into a corresponding machined groove on the spoke mount 185 eliminating crossover and providing rotational torque stability. The wraparound is the anchor for the spokes 187 which are attached to the rim through a rim mount or connection and tensioned using spoke nipples 186 as described in the previous embodiment. FIG. 36 also shows an endless spoke 190 consisting of a wire spoke threaded at each end folded, rolled, bent or pressed so that the return point of the triangulated spoke 190 is at its widest point at the base of the triangle insuring that the crossover torque load is maximized. The radius at the corners of the triangle anchor points are calculated for maximum stress. The spoke crossover angle is calculated as the number spokes 190 in the wheel divided by 360°. The ends of the spokes 190 are connected to rim mounts and press fitted into a corresponding machined groove on the spoke mount 189. A flange locking cap 102 is press fit or adhesively bonded to spoke mount 189 and locks the spokes into a single spoke assembly component. The triangulated wraparound is the anchor of both spokes which are attached to the rim through a rim mount or connection and tensioned using spoke nipples as described in the previous embodiments.

Figure 37:
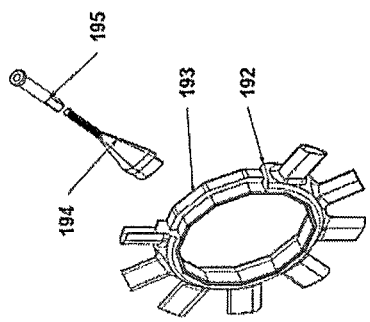
FIG. 37 is perspective views of a spoke mount arrangement according to another embodiment.

In FIG. 37, the spoke mount is formed from an internal flange 193, which contains the decagon flanges. This is combined with a solid composite radial single spoke 192 over the internal flange. Each individual spoke in the array is fixed in position and angle and a transition rim mount 194 connection system is adhesively attached the end of each spoke in the radial array.

Figure 38:
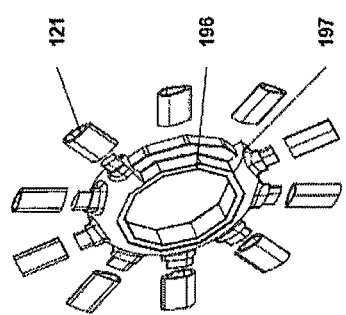
FIG. 38 is a perspective view of a spoke mount arrangement according to another embodiment.
Figure 39:
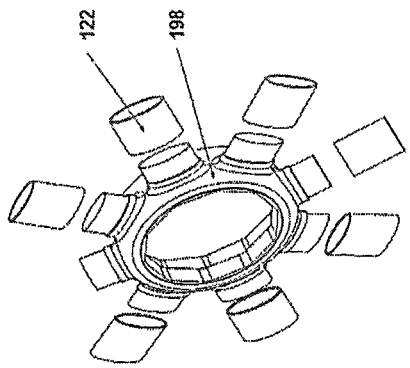
FIG. 39 is a perspective view of a spoke mount arrangement according to another embodiment.

FIG. 38 illustrates an internal flange 196 with a solid composite radial single spoke 197 having spoke mounting flanges. Tubular profile carbon spokes 121 are adhesively bonded to the spoke mounting flanges. FIG. 39 illustrates a similar embodiment with a spoke mount 198 formed with spoke mounting flanges arranged to accommodate spokes 122 by adhesive bonding.

Figure 41:
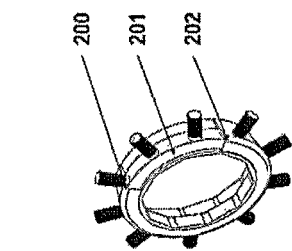
FIG. 41 is a perspective view of a spoke mount arrangement according to another embodiment.
Figure 40:
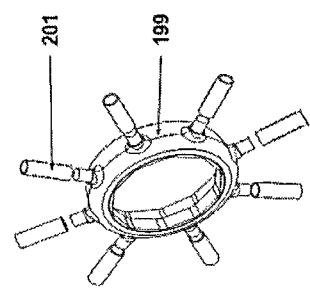
FIG. 40 is a perspective view of a spoke mount arrangement according to another embodiment.

FIG. 40 illustrates a one-shot molded, machined or forged spoke mount 199. A round spoke root mounting flange accommodates a round tubular profile carbon spoke 201, which is adhesively bonded to its root flange. FIG. 41 shows spoke mount 201. The outside surface of the machine mount 201 has a mounting surface perpendicular to the spoke angle and a threaded stud 200 is capacitive welded to the surface in a radial pattern. This thread root stud 200 is structurally secured by a solid composite finishing mold 202 which adds additional stability to stud 200. A nut associated with the spokes uses the threaded stud as its tensioning and connection point.

Figure 42:
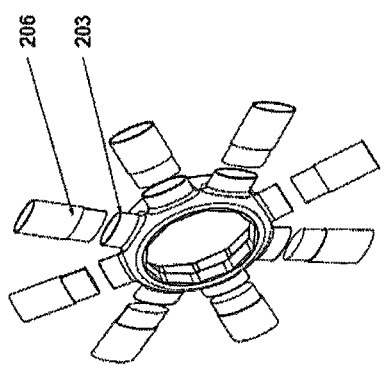
FIG. 42 is a perspective view of a spoke mount arrangement according to another embodiment.

FIG. 42 illustrates a one-shot molded, machined or forged spoke mount 203. A plurality of spoke studs 203 are provided along the perimeter of the spoke mount 203. In this case, the spoke studs 203 are arranged to accommodate elliptical or aerodynamically profiled spokes 206 that are adhesively bonded to spoke studs 203.

Figure 43:
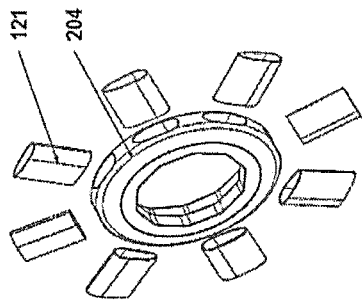
FIG. 43 is a perspective view of a spoke mount arrangement according to another embodiment.

FIG. 43 shows a one-shot molded, machined or forged spoke mount 204 with openings provided along its perimeter to accept elliptical or aerodynamically profiled spokes 121 that are adhesively bonded into the spoke mount 204.

Figure 44:
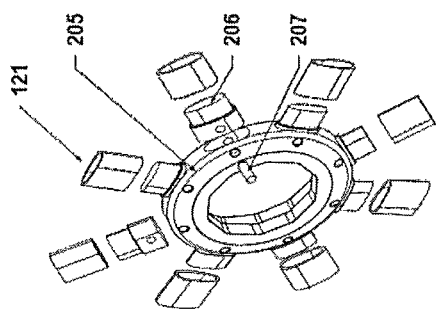
FIG. 44 is a perspective view of a spoke mount arrangement according to another embodiment.

FIG. 44 shows a one-shot molded, machined or forged spoke mount 205 that is provided with radial openings along its perimeter to accept spoke connects 206 therein. The spoke connects 206 become a nonpermanent installation component. Tubular spokes 121 are adhesively connected to the spoke connects 206. The spoke mount is also provided with transverse through holes corresponding to each radial opening. Once a spoke connect is inserted into a radial opening, an anchor pin 207 is inserted into the transverse through hole to lock the spoke connect 206 into its radial opening.

Figure 46:
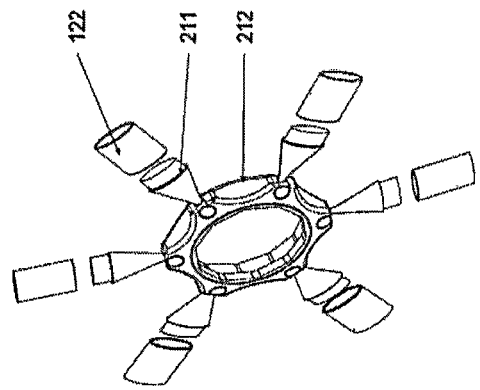
FIG. 46 is a perspective view of a spoke mount arrangement according to another embodiment.
Figure 45:
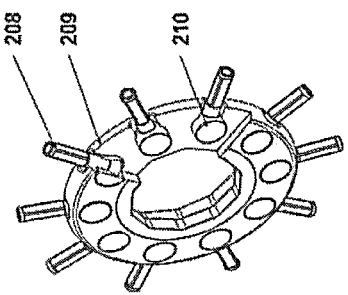
FIG. 45 is a perspective view of a spoke mount arrangement according to another embodiment.

FIG. 45 shows a one-shot molded, machined or forged spoke mount 209. The spoke mount 209 has a openings therein composed of intersecting radial openings and transverse through holes. This combination accommodates round swivel T nut spoke connects 210 with a spoke directly connected thereto or using a nipple nut 208 for the purposes of tensioning FIG. 46 illustrates a similar arrangement with a spoke mount 212 having similar intersecting openings to accommodate a variation on a swivel T-nut connect 211, which also accepts a spoke 122.

Figure 47:
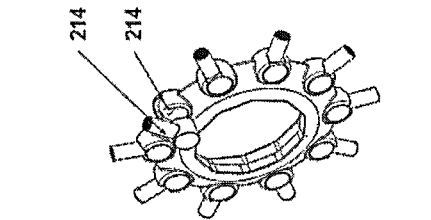
FIG. 47 is a perspective view of a spoke mount arrangement according to another embodiment.

FIG. 47 illustrates a one-shot molded, machined or forged spoke mount 214 having a series of horizontal molded sockets along its perimeter to again accommodate round fixed swivel T-nut connects 215.

FIGS. 48 to 61 illustrate a series of embodiments of rim and rim connecting arrangements suitable for use with various embodiments of the other system components described herein.

The rims may be formed by interchangeable rim bodies 216 and 224, which are molded in a two-part die. Rim bodies 216 and 224 are mirror images of one another and are adhesively bonded together to create a lightweight hollow rim component. A break rim 215 is an aluminum extrusion which is rolled in a circle and becomes an integral part of the rim assembly process. The molding process involves the use of an impression mold, which enables multiple rim bodies 216 and 214 to be manufactured in a press tool configuration using a laminate substrate to separate and create a perfect molding on both back and front surfaces.

Rim connect recesses are molded into the rim bodies 216 and 224 at regularly spaced intervals around the perimeters of the rim bodies 216 and 224. These rim connect recesses have identical relief angles which facilitate a stack molding principle. To eliminate the image tooling a key time and groove seem at the bottom of the rim enables the assembly process to use a key joint to ensure a smooth surface finish when assembled. The rolled aluminum brake rim 215 has a corresponding profile which allows molded rim bodies 216 and 224 to be assembled so that only the break surface of the break rim 215 is exposed. All other surfaces are adhesively bonded and cured in the assembly process as they dovetail into the rim bodies 216 and 224. The rim bodies 216 and 224 wrap around the brake rim 215 adding to the strength of the rim construction. The assembly process requires a press tool shaped to the outer profile of the rim and allows left and right hand side break rim 215 and rim bodies 216 and 224 to be sandwiched under pressure to create an effective adhesively bonded connection resulting in a complete assembled hollow rim.

Slides 221 are sandwiched between the rim bodies 216 and 224 at the rim connect recesses for additional strength when rim locks 222 and 217 are applied to the rim. As the rim locks 222 and 217 are tightened, the slides 221 are adhesively bonded to their respective carbon molded rim bodies 216 and 224, allowing a solid cam surface to produce a perpendicular force enabling spokes to reach full tension.

Rim mounts 223 and 218 are secured to the rim by the rim locks 222 and 217. The rim mounts 223 and 218 maintain a relatively uniform outer surface appearance for the rim and are arranged to match the contours of the rim connect recesses molded into the rim bodies 216 and 224. The rim locks 217 and 222 have a counter bored hole running horizontally through so that the rim lock screw 222 engages with a rim lock nut 217. When tightened horizontal force translates into a perpendicular force by the angular slide geometry which is perpendicular to a spoke nut 219.

Figure 48B:
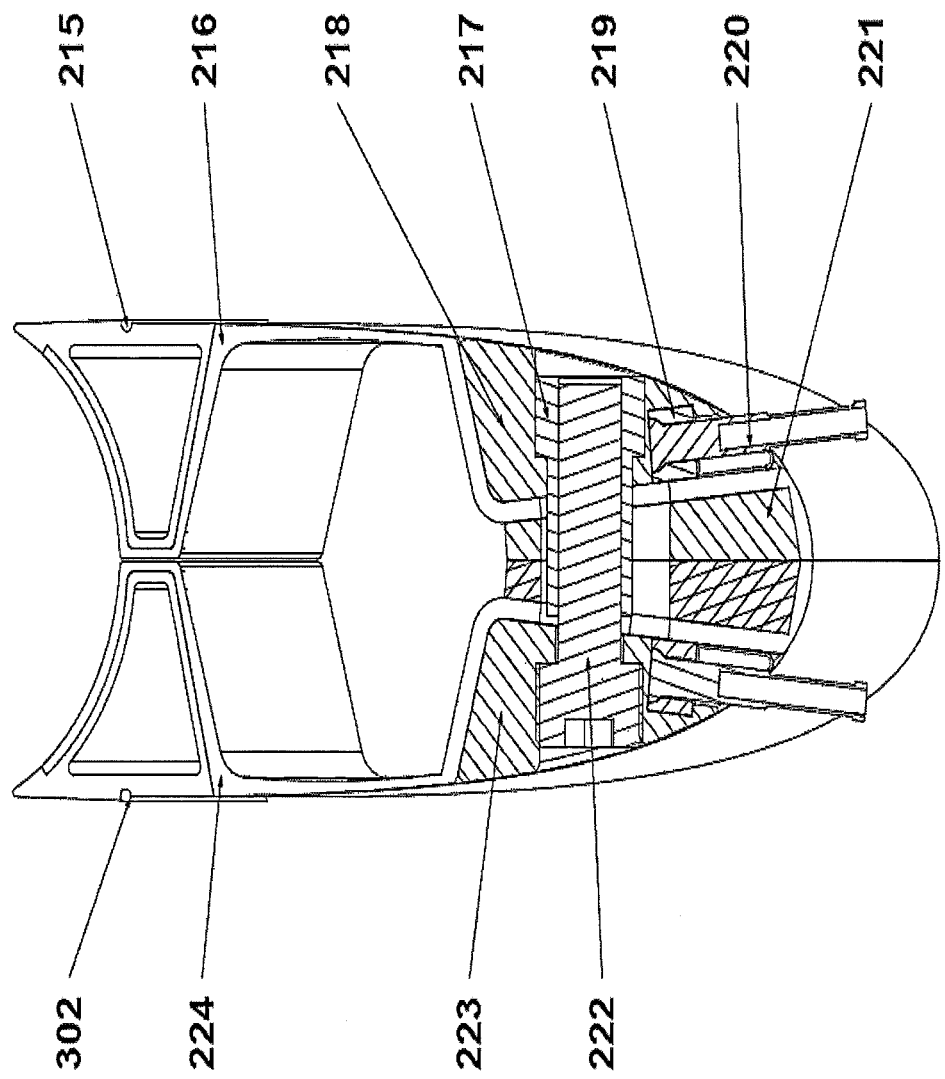
FIG. 48B is a section view of the rim connecting arrangement of FIGS. 48 and 48B.
Figure 48D:
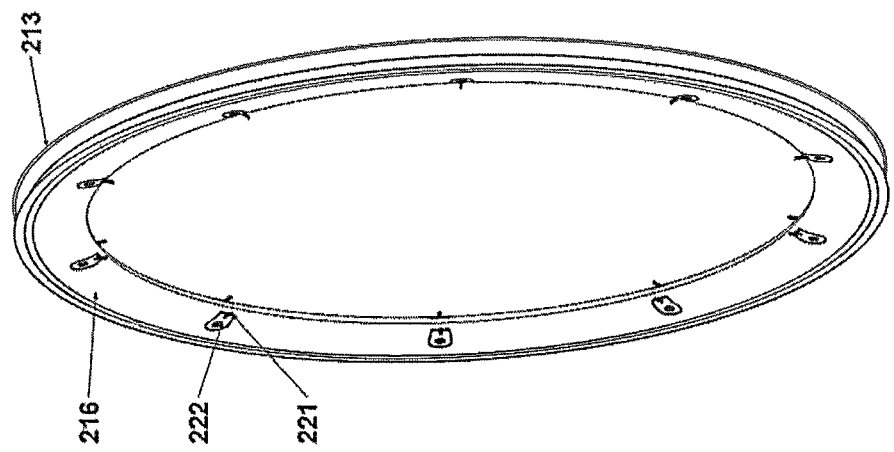
FIG. 48D is an assembly view of the rim of FIG. 48C.
Figure 48C:
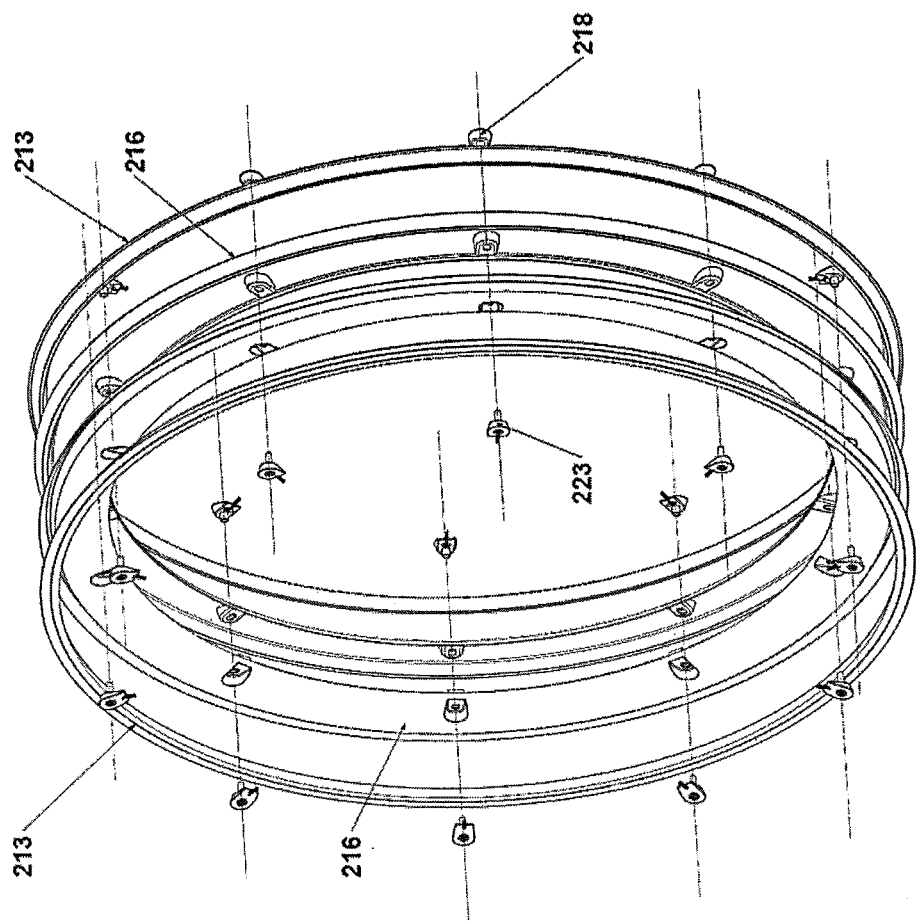
FIG. 48C is an exploded view of a rim incorporating the rim connecting arrangement of FIGS. 48-48B.

The rim mounts 223 and 218 have slotted recesses parallel to the cam surface of the rim connect 218 to accommodate sufficient vertical take-up when spoke nut 220 is retained in a reciprocal counter bore. A spoke connect 219, which is inserted through the spoke nut 220, is accommodated by a perpendicular hole in each rim mount 218 and 223. The spoke connect 219 sets the tension of the spoke and allows rims to be changed over by removing the rim locks 217 and 222 and rim mounts 223 and 218. When reinstalling a different rim configuration the predefined spoke tension is maintained but the take up is enabled because the cam slide and provides tensioning after installation. FIGS. 48-48.4 illustrate this embodiment.

Figure 49:
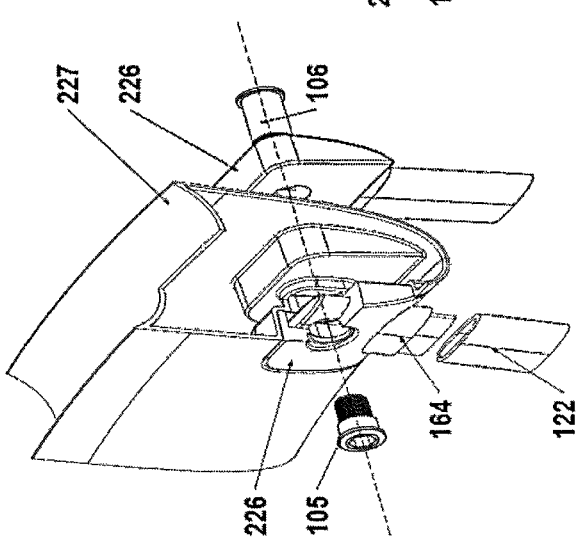
FIG. 49 is a partial cutaway perspective view of a rim connecting arrangement according to another embodiment.

FIG. 49 illustrates another embodiment. Rim mount 226 adopts the same principles as the previous embodiment but uses an embedded rim lock 226 in a counter sunk socket mounting journal mirrored on both sides of rim 227. The rim 227 in this embodiment is shown as a one piece design, but could be a multi-piece arrangement as described above. The rim mount 226 accommodates a spoke connect 164 mounted in a socket mounting journal. A carbon spoke 122 is adhesively bonded to it spoke connect 164. Rim locks 105 and 106 connect and tension both spokes simultaneously.

Figure 51:
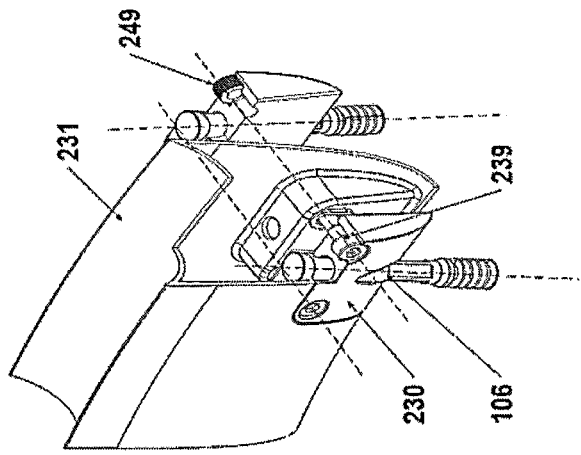
FIG. 51 is a partial cutaway perspective view of a rim connecting arrangement according to another embodiment.
Figure 50:
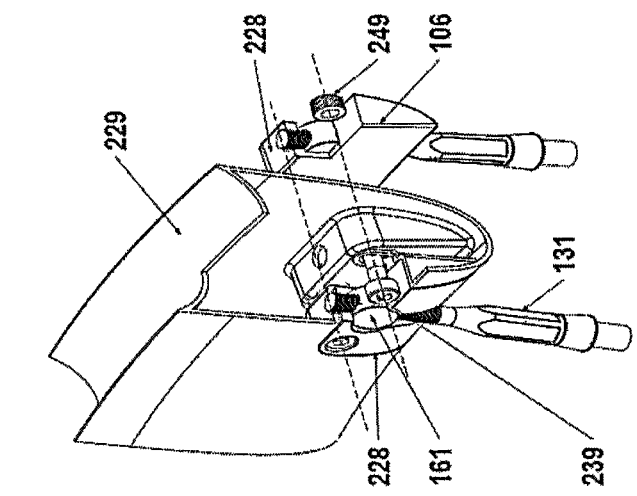
FIG. 50 is a partial cutaway perspective view of a rim connecting arrangement according to another embodiment.

FIGS. 50 and 51 illustrate related embodiments. In FIG. 50, dual molded rim locks 239 fit into rim connect 228 and are counter-bored allowing a rim lock screw 239 and one side to lock and tension rim connects on both sides. Rim lock nut 249 is a threaded insert pressed into the counter bore allowing the horizontal or fastening action to apply perpendicular cam locking tension force on the spoke connect 131. A round swivel T-nut 161 oriented perpendicularly to the spoke connect 131 is externally removable and allows the spoke connect 131 to adjust spoke tension. In FIG. 51, rim connect 230 accommodates a spherical shoulder nut 106 mounted between rim lock screws 239 and 249. This fixed connection provides a tension adjustable connection between the spoke and rim connect 230

Figure 53:
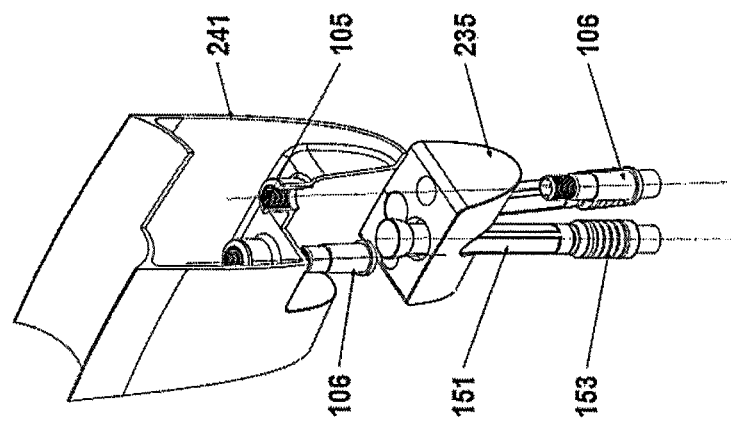
FIG. 53 is a partial cutaway perspective view of a rim connecting arrangement according to another embodiment.
Figure 52:
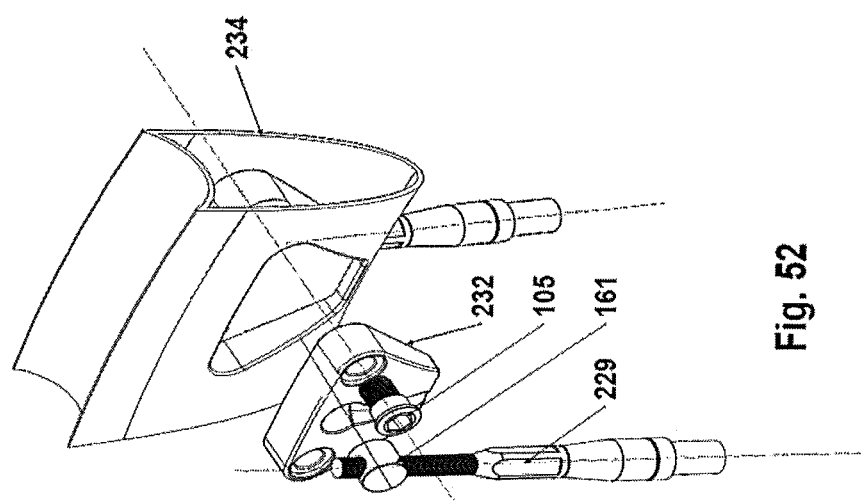
FIG. 52 is a partial cutaway perspective view of a rim connecting arrangement according to another embodiment.

As illustrated in FIGS. 52-61, other rim connect recess arrangements are contemplated within the scope of the invention. FIG. 52 shows a triangular countersink rim connect 232 and corresponding recess in rim 234. FIG. 53 illustrates an interchangeable molded counter-bored bottom rim connect 235 attached to rim 241. The rim connect 235 is attached to the corresponding rim connect recess by two rim lock shoulder screws 106 secured in a rim lock nut 105 molded into the rim recess. A half spherical socket nipple nut 151 is mounted in the rim connect 235. The nipple nuts 151 rotate in their mounting journals which are parallel to the spokes and mirrored about the centerline but mounted in the same horizontal plane.

Figure 54:
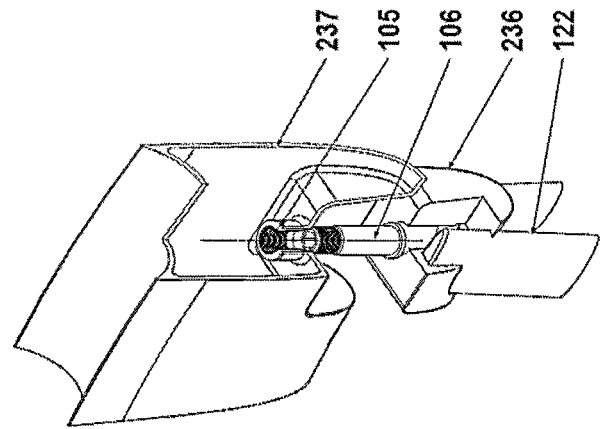
FIG. 54 is a partial cutaway perspective view of a rim connecting arrangement according to another embodiment.

FIG. 54 shows an interchangeable molded counter-bored bottom rim mount 236 attached to rim 237 by a single rim lock shoulder screw 106 mounted directly in the center of rim connect 236. The rim lock nut 105 is molded into the rim connect recess accommodating the shoulder of a rim lock 106, which self-aligns and locks when fastened. The lead in thread and shoulder of the rim lock screw 106 eliminates any the lateral movement when fastened and locked in a counter bored mounting journal at the top so that a spoke is attached on the opposite end.

Figure 57:
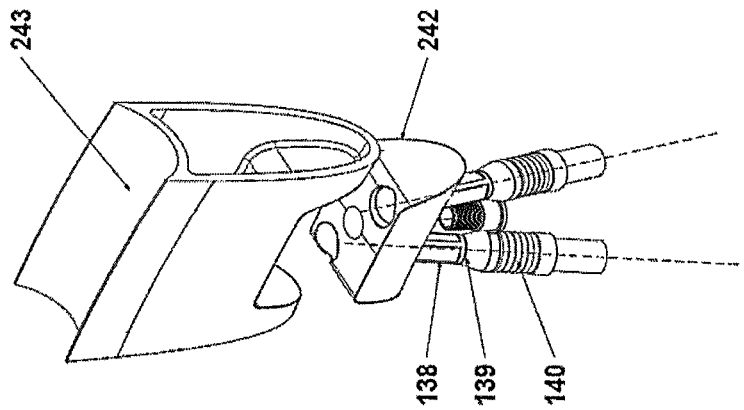
FIG. 57 is a partial cutaway perspective view of a rim connecting arrangement according to another embodiment.
Figure 56:
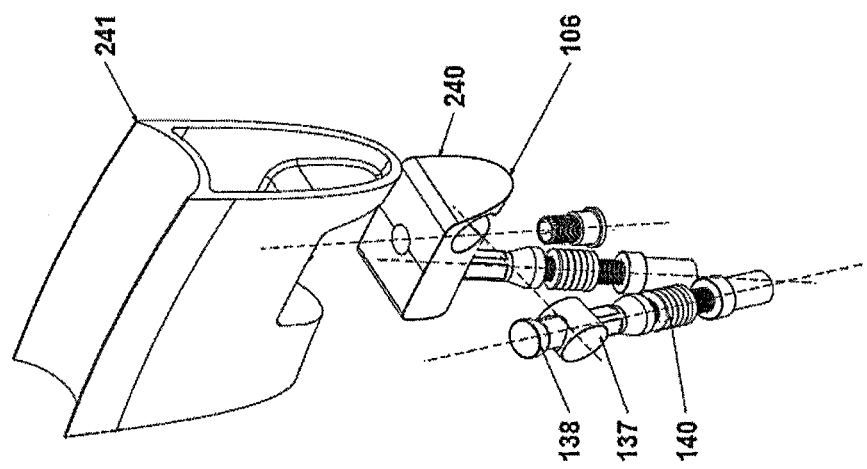
FIG. 56 is a partial cutaway perspective view of a rim connecting arrangement according to another embodiment.
Figure 55:
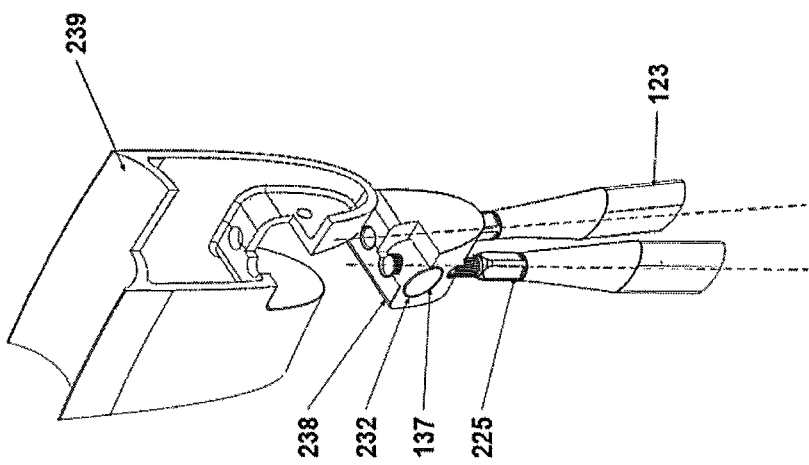
FIG. 55 is a partial cutaway perspective view of a rim connecting arrangement according to another embodiment.

FIG. 55 illustrates an interchangeable molded rim mount 238 attached to rim 239 within a matching dove tail recess. The rim mount 238 is adhesively mounted within the recess. FIG. 56 shows an interchangeable molded counter-bored bottom rim mount 240 attached to a rim 241 by rim lock shoulder screws 106 and secured in a rim lock nut 105 molded into the rim socket. The spoke connections in this are detachably crossed over. Flexible or fixed pivot connection can be applied and are explained in previous embodiments. FIG. 57 also shows an interchangeable molded counter-bored bottom rim mount 242 attached to a rim 241 by rim lock shoulder screws 106 and secured in a rim lock nut 105 molded into the rim socket. The spoke connections in this are fixed crossed over connection types.

Figure 58:
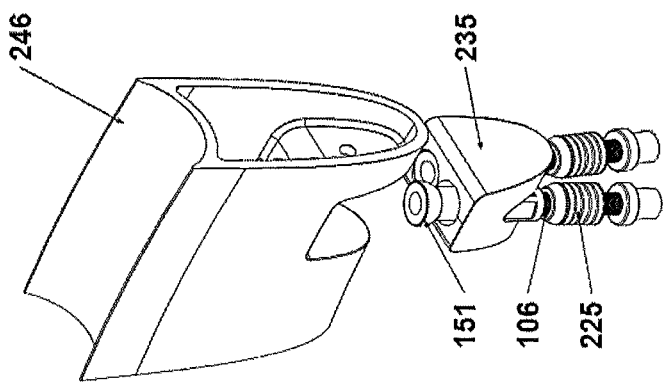
FIG. 58 is a partial cutaway perspective view of a rim connecting arrangement according to another embodiment.

FIG. 58 shows a bottom rim mount 235 that is a compact one-time mounting system applied at the manufacturing assembly. A rim 246 has a dovetail recess which can accommodate spoke mount 151 or alternatives. This can only be installed in the manufacturing cycle as a one-time adhesively bonded and permanent connected to rim 246.

Figure 59:
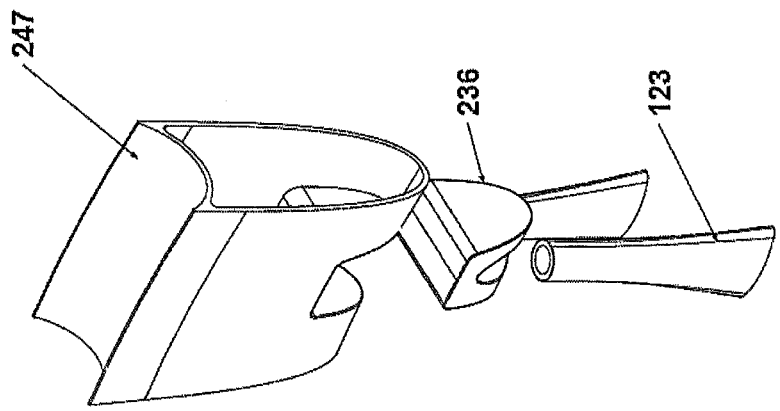
FIG. 59 is a partial cutaway perspective view of a rim connecting arrangement according to another embodiment.

FIG. 59 also has a similar bottom rim mount 236 that is again a compact one-time mounting system applied at the manufacturing assembly. Rim 247 has a dovetail recess into which rim mount 236 is permanently mounted. Carbon profiled spokes 123 are adhesively mounted in reciprocal parallel sockets molded or machined in rim mount 236.

Figure 60:
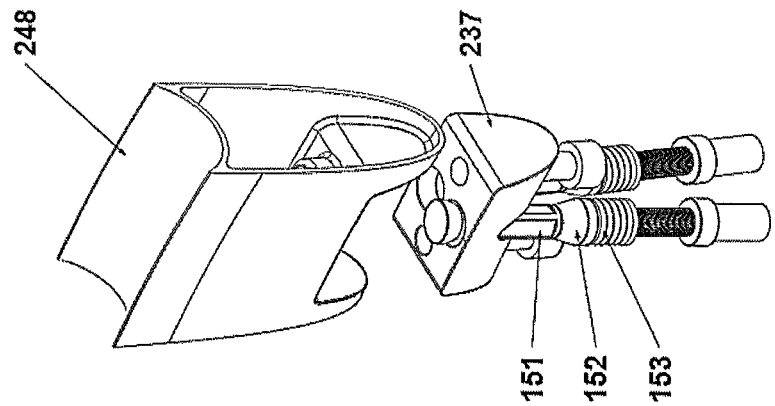
FIG. 60 is a partial cutaway perspective view of a rim connecting arrangement according to another embodiment.

FIG. 60 shows a bottom rim mount 237 which is a compact detachable mounting system using two cap screws as a connection to rim 248 in a dovetail recess which can accommodate spoke mount 151 or alternatives. Tension spring 153 and lock nut 152 set a pretension allowing rim mount 237 a freedom movement in the connection centering and connection process to rim 248.

FIG. 61 has a rim mount 224 that allows for an interchangeable self-tensioning spoke connection system. Rim 226 has a dovetail recess and wraparound shoulder. Rim mount 224 is applied in the same manner as explained in previous embodiments but specifically accommodates conventional bicycles spoke connection systems.

Figure 62A:
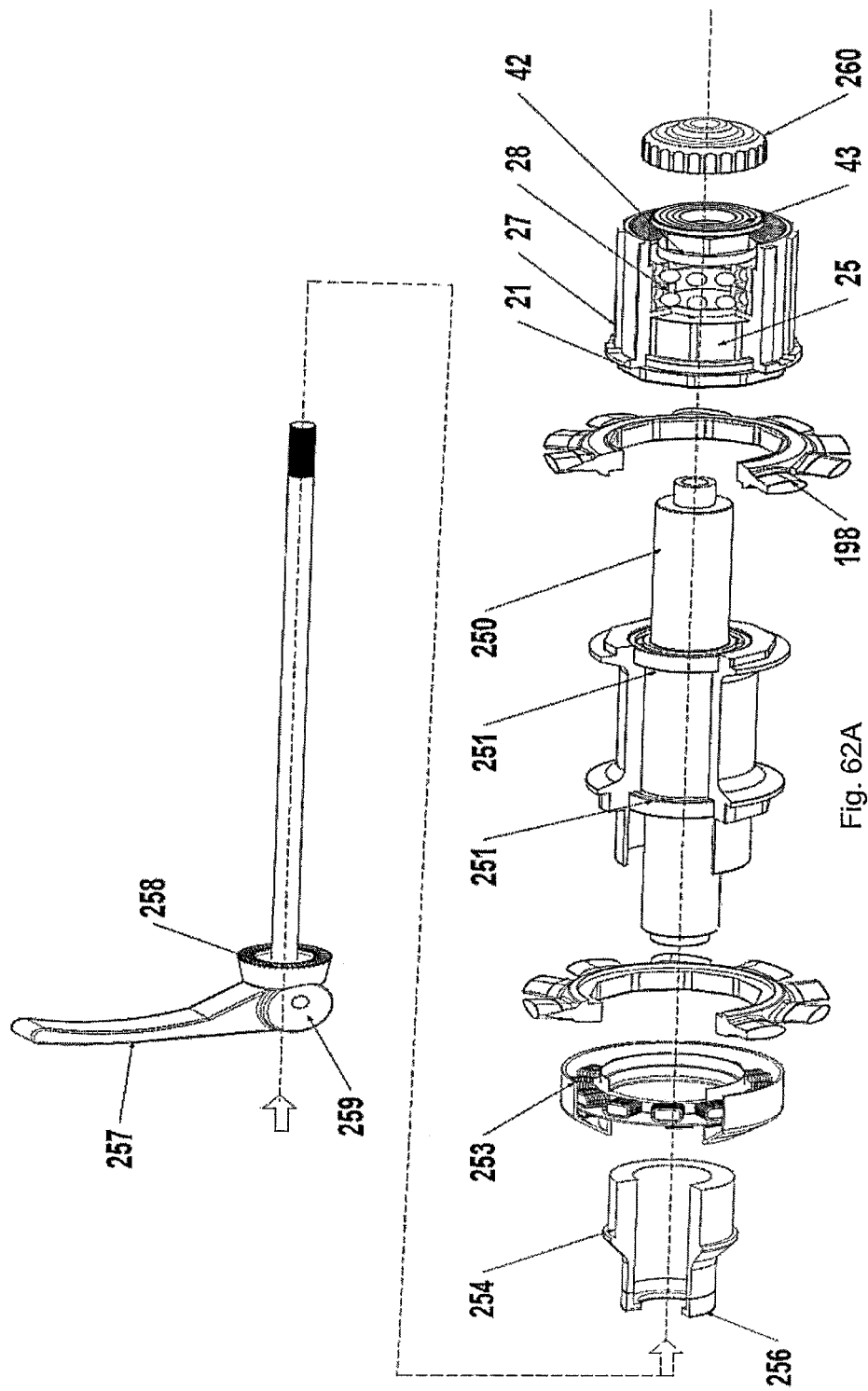
FIG. 62A is a perspective exploded cut away view of the axle assembly of FIG. 62.

FIGS. 62 and 62A illustrate the incorporation of embodiments of the above described elements into a conventional quick release system. The hub 251 has bearings mounted in bearing journals at each end allowing a hollow drive shaft 250 rotates inside the bearings. Hub 251 also has a dodecagon flange at each end that holds a reciprocal single spoke mount flange 198. The freewheel drive components explained in the previous embodiments of FIGS. 1-3 are interchangeable with a standard wheel design. The standard quick release center axle 285 passes through the hollow axle 250 and the cam lock 259 and activation leader 257 provide a clamping force to the bicycle frame when lock nut 260 is adjusted for maximum clamping tension. A modular wheel sensor power generator 253 applied to the wheel axle 250. The wheel sensor and generator are also explained in other embodiments.

Figure 63:
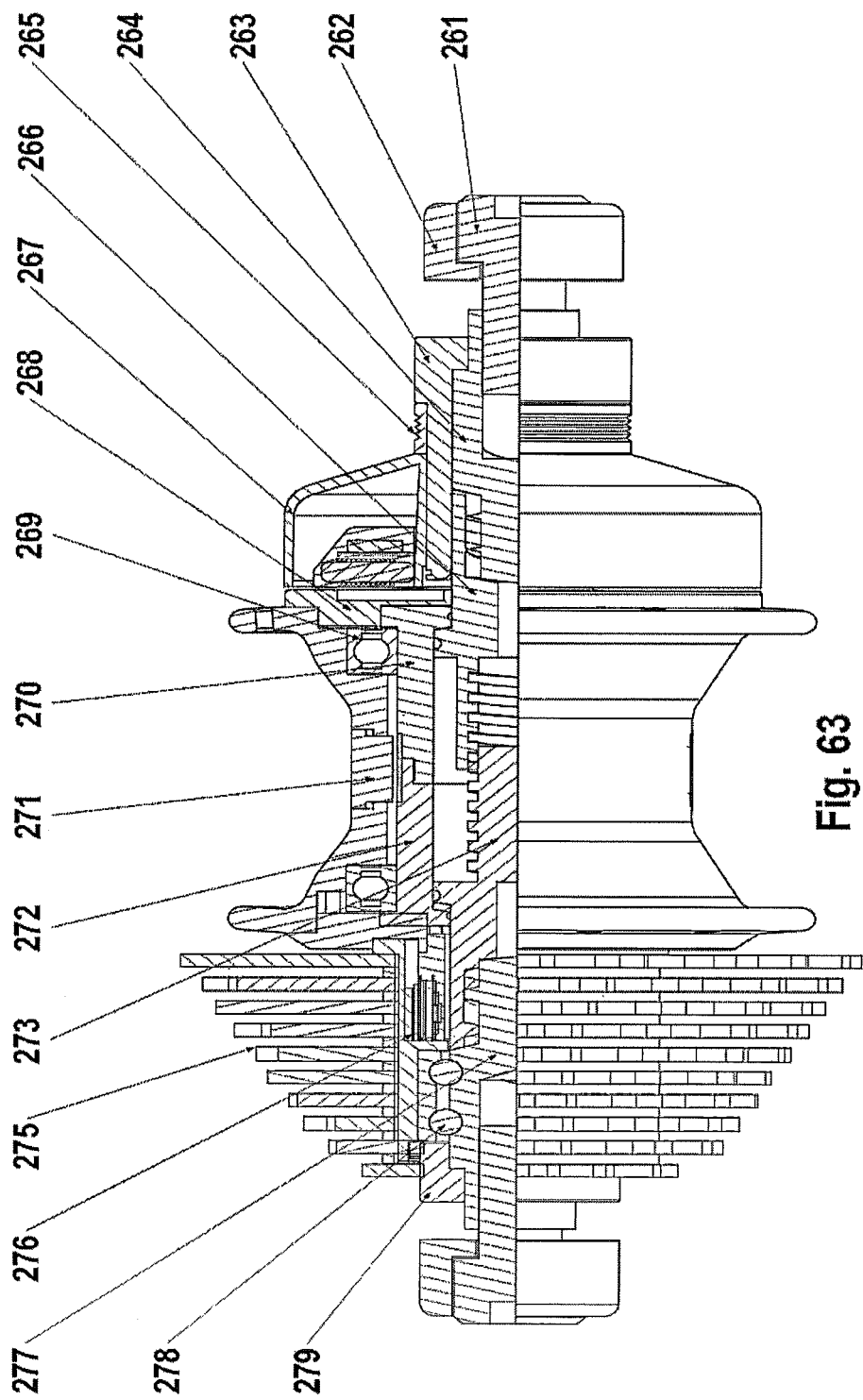
FIG. 63 is a partial cutaway view of an axle assembly according to another embodiment.
Figure 63A:
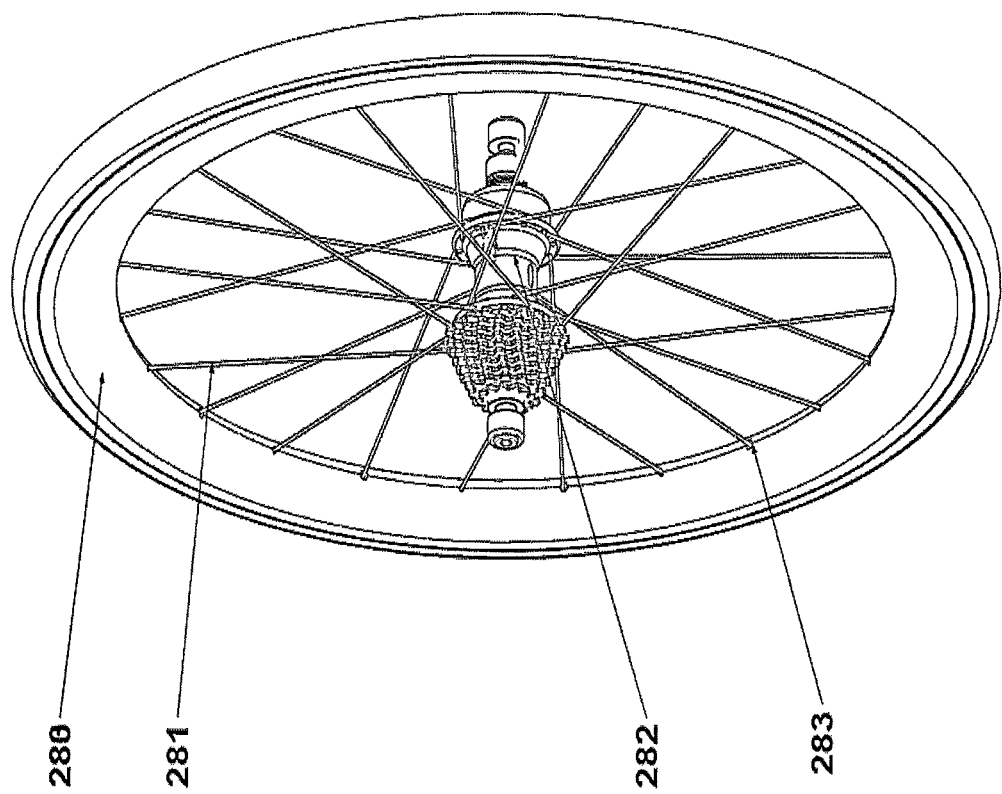
FIG. 63A is an assembly view of a wheel incorporating the axle assembly of FIG. 63.

FIG. 63 illustrates a solid body hub 275 with an internal bearing journal and integrated spoke flange for conventional through-hole wire rivet head spokes. The split hub collet 272 and 270 comprises of a two-part center threaded interlocking bearing sleeve with an internal retaining flange. The bearings 269 are located between hub 275 and the split collet 272 and 270. Hub lock 266 is retained inside the hub collet 270 and the internal female thread engages with the opposing hub lock 273 also is retained by the opposite hub collet flange. The hub lock screws on the opposite end of hub lock 266 when extended interconnect with the axle lock 265 and the opposing drive axle lock 277 interlocks with the hub lock 273. When the lock actuator 271 is engaged the hub collet 272 and 270 the hub is locked to the hub collet allowing wheel rotation extend both internal hub locks so that they both axle threads to 77 and 264 are in the locked or unlocked. The frame axle 264 assembly is mounted to a bike frame. The drive axle 277 is also fastened to the bike frame. The freewheel drive components explained in the previous embodiments of FIGS. 1-3 are interchangeable with a standard wheel design. A universal power generator and wheel sensor 267 can be applied to the frame axle for the purposes of generating power and sensory feedback to the wheel.

Figure 64:
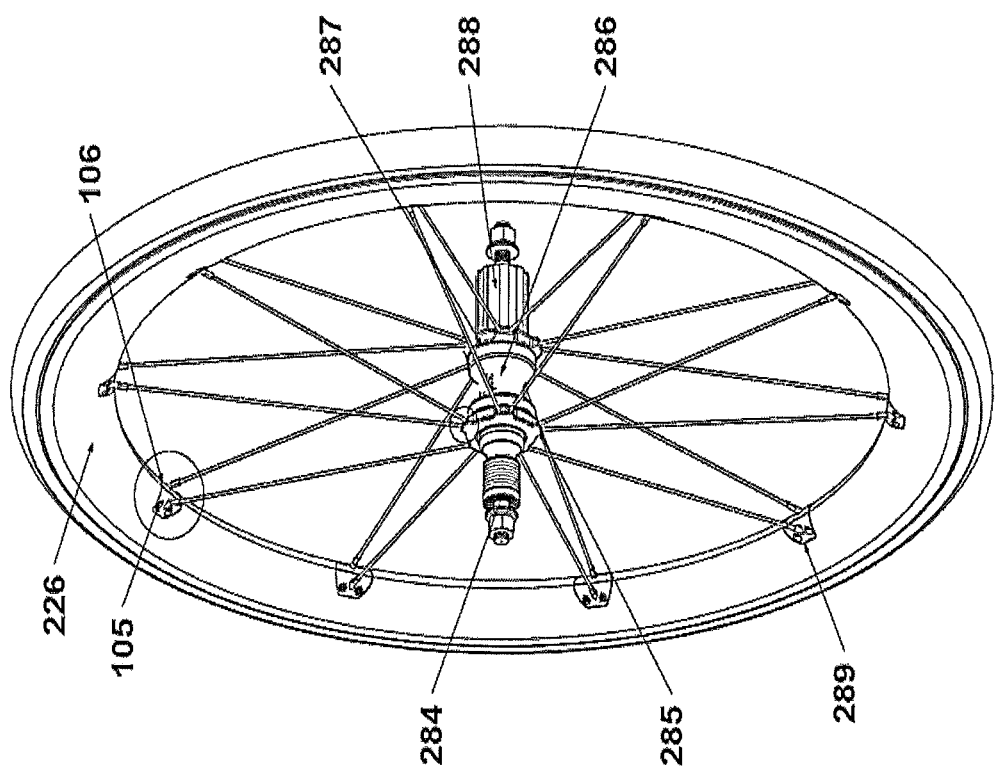
FIG. 64 is an assembly view of a wheel incorporating a spoke arrangement according to an embodiment.
Figure 64A:
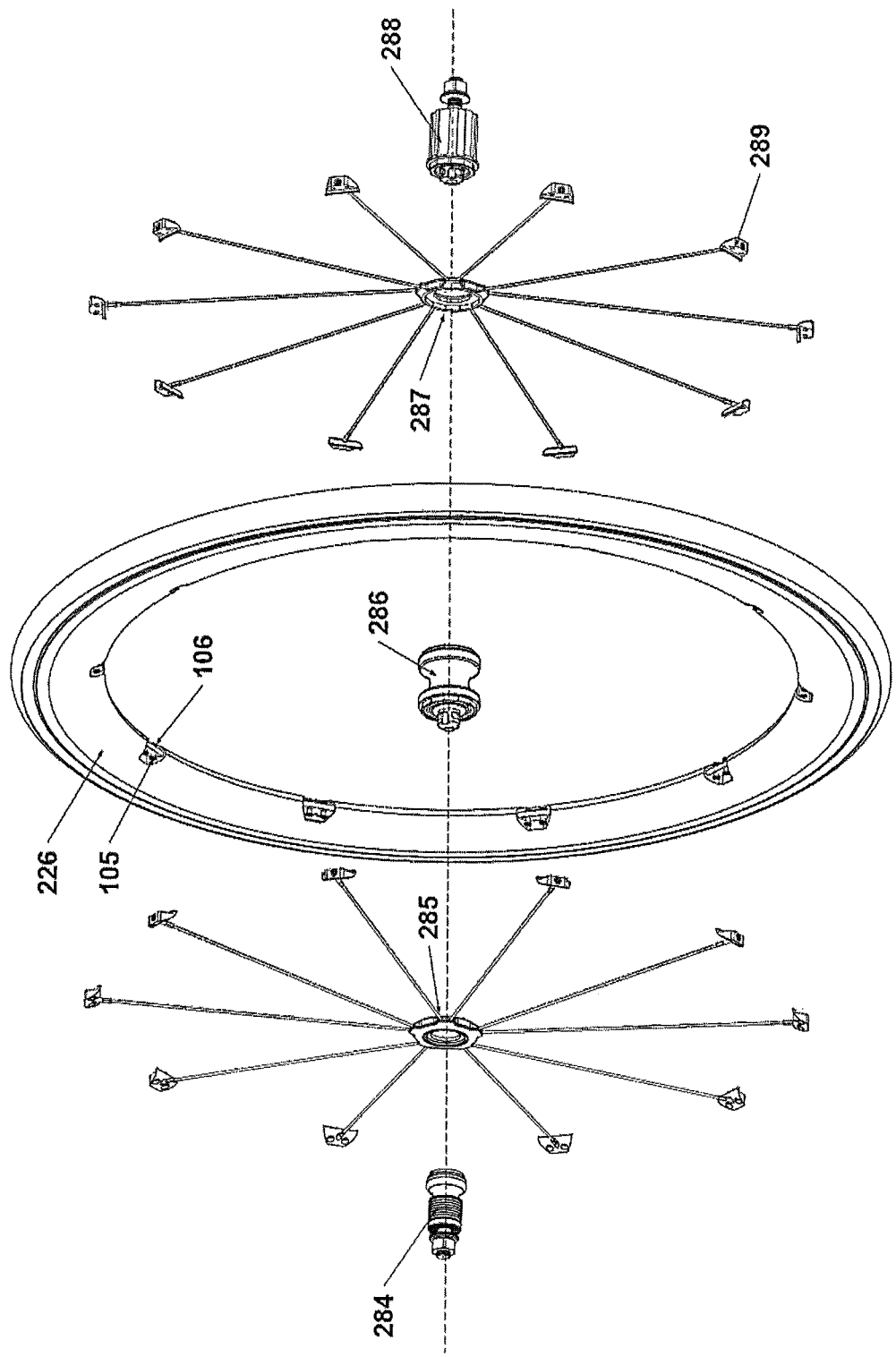
FIG. 64A is a perspective exploded view of the wheel of FIG. 64.
Figure 65:
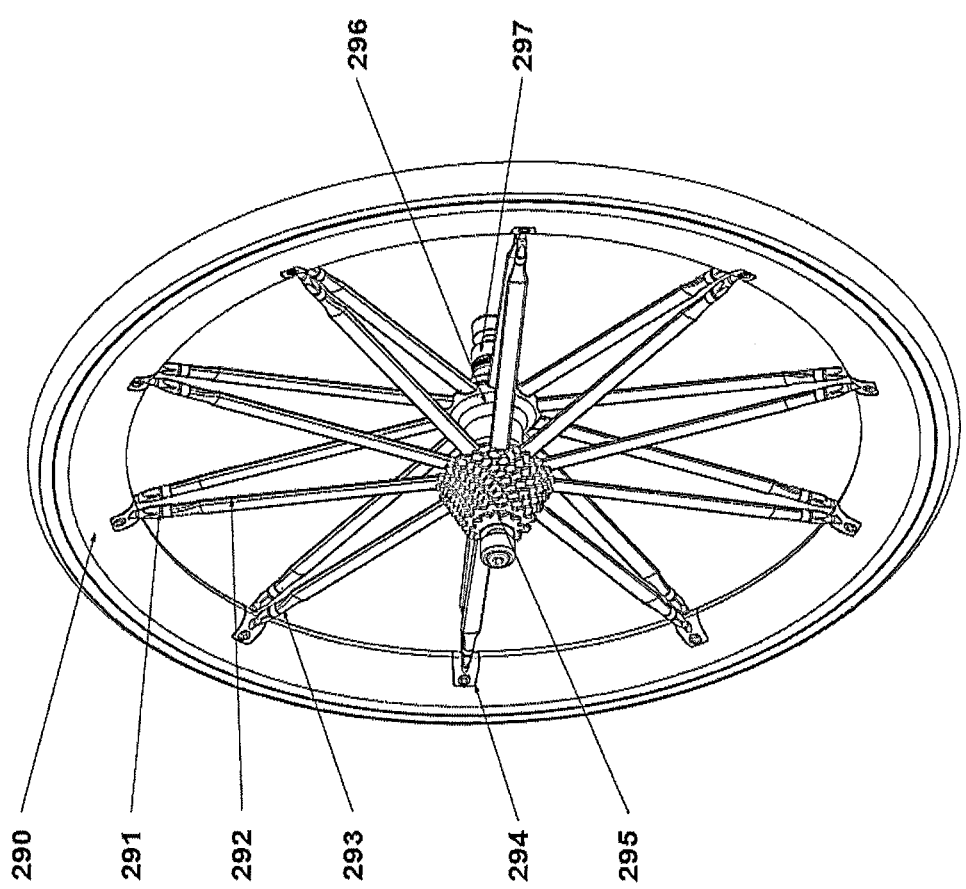
FIG. 65 is an assembly view of a wheel incorporating a spoke arrangement according to another embodiment.
Figure 66:
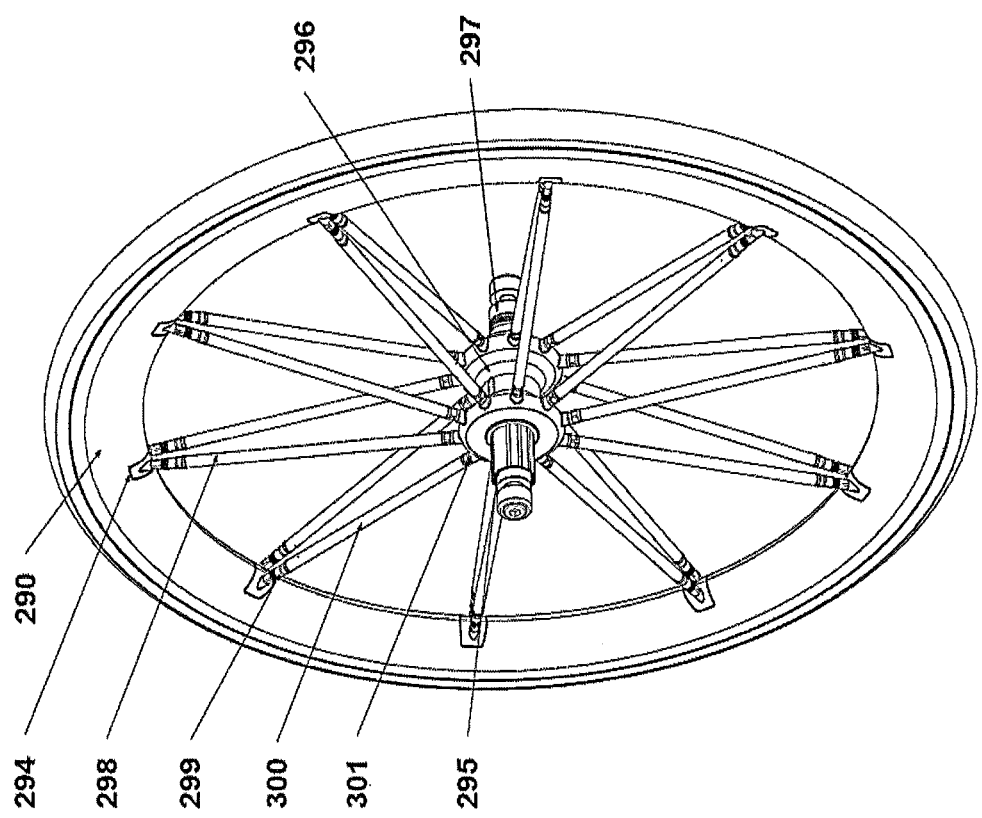
FIG. 66 is an assembly view of a wheel incorporating a spoke arrangement according to another embodiment.

FIGS. 64-74 illustrate a variety of spoke embodiments that may be used with the various embodiments of the components described herein. In FIG. 64, the interchangeable single spoke and wheel system is made up of the hub assembly 286, the frame axle assembly 284, the drive axle assembly 288, the single spoke assembly 289, and interchangeable bicycle rim 226, as described above. The bicycle hub assembly 286, single spoke assembly 289, have male and female interconnecting decagon, which allow interchangeable single spoke assembly 289 to be applied to a hub, and fixed to the rim 226 using rim lock 105 and 106 shoulder screws to attach the spokes to the rim 226. The bicycle wheel consisting of a rim 226, hub assembly 286, and a single spoke assembly 289 are assembled into a connectable bicycle wheel. Drive axle assembly 288 is mounted to the drive side of the bicycle frame and provides the mounting point for a free wheel drive sprocket which can remain engaged. The frame axle assembly 284 is fastened to the opposite side of the frame. FIG. 64 illustrates an endless spoke as described above. The endless spoke eliminates the need for spoke crossover and connects to a hub flange 285 with no mechanical stress points associated with individual flair ended spoke connections. This endless spoke connection method has increased tension loading capacity allowing hub 286 to be narrower in construction. The parallel mirrored spoke set uses a common center rim connection. The parallel and mirrored spoke connections are spaced 1 cm apart which increases lateral load stability of the wheel while maintaining a narrow hub configuration. A narrow hub assembly 286 decreases the aerodynamic frontal area while maintaining equivalent stability to a conventional wheel. Production assembly reduces the endless spoke inventory by half and once assembled into a single spoke component minimizes the production assembly process FIG. 65 illustrates a profile carbon tubular spoke 292 that is permanently and adhesively attached at its root connection point on a hub flange 296 and has a profile to round transition 291 at the rim connect 294 connections. The rigid root insertions of carbon spokes 292 provide higher torque root connection eliminating spoke and mechanical stress. This method also enables angular root connections and increasing aerodynamic performance, spoke tension and loading capacity. This narrow hub assembly 286 has a parallel mirrored spoke set with common center rim root connections spaced 1 cm apart for increase lateral load stability built into the a narrow hub configuration and reduces aerodynamic frontal area while improving lateral stability. Production assembly is minimized once assembled into a single spoke component.

FIG. 64 illustrates a round carbon tubular spoke 300 which can be connected using a variety of rigid connection methods described in previous embodiments. These rigid connections methods deliver fixed mechanical root connection for maximum mechanical strength as well as increasing aerodynamic performance, spoke tension and loading capacity. This narrow hub assembly 296 has a parallel mirrored spoke set with common center rim root connections spaced 1 cm apart for increase lateral load stability built into the a narrow hub configuration and reduces aerodynamic frontal area while improving lateral stability.

Figure 67:
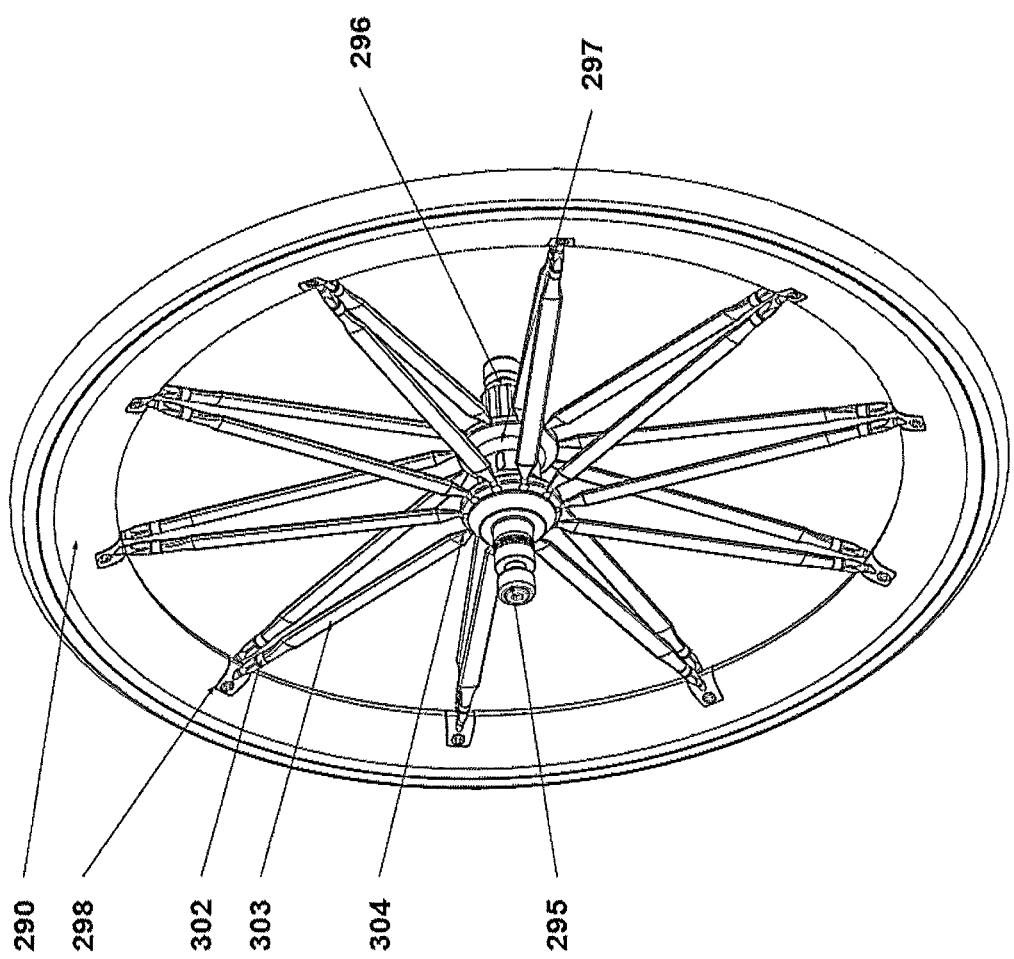
FIG. 67 is an assembly view of a wheel incorporating a spoke arrangement according to another embodiment.

FIG. 67 illustrates an aerodynamically profiled carbon tubular spoke 303 which can be connected using a variety of connection methods described in previous embodiments. These connections methods can deliver fixed or pivoting mechanical solutions for applications requiring elasticity, rigidity, or strength. Soft and hard connections at each end of the spoke combined with angular root connections and increasing aerodynamic performance, spoke tension and loading capacity. This narrow hub assembly 296 has a parallel mirrored spoke set with common center rim root connections spaced 1 cm apart for increase lateral load stability built into the a narrow hub configuration and reduces aerodynamic frontal area while improving lateral stability.

Figure 68:
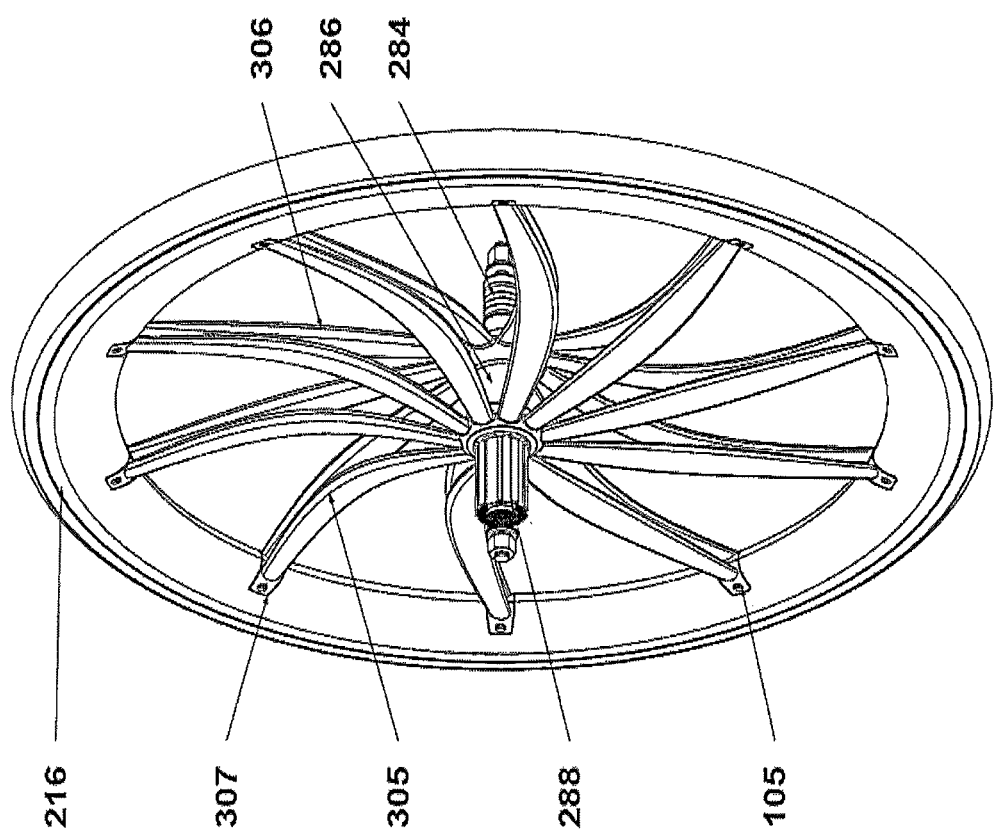
FIG. 68 is an assembly view of a wheel incorporating a spoke arrangement according to another embodiment.
Figure 68A:
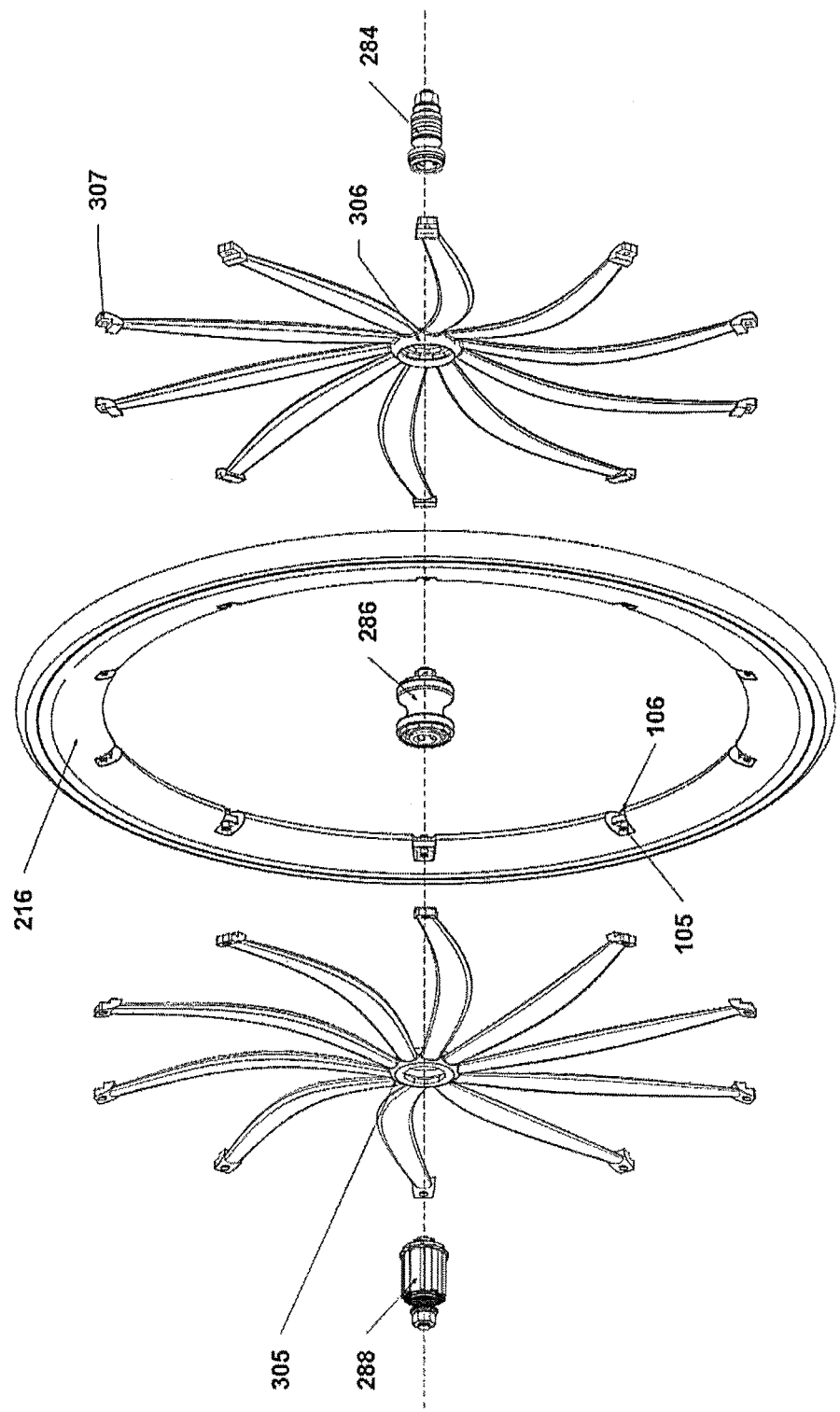
FIG. 68A is a perspective exploded view of the wheel of FIG. 68.

FIGS. 68 and 68A illustrate the use of single curve spokes 306 and 305 that are mirror imaged three dimensionally profiled single shot molded or fabricated spoke elements. Each of spoke 306 and 305 are root connected to a decagon spoke mount flange as described in previous embodiments. Each individual spoke 306 or 305 element can be manufactured individually and adhesively bonded or molded in a singular component. These 3D spokes are aerodynamically optimized for optimum performance and the root attachment on each side of a hub are curved aerodynamically for maximum performance in a forward direction and optimized for minimal aerodynamic drag and frontal area. Three-dimensional horizontal and perpendicular curvature is optimized for different performance conditions requiring the elasticity, aerodynamic drag and horizontal and perpendicular mechanical strength. The rim and hub flange root connection methods deliver fixed mechanical connectivity but rely on the carbon fiber material properties to deliver elasticity, rigidity, or strength characteristics to meet design specific solutions. Narrow hub assembly 286 provides pre-stressed spoke conditions and eliminate rim alignment and spoke tensioning. FIG. 68A illustrates how hub assembly 286 and single spoke 307 can be connected to rim 216.

Figure 69:
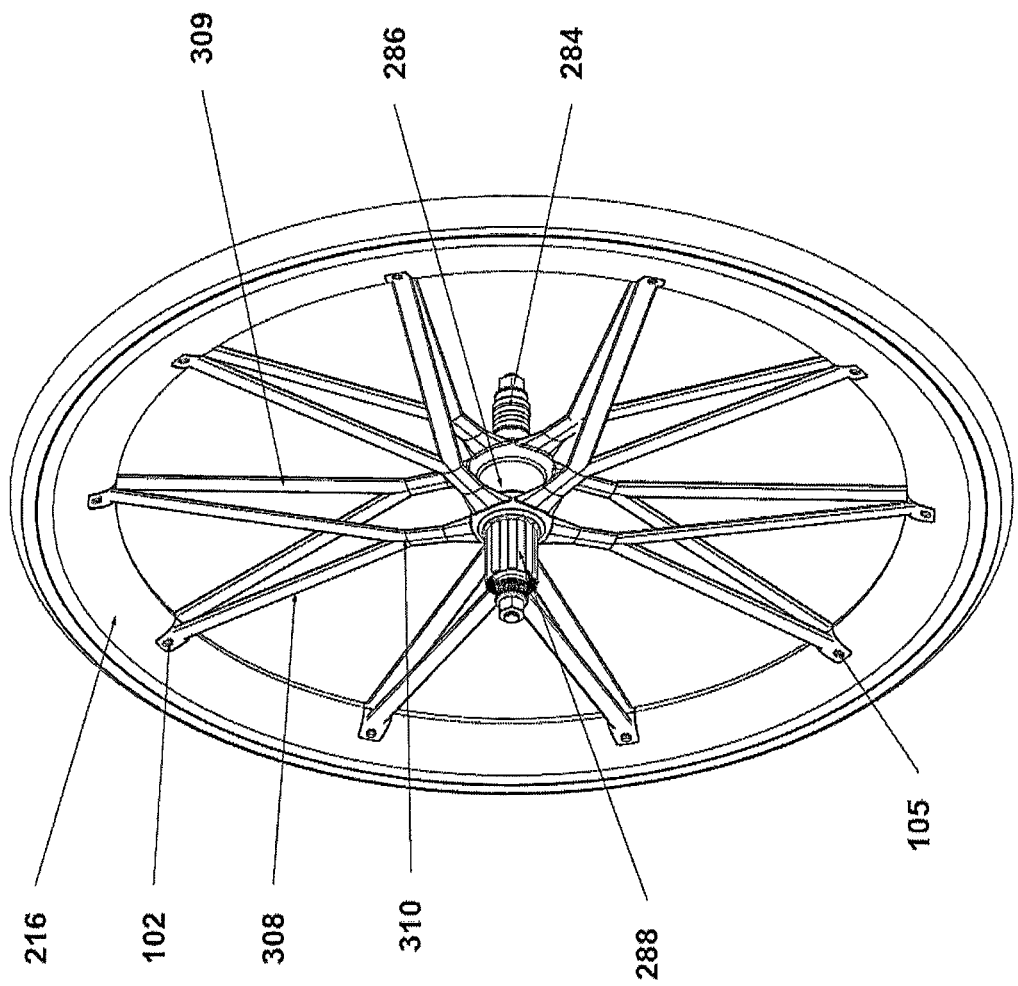
FIG. 69 is an assembly view of a wheel incorporating a spoke arrangement according to another embodiment.

FIGS. 69 and 69A illustrate a webbed spoke 308 which is an integrated single shot or two-part molded or fabricated single spoke element where the spoke root mount 310 is a decagon shaped flange as described in previous embodiments. The webbed spoke 308 element is a fork spoke where the spoke mount root 310 is a single spoke which divides into two branches that are angled so that each branch spoke is attached to a rim mount 216 at two different rim 105 connection points. The webbed spoke 308 can be molded or fabricated in such a way that a rim mount 311 can be adhesively bonded to a spoke 308 or molded as a complete integrated single component. These webbed spokes 308 are aerodynamically optimized for root attachment on hub flange elasticity, aerodynamic drag, horizontal, perpendicular and mechanical strength. The rim root connection deliver fixed mechanical connectivity but rely on the carbon fiber material properties to deliver elasticity, rigidity, or strength characteristics to meet design specific solutions. Narrow hub assembly 286 provides pre-stressed spoke conditions and eliminates rim alignment and spoke tensioning. FIG. 69A illustrates a connection method of webbed spoke 307 with modular and interchangeable hub assembly 286 and rim 216.

Figure 70:
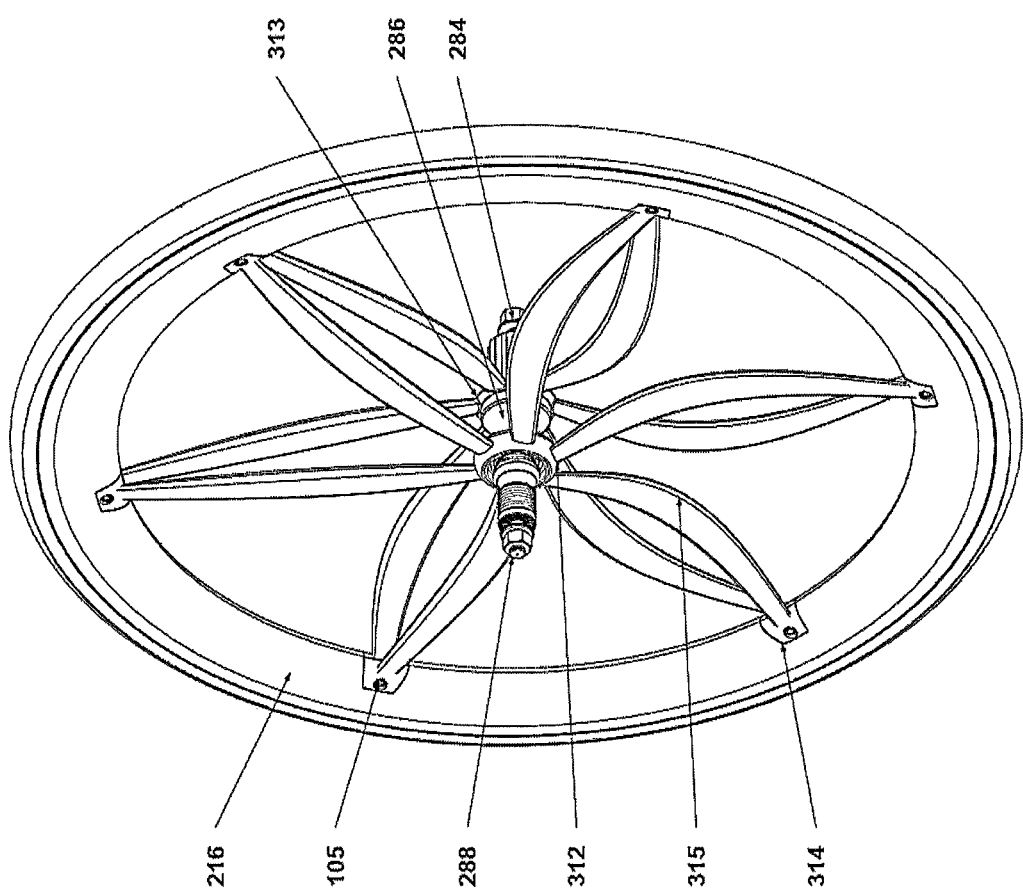
FIG. 70 is an assembly view of a wheel incorporating a spoke arrangement according to another embodiment.
Figure 70A:
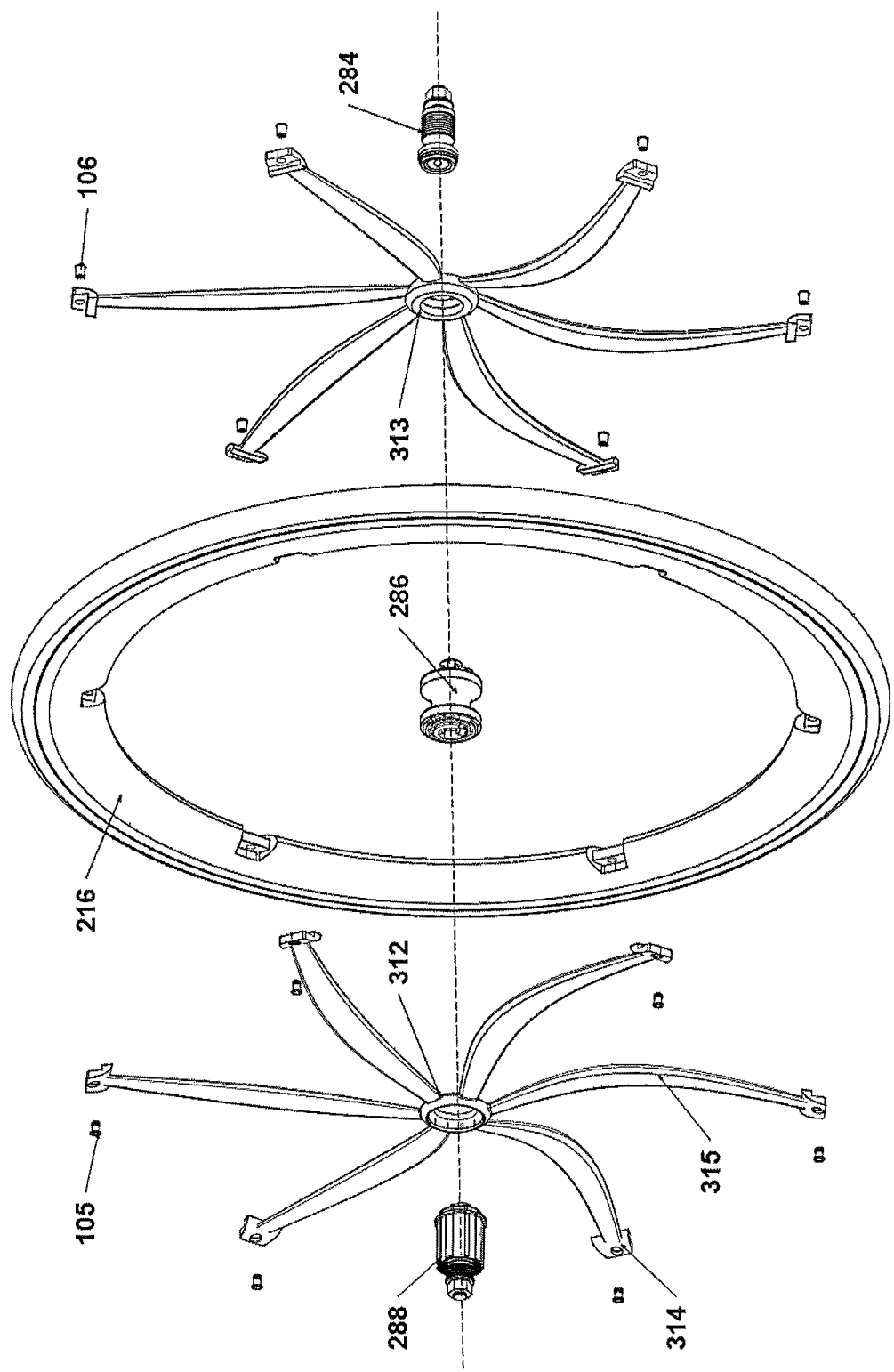
FIG. 70A is an exploded perspective view of the wheel of FIG. 70.
Figure 71:
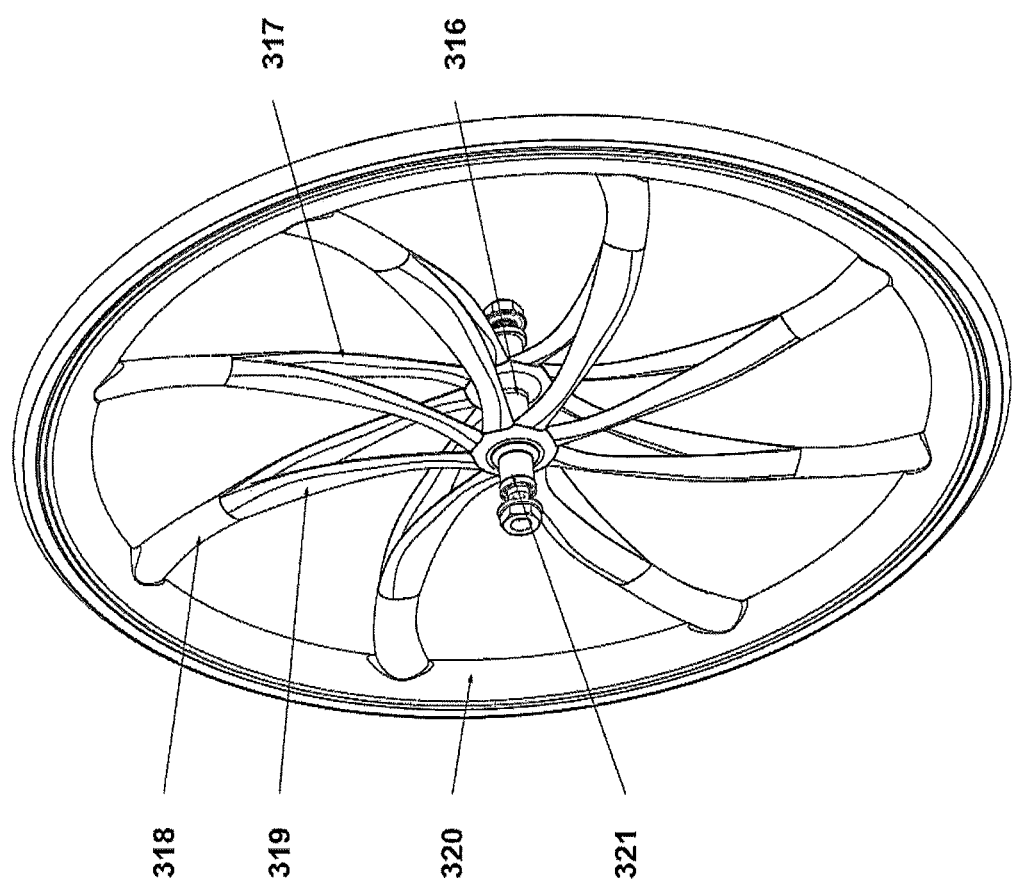
FIG. 71 is an assembly view of a wheel incorporating a spoke arrangement according to another embodiment.

FIGS. 70 and 70A illustrate a 3D aero single spoke 315, which is a three dimensional aerodynamically opposed curved spoke pair arranged in a configuration where the right-hand spoke is mirrored image and 180° phase shifted from its left-hand counterpart for the purposes of aerodynamic cancellation effect occurring as the laminar flow passes over the leading edge of the leading and trailing edge of each spoke. The rim and hub connections can be fabricated or molded into alternative connection styles illustrated in previous embodiments. Interchangeable rim systems accommodate a range of connection systems also described in previous embodiments. The manufacturing method incorporates a single shot molded or fabricated single spoke that can be individually adhesively connected through a socket mount as described in alternative construction methods previously described. The 3D aero spoke 315 also includes an integrated and interchangeable decagon spoke mount as described previously in other embodiments. The mechanical properties of the 3D spoke 315 utilize carbon fiber material properties to optimize the balance curvature geometry of the spoke element between the hub and rim root of spoke 315 in the X, Y and Z planes. Horizontal X axis curvature provides maximum lateral stability and perpendicular Y axis elasticity, spoke tension, and optimized aerodynamic drag. The curvature in the Z direction provides a sweeping curve emanating from the hub connection in a swept curve which connects at the rim. The airfoil profile of the leading edge of the leading and trailing spoke 315 is curved in a forward direction and is broader at the middle to facilitate vertical compression loads in the perpendicular Y axis direction and minimize nonlinear drag effect and proportionately balance the nonlinear laminar air velocity flowing over the entire airfoil spoke 315 surfaces. The equation between forward, side and rotary surface airflow are mathematically balanced and determine the aerodynamic optimization of a curved surface element and the dynamic surface air velocity conditions present at the hub and rim connection rotating surfaces. The performance characteristic of a wheel system influences the shape of the surface which is calculated for maximum mechanical and structural integrity. The spoke 315 shape is broader at its center than at its hub or rim root connections and its material properties, fabrication, lamination and curing process to regulate spoke tension, rigidity, mechanical strength. Reduced aerodynamic frontal area, wind drag minimization, elastomeric suspension, vertical down forces, dampen the bicycle wheel rolling force and road surface drag allowing a lighter bicycle rim design. The 3D spoke 315 can be molded or fabricated in such a way that a rim mount can be adhesively bonded or molded as a complete integrated single component. Narrow hub assembly 286 provides pre-stressed spoke conditions and eliminates rim alignment and spoke tensioning. FIG. 70A illustrates a method of connecting the 3D spoke 315 with a hub assembly 286 and rim 216. FIG. 71 illustrates an interchangeable 3D fork spoke 318 that has three dimensional aerodynamically profiled individually curved spokes 317, 319 mirrored about a center plane so that each individual spoke is connected at the rim and follows a 3D curve so that left 317 and right hand 319 spokes intersect. At this intersection the mirrored left 317 and right 319 spokes merge into a single spoke creating a forked connection 318. The single and forked junction point is the rim root connection point and follows the same three-dimensional profile. This spoke root mounting point 318 can be merged with a rim 320 or use an interchangeable rim lock attachment or connectivity for the purposes of single spoke interchangeability, fastening, auto or manual tensioning systems as described in previous embodiments. Both spokes 317 and 319 are curved aerodynamically and transition and merge into a single rim root connection 318 allowing the horizontal X axis curvature of spokes 317 and 319 to have minimal aerodynamic frontal area elastomeric suspension damping of vertical structural forces passed on the rim 320. The Z axis or vertical and backward swept curvature of the merged spoke 317 and 319, when merged with 318 aerodynamically optimized to ensure that the air velocity at the spoke root and hub mounts are proportional to the nonlinear air surface velocity across the entire aerodynamic surface. The materials property, lamination layups and curing time of the carbon fiber material balances and defines the dynamic performance characteristics which deliver optimization, elastomeric suspension damping and structural integrity which is mathematically calculated between the axial, radial, vertical and horizontal loads conditions imposed by forward, side and vertical loads imposed at the bicycle rim 320.

Figure 72:
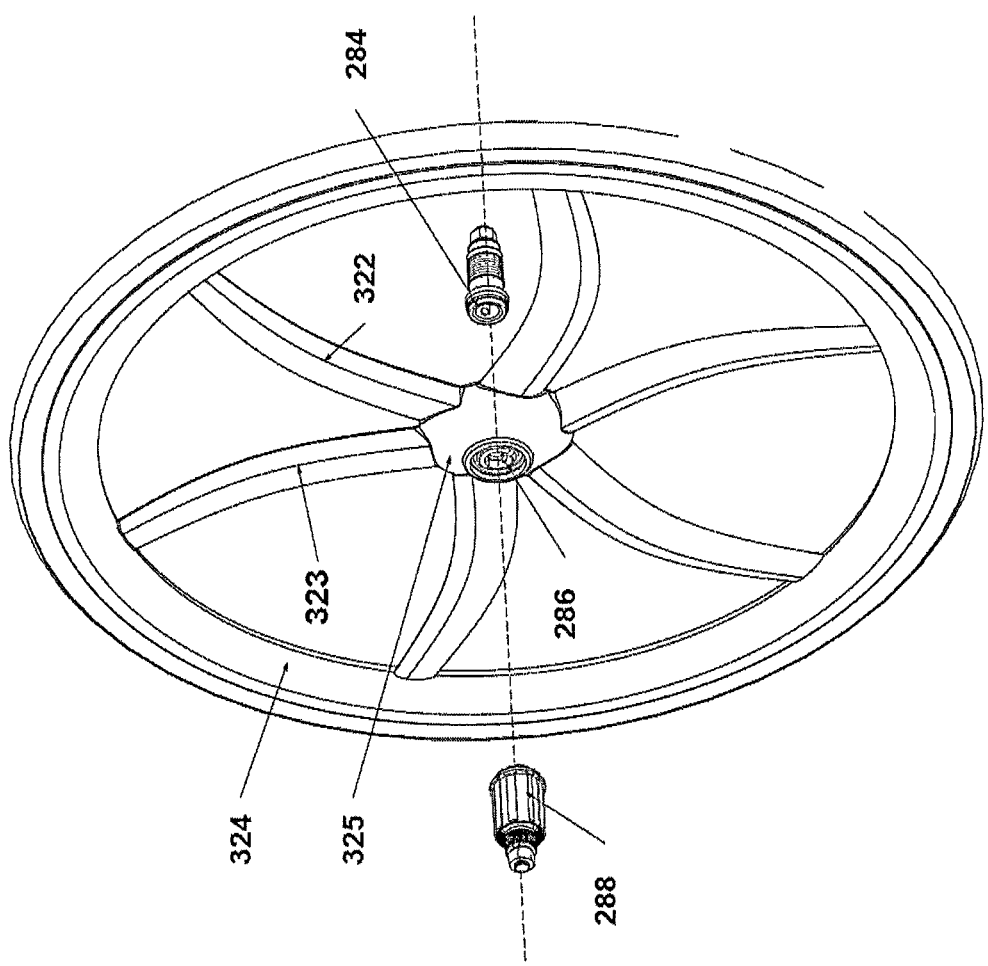
FIG. 72 is an exploded perspective view of a wheel incorporating a spoke arrangement according to another embodiment.

FIG. 72 illustrates another version of an interchangeable 3D aero single spoke. Spokes 323 and 322 are three dimensional aerodynamically opposed curved spokes arranged in a configuration where the leading and trailing spoke is 180° phase shifted from following counterpart for the purposes of aerodynamic cancellation effect. This phenomenon occurs after the laminar air flow passes over the leading spoke 323 surface and then preconditioned for a zero impact when passing the trailing spoke 322, which has a negative aerodynamic sweep. The rim and hub root mounting our fixed point connections which can be fabricated or molded into alternative connection styles illustrated in previous embodiments. This wheel is a solid spoke and rim. The manufacturing method incorporates a single shot molded or fabricated single spoke that can individually adhesively connected through a socket mount as described alternative, construction methods previously described. The 3D aero spoke also encompass integrated and interchangeable decagon spoke mount also described previously in other embodiments. The 3D aerodynamically spoke 323 and 322 curvature utilize carbon fiber material properties to optimize the balance geometry of the mirrored spoke element 323 and 322. Horizontal X axis remains zero and the curvature of the Y axis dynamically and aerodynamically optimized to provide a targeted elasticity, spoke tension, low aerodynamic drag. The curvature in the Z direction provides a sweeping curve emanating from the hub connection in a swept curve which ends at the rim connection. The airfoil profile of the leading and trailing spokes 323 and 322 is curved in sweeping forward direction and is broader at the middle to facilitate vertical compression loads in the perpendicular or Y axis direction and minimize nonlinear drag effect and also proportionately balance the nonlinear laminar air velocity flowing over the entire airfoil spoke 323 surfaces. The following spoke has the opposite equation resulting in the cancellation of fact. Both spokes 323 and 322 are optimize using an equation between forward, side and rotary surface airflow are mathematically balanced and determine the aerodynamic optimization the positive and negative curved surface element and the dynamic surface air velocity conditions present at the hub and rim root rotating surfaces. The performance characteristic of a wheel system influences the shape of the surface which is calculated for maximum mechanical and structural integrity. The spoke 323 and 322 shapes are broader at its center than at its hub or rim root connections and its material properties, fabrication, lamination and curing process to regulate spoke tension, rigidity, mechanical strength. Reduced aerodynamic frontal area, wind drag minimization, elastomeric suspension, vertical down forces, dampen the bicycle wheel rolling force and road surface drag allowing a lighter bicycle rim design. The 3D aero spoke wheel is an integrated single shot or two-part molded or fabricated single spoke element where the spoke mounts are integrated and also have a decagon shaped flange as described in previous embodiments. The 3D aero spoke wheel can be molded or fabricated in such a way that a rim mount can be adhesively bonded or molded as a complete integrated single component.

Figure 73:
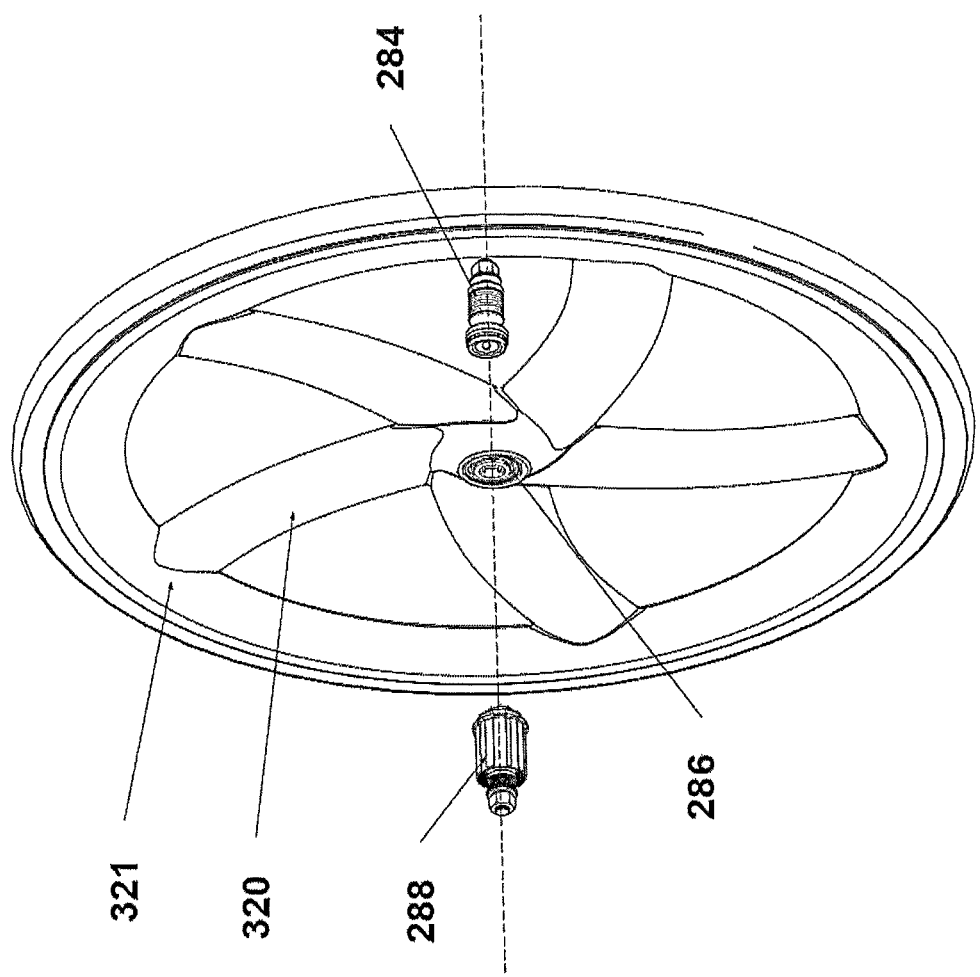
FIG. 73 is an exploded perspective view of a wheel incorporating a spoke arrangement according to another embodiment.

FIG. 73 illustrates a five curve spoke 320 that is an integrated single shot molded or fabricated wheel attached to a decagon spoke mount flange configured for either as an integrated component or an individual spoke mounted on a spoke connect system or alternative. Each curve spoke is a three-dimensional aerodynamically optimized and mirrored profiled spoke where the root attachments on each side of a hub are curved aerodynamically in the same direction. The curve spoke and its mirrored counterpart are connected to a rim 321 using a range of rim mount alternatives.

Figure 74:
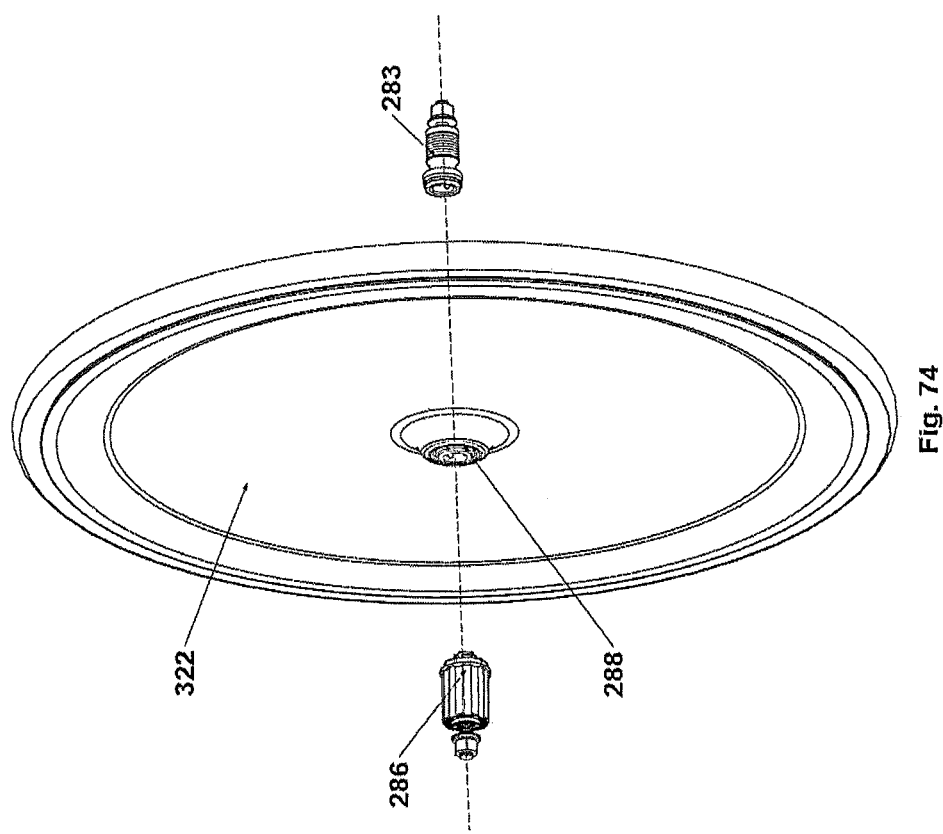
FIG. 74 is an exploded perspective view of a wheel incorporating a spoke arrangement according to another embodiment.

FIG. 74 illustrates a carbon disk wheel 322 that is an integrated single hub and rim molded or fabricated system. This system has an internal decagon spoke mount flange 288 hub and integrated wheel and rim 322 configured as an integrated component or cartridge connect system. The hollow body is aerodynamically optimized and mirrored sides interconnect with an interchangeable free wheel drive axle 286 and frame axle 283.

Figure 75:
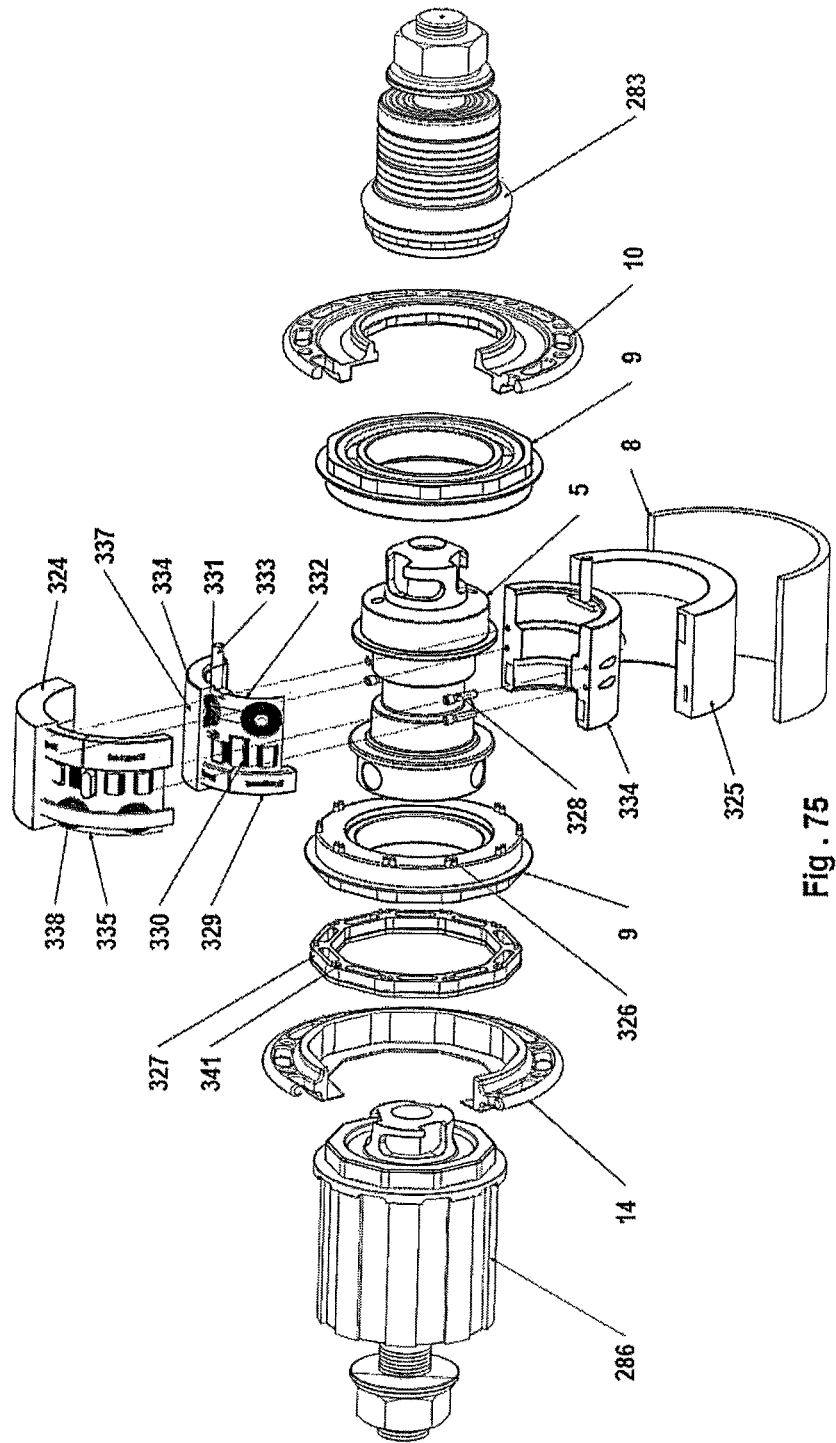
FIG. 75 is an exploded perspective view of an axle assembly incorporating a wheel sensor according to an embodiment.
Figure 75A:
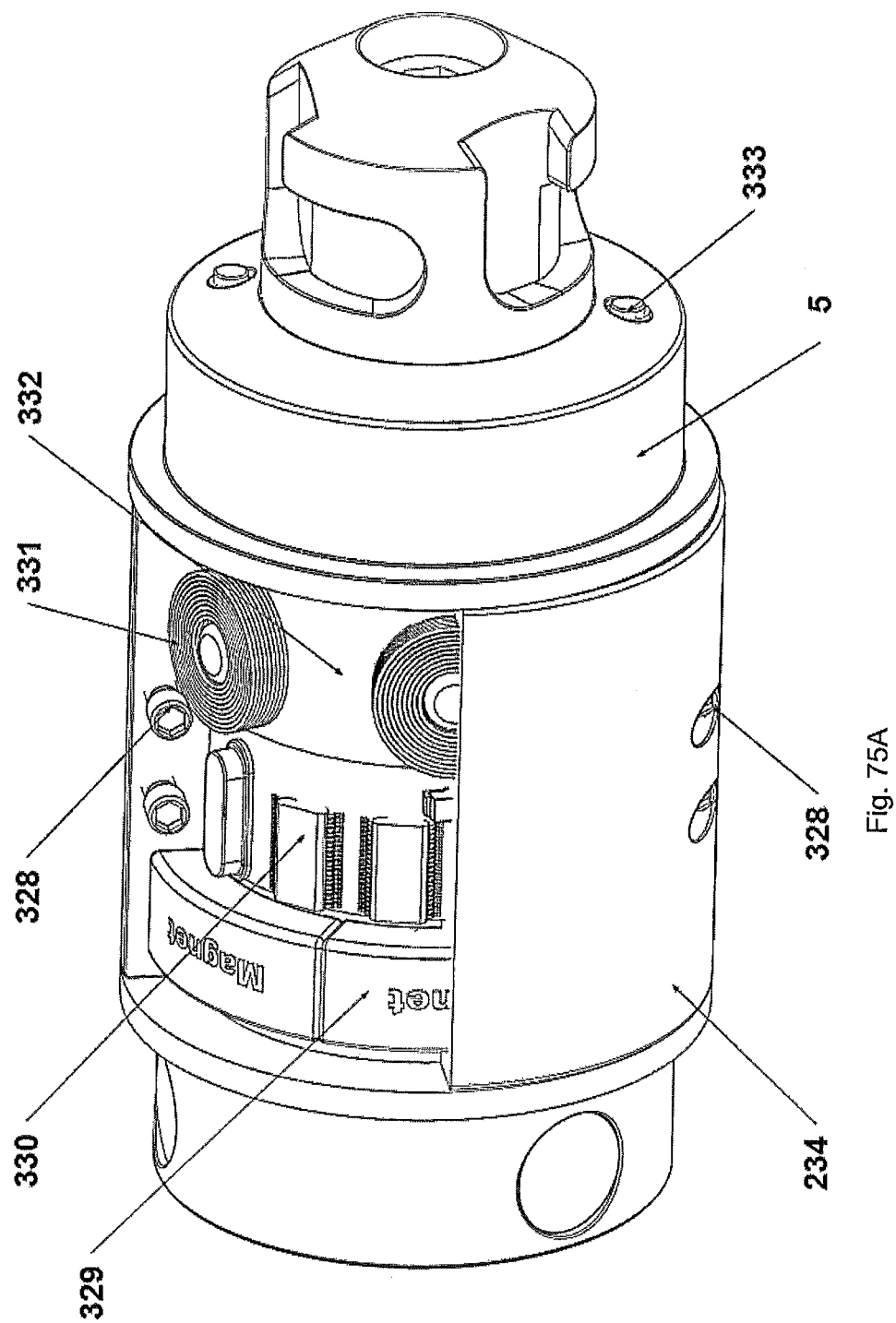
FIG. 75A is a partial cutaway view of a hub collect for use in an axle assembly as in FIG. 75.
Figure 75B:
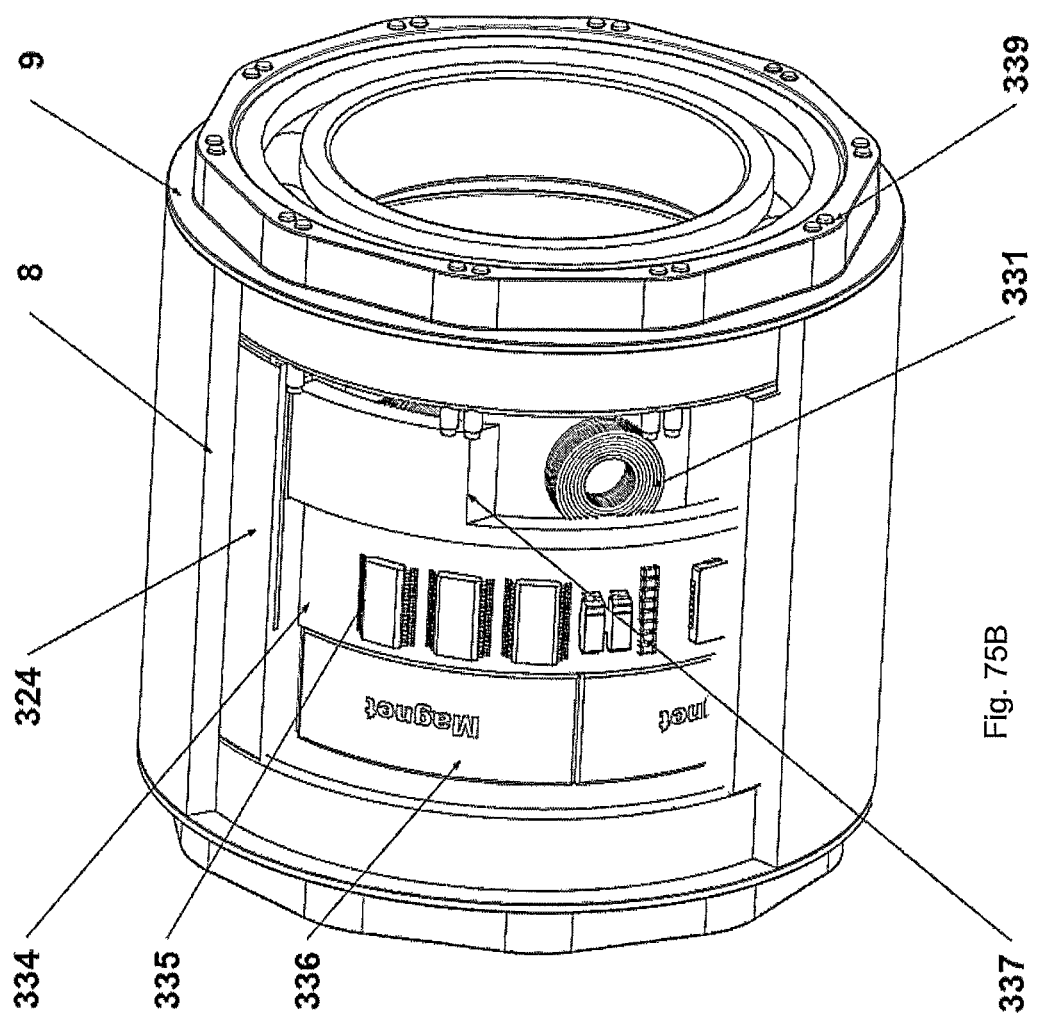
FIG. 75B is invention partial cutaway view of a wheel sensor for use in an axle assembly as in FIG. 75.
Figure 75D:
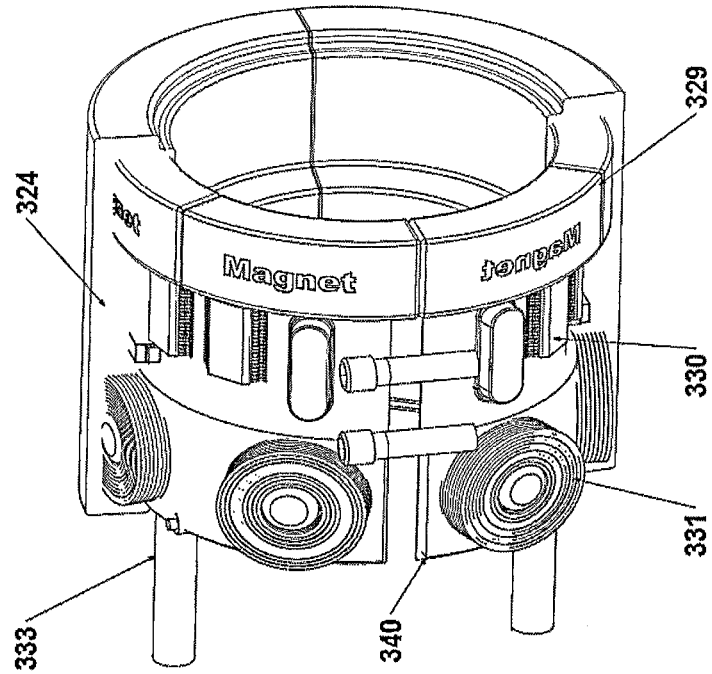
FIG. 75D is a partial assembly view of a wheel sensor for use in an axle assembly as in FIG. 75.
Figure 75C:
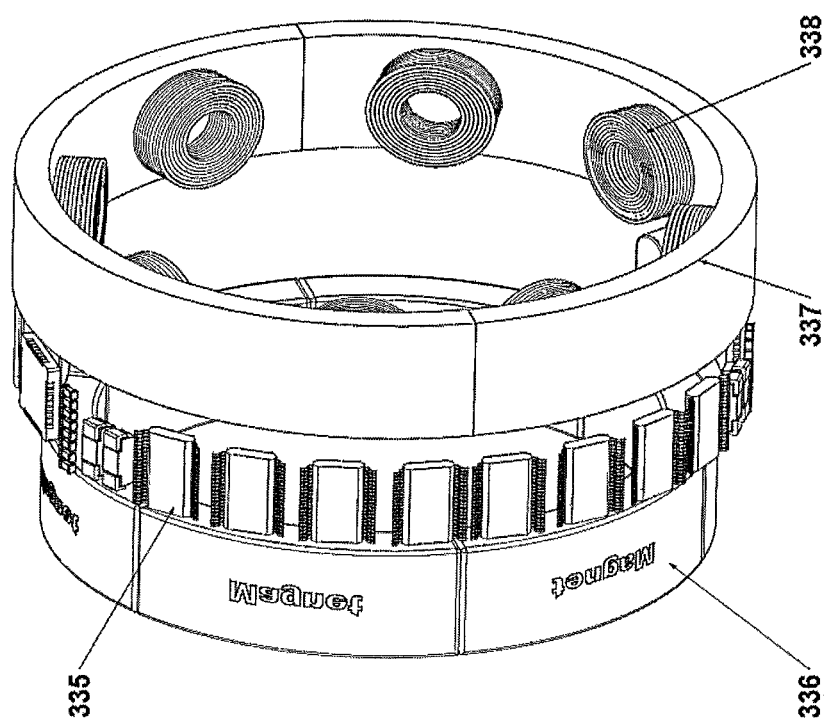
FIG. 75C is a partial assembly view of a wheel sensor for use in an axle assembly as in FIG. 75.

FIGS. 75-78 illustrate embodiments of a wheel sensor particularly well adapted for use with the components described herein. In the embodiments of FIGS. 75-75D, a bicycle wheel sensor consists of two modular wheel generators, one of which is stationary on the hub collet 5 and the other being in the rotating hub body 8. The axle generator 337 is an encapsulated control sensor and power generator circuit molded into two half sections shaped to fit to the hub collet 5 and locked together with cap screws 328. The rotating outer hub sensor 324 is also a two-part encapsulated and molded component that fits precisely inside the hub body 8. The hub collet 5 is the central connecting axis interlocking with frame axle assembly 283 and the drive axle assembly 286. The stationary axle generator 337 includes an electronic control circuit 330, a flexible electronic circuit board 332, excitation coils 331 and a magnet array 329 are all encapsulated in a modular molded resin container 334.

The rotating hub sensor resin container 324 encapsulates an electronic control circuit board 335, including a power generator control, excitation coils 338 and a magnet array 329, which may be a series of twelve neodymium magnets.

A magnetic field created by rotating magnets 336 in the hub sensor encapsulation assembly 324 creates electrical current as it rotates around the stationary excitation coils 331 and induces electric current through the excitation coils 338. This electrical current is rectified and regulated and generates power for the control circuit 330. An insulated power pin embedded in the hub collet flange carries signal and power from the hub sensor 324 to the outside world. When the interlocking, bayonet connection between the hub collet 5 and frame axle assembly 283 is made the electrical connectivity can be applied to external peripheral devices.

A strain gauge 327 is incorporated into the connection between the hub body 8 and the spoke mount 14. The strain gauge 327 has an internal and external decagon flange with electrical spring connection pins 346 that receive electrical power and analog signals through insulated connection pins 342. Strain gauge signal, electrical power and analog control is conveyed through the bearing collet 9 via these insulated electrical and signal conductors 342. The outer strain gauge 327 and the bearing collet 9 flanges both dovetail into the spoke mount 14. An analog control signal from the strain gauge 327 is processed by the control system in the wheel hub.

Both control sensors 330 and 335 include flexible electronic circuit boards, electronic circuitry, rectifier, filter, pulse detector, microprocessor, accelerometer, communication system, communications interface, communication-hub, and antenna. The inner and outer sensor control systems 330 and 335 utilizes firmware, software and a unique communications protocol to connect peripheral devices on the bicycle, wheel hub, smartphone, or any other peripheral devices. Due to the rotational environment of the hub, this communications protocol must contend with consistent communication interruption due to the shadowing of the antenna, the polarization changes and Doppler shifts. The protocol is optimized for short data bursts in a harsh environment.

The system is compatible with Bluetooth, Wi-Fi, and 4G data transmission and communicates autonomously with smartphone and other GPS front end devices via apps, communication protocols and display subsystem data formats. The system uses a data network communications protocol or set of instructions between all sensory devices on a bicycle. Each device on the network communicates on a wired or wireless network using the firmware communication language between the bicycle wheel, bicycles sensors, bicycle, smart phone systems and other peripheral front end devices. The system may also communicate with a smartphone and the communication and display subsystem. For compatibility of applications, the Bluetooth communications to a smartphone uses the same communications protocol as the hub sensor system. The communications to the communications and display subsystem uses a data format that is efficient and extensible.

Figure 76:
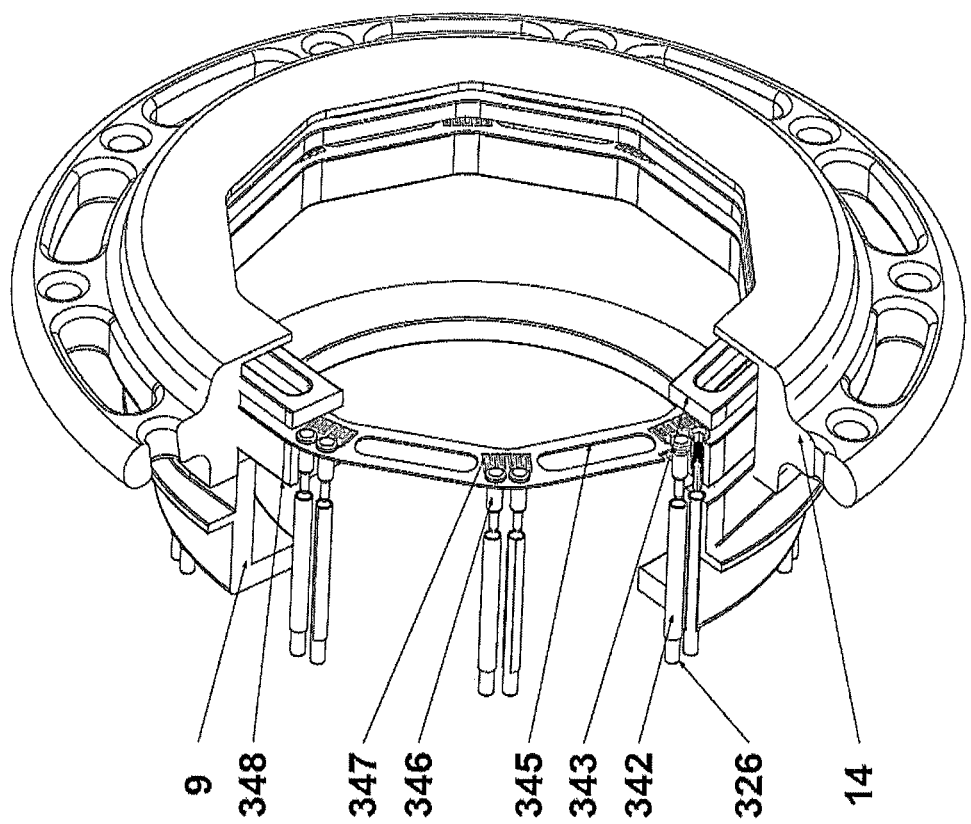
Figure 76A:
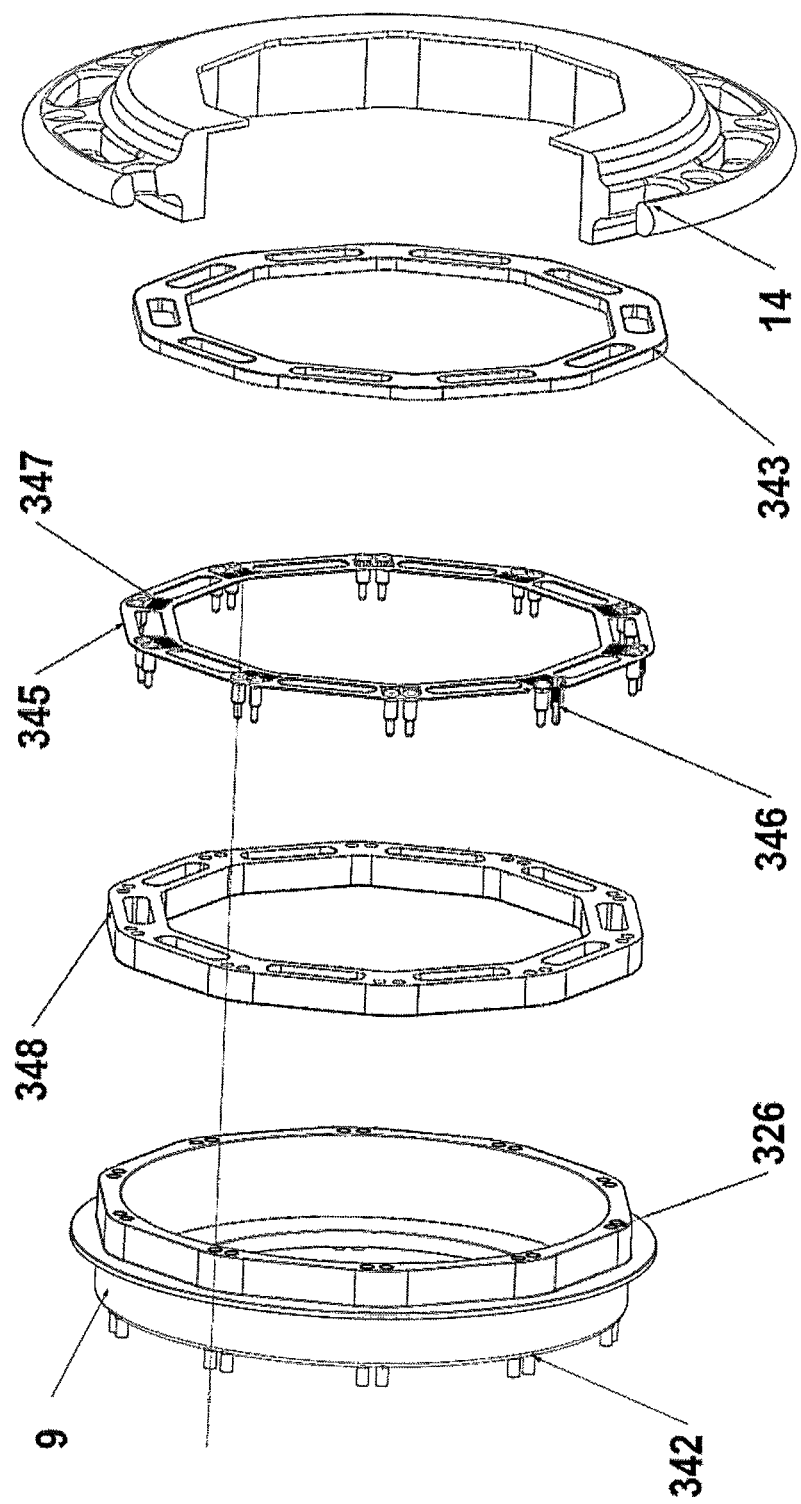
Figure 76B:
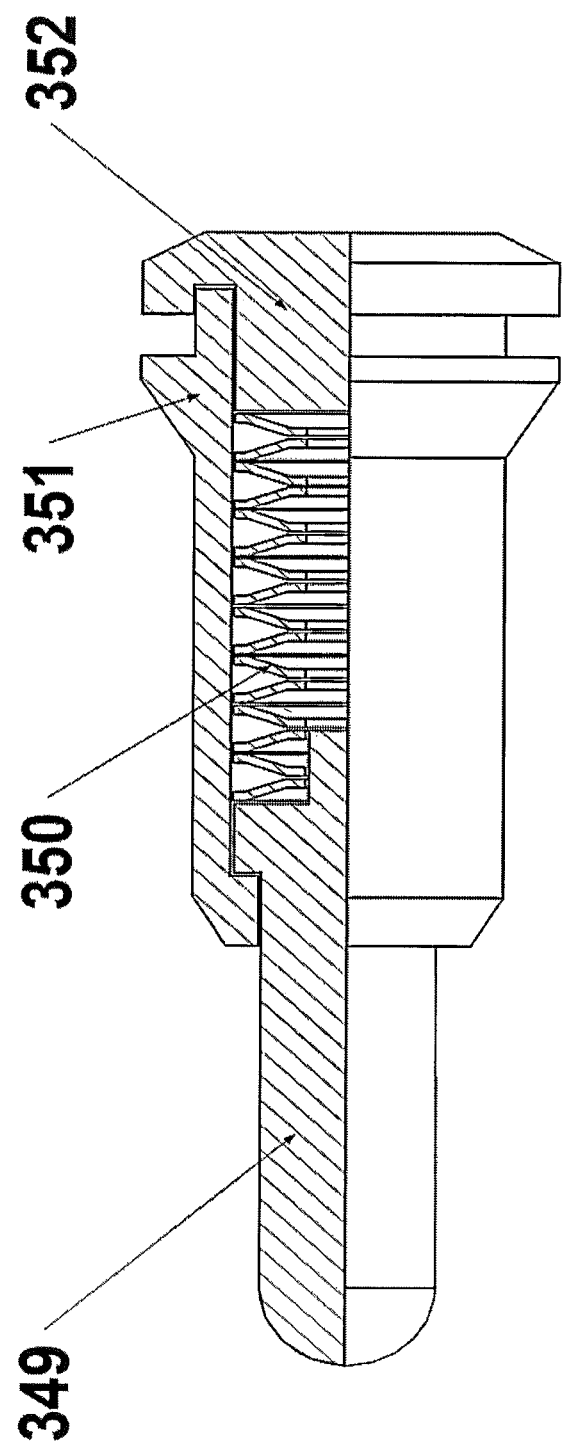

In another embodiment illustrated in FIGS. 76-76B, the strain gauge 327 is a modular laminated parallel decagon flanged multi-input rotary strain gauge for single spoke mount 14 applications. At each corner of the strain gauge substrate 345 a parallel decagon flange is a screen printed Wheatstone bridge circuit printed onto a ceramic gauge substrate 345. Conducting spring pins 347 electrically connect the strain gauge sensing circuit to the microprocessor. These pins connect the strain gauge 345 to the microprocessor in the hub sensor and pass through insulated holes in the strain gauge body 348. The strain gauge body 348 is a stainless steel decagon inner and outer flange 348 with a slot machined at the centerline and parallel to the edge. At the junction corner adjacent slot are calculated so that the space between them is sufficient to accommodate rotary torque deflection which is converted to an analog signal by the Wheatstone bridge and delivered to the microprocessor through the spring pins 346.

The ceramic substrate 345 profiles is identical to the strain gauge body and the spring pins pass through corresponding holes and both components are easily bonded to make a solid body component. Spring pin 346 assembly has a hollow body 351, and PC board mounting step flange at its base and an internal retaining flange on the other end. Connection pin 349 has a rounded connection tip on one end and an external retaining flange at the opposite end. The shoulder of the connection pin 349 slides through the hole at the end hollow body 351 and outer retaining flange slides inside the hollow body and has a tension spring to hold it at full extension.

When the pin 349, hollow body 351, and the spring 350 are assembled and pressed into the ceramic substrate 345, a locking rivet 352 is crimped into the ceramic substrate 345 and the assembly becomes an electrically connected male connection between the strain gauge and bearing collet 9. Bearing collet 9 has insulated conduction rods 326 which are solid bonded so that the male spring contact 346 makes electrical connection when strain assembly 327 and bearing collet 9 are connected.

The shoulder of the rivet interlocks 352 is protected by cap 343, which is bonded to the ceramic substrate 345 for the purposes of protection and installation. Each electrical spring contact 346 is insulated and counter-bored into both the strain gauge body 348 and protected by cap 343. The strain gauge assembly 327 uses multiple input signals complex quadrant calculations and redundancy.

Bearing collet 9 has two insulated holes bored through the corresponding flange to accommodate insulated conductor pins 326 (see FIG. 75) corresponding to the pins on the strain gauge spring pins 346. Once assembled the hub mount flange 14 locks strain gauge 327 bearing collet 9 captive in the hub mount 14 and enables the strain gauge 327 to interconnect with the free wheel hub 286 flange. The outer flange of the strain gauge 327 which is mechanically locked to the drive mount flange 14 transfers drive and rotary torque from the freewheel hub 286 allowing the strain gauge to deliver an analog to digital control signal.

All torque sensors are strain gauge based measuring instruments whose output voltage is proportional to applied torque. The output voltage is produced by a resistance change in strain gauges that are bonded to the torque sensor structure. The magnitude of the resistance change is proportional to the deformation of the torque sensor and therefore the applied torque. The four-arm Wheatstone bridge configuration depicts the strain gage geometry used in the torque sensor structures. It is this configuration that allows for temperature compensation and cancellation of signals caused by forces not directly applied about the axis of the applied torque. The strain gage is customized for part of loads a regulated 5 to 20 volt DC or AC RMS excitation is required and is applied between points A and D of the Wheatstone bridge. When torque is applied to the transducer structure the Wheatstone bridge becomes unbalanced, thereby causing an output voltage between points B and C. This voltage is proportional to the applied torque. The microprocessor orchestrates communication, pulse detection, voltage regulation and manages metrics and instructions governing interconnectivity between bike communication protocols.

Figure 77:
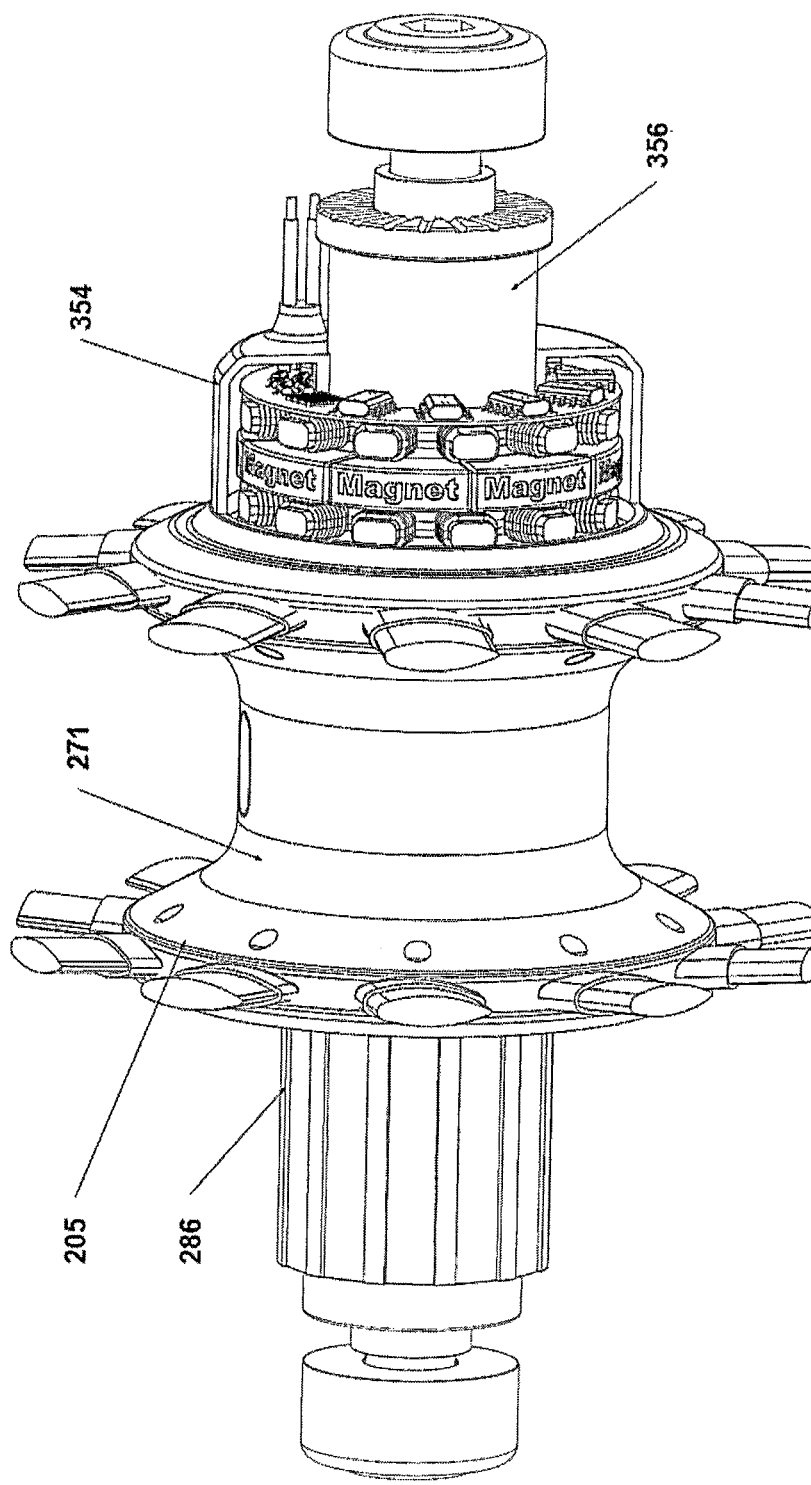
Figure 77A:
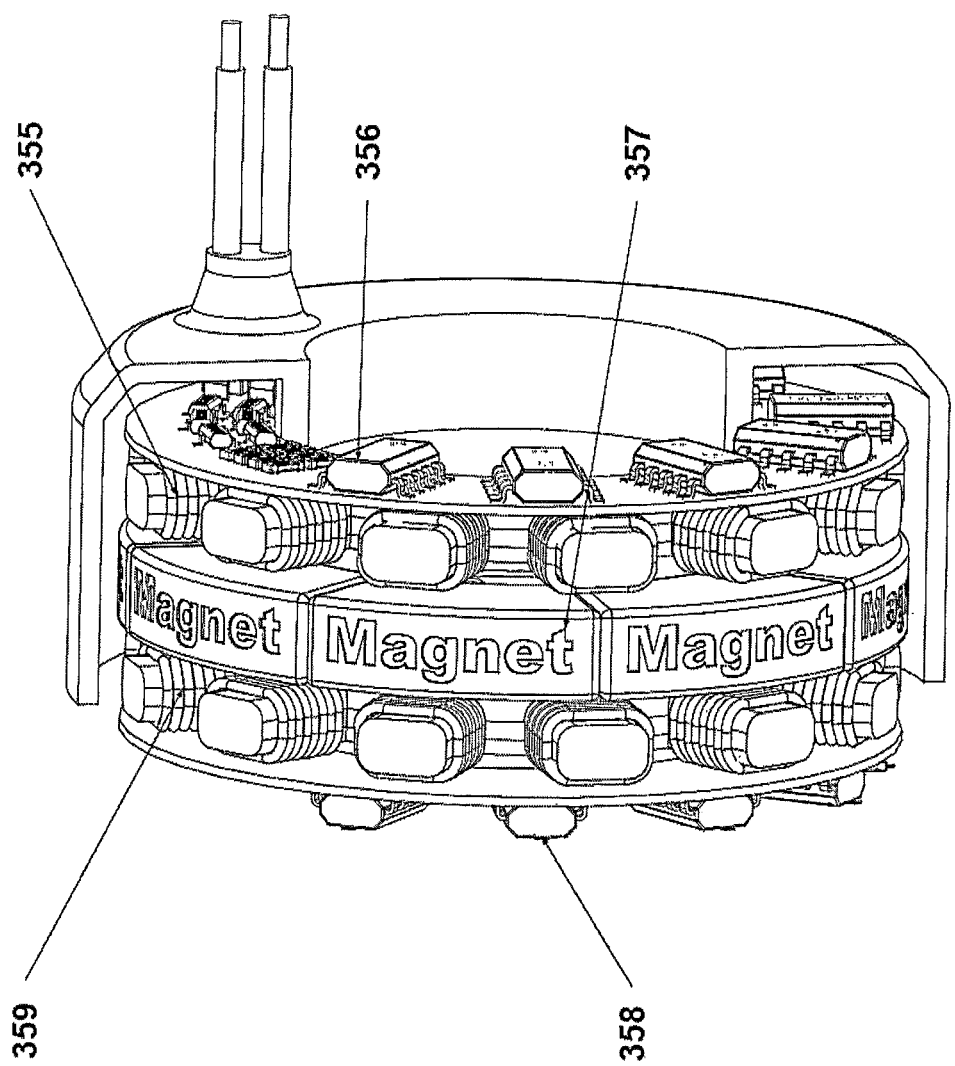

In FIGS. 77 and 77A, the bicycle wheel sensor consists of two modular wheel generators using the same electronic circuit described in FIG. 75. The sensor is powered electrically in the same manner but applied in a different physical configuration specifically in a side axle mounting application. The power sensor housing 354 includes encapsulated sensor systems 358 and 355 mounted in a housing which is fixed to the stationary axle 356. Fixed magnet array 357 is locked to the rotation of the hub mount 205. Wheel rotation provides excitation current as the magnetic poles rotate past parallel wound excitation coils 359 and 355 on both sides.

Figure 78:
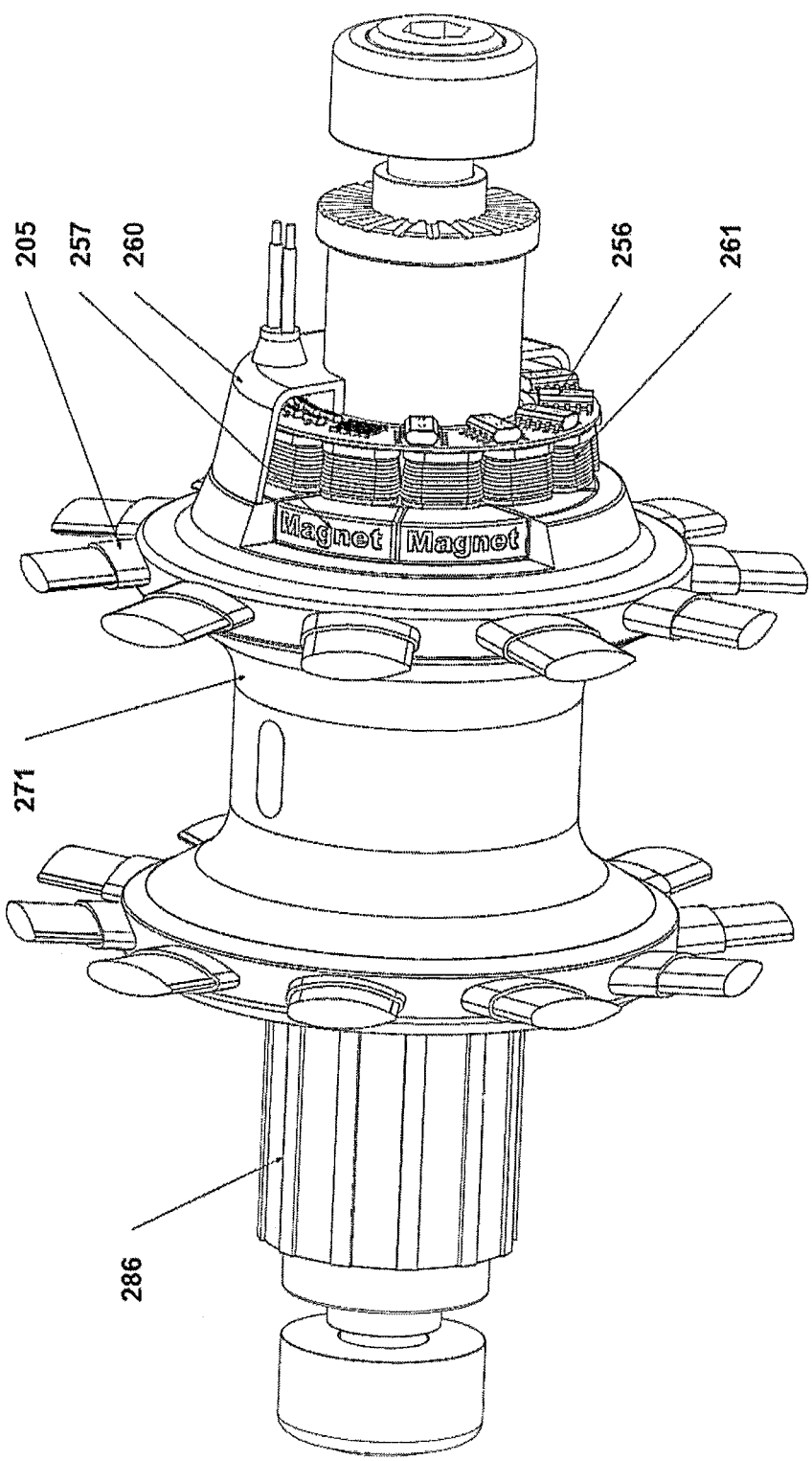
Figure 78A:
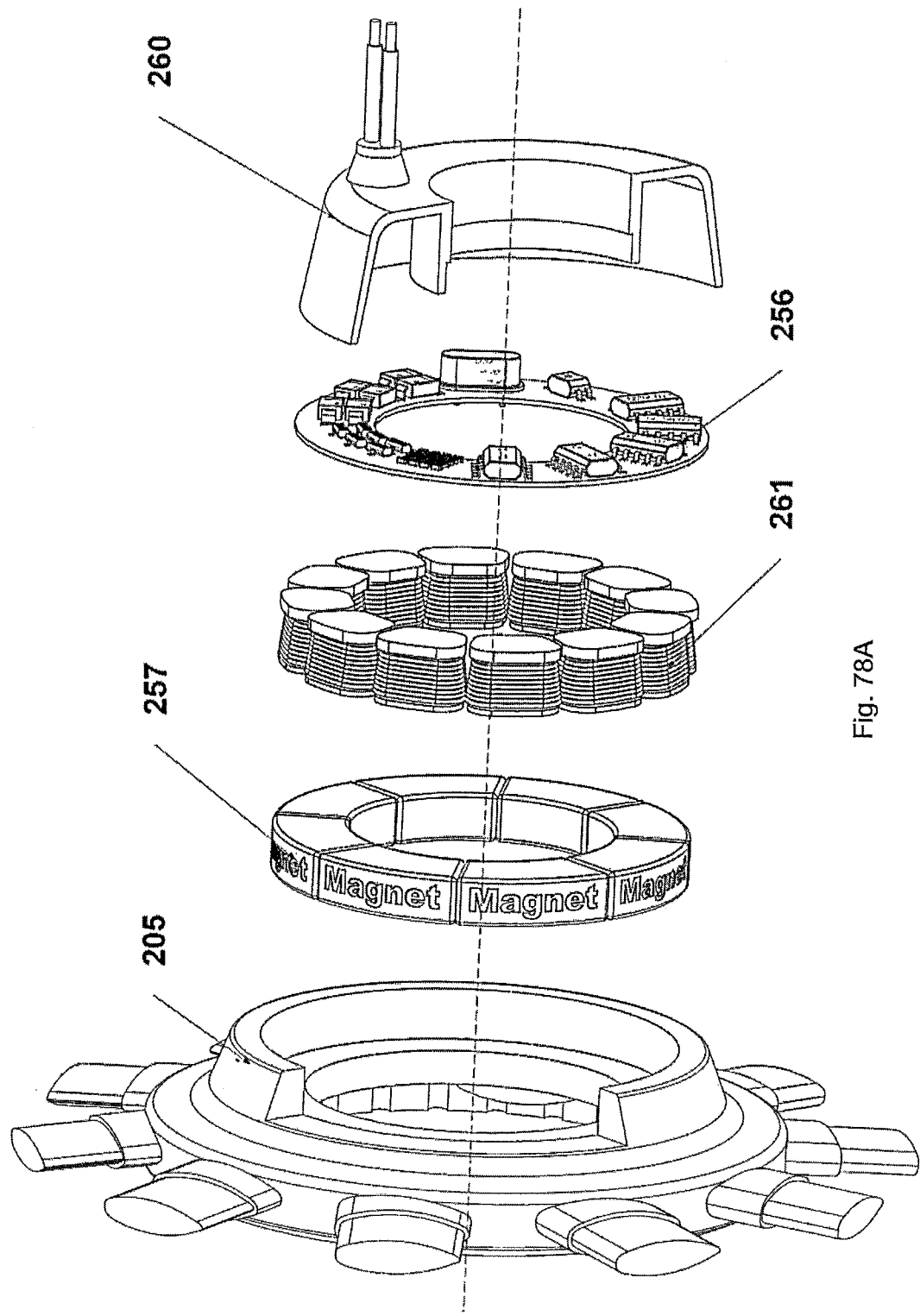
Figure 79:
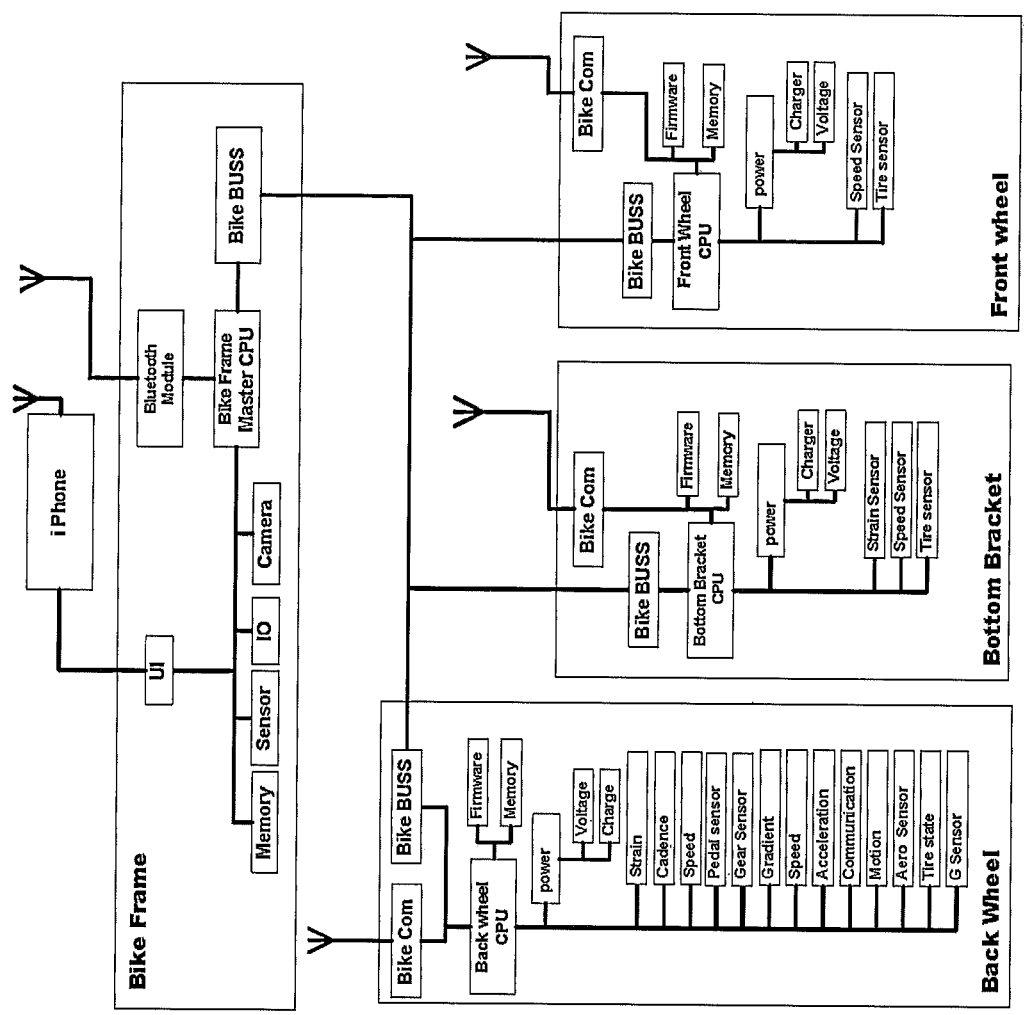
Figure 80:
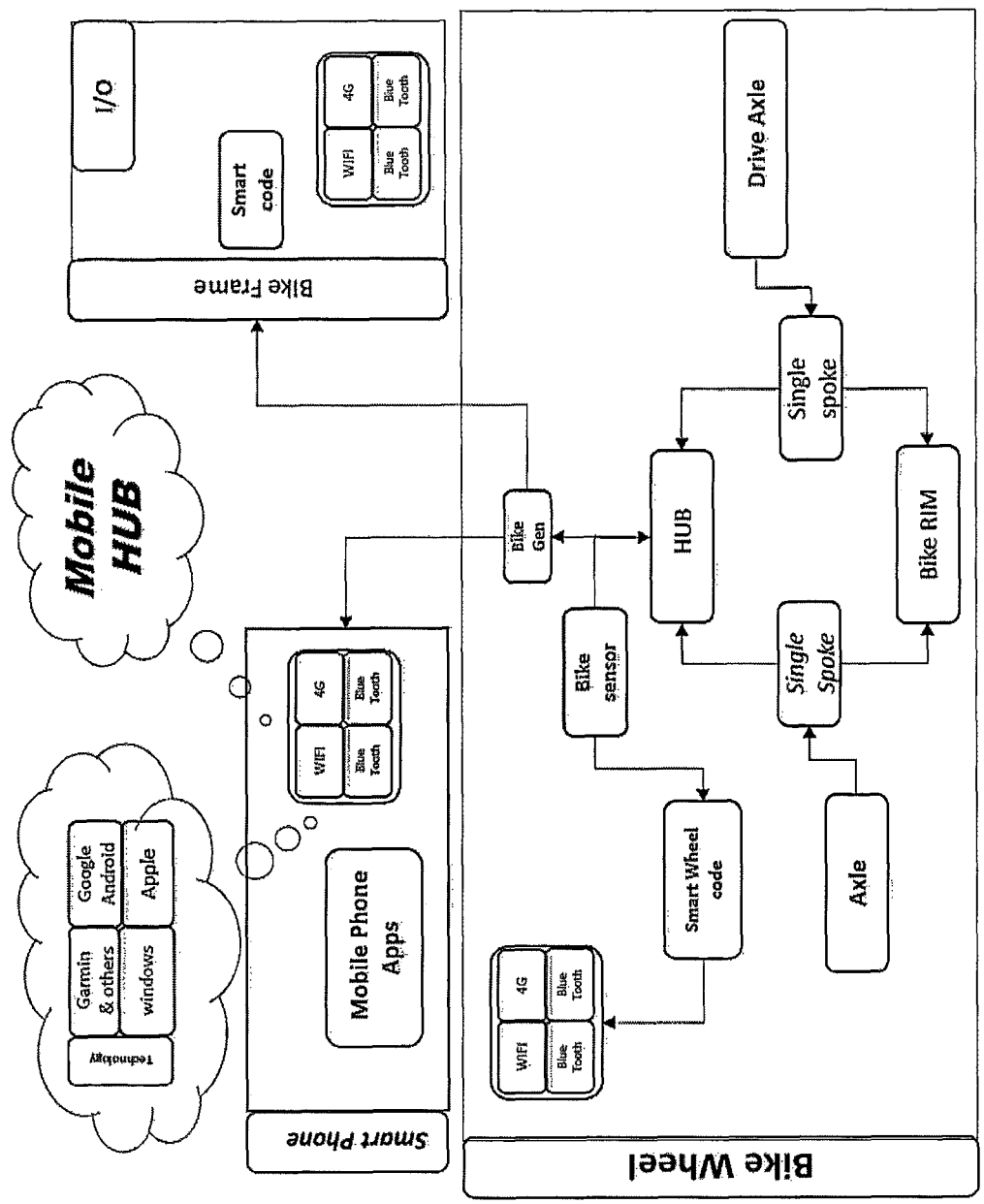

In another alternative embodiment is illustrated in FIGS. 78 and 78A, the wheel sensor control system 260 mounted on a stationary frame axle and the encapsulated sensor control circuit 256 and perpendicular wound excitation coils are encapsulated in resin and contained in the housing 260. The sensor 260 is powered electrically in the same manner but applied in a different physical configuration as described in previous embodiments but is applied specifically in a side axle mounting applications. The magnet array 257 is embedded and rotation locked to hub flange 205. A magnetic field derived by wheel rotation provides excitation current in the excitation coils 261. The excitation current is rectified and regulated to provide voltage and signal pulse feedback for the control circuit. The control and communications are described in other embodiments. The block diagram lays out the architecture which is made up of an electronic microprocessor control and power generator encapsulated in molded resin containment.

The rotary strain gauge is coupled to the hub network and bike microprocessor. Drive torque from a free wheel ratchet flange transmits through the rotary strain gauge and single spoke mount. A microprocessor is embedded in the bike frame to communicate with the hub. This microprocessor relays information to a remote communications/display subsystem and may optionally send information to a smartphone on the bike. The generator system described above provides power for operation of the microprocessor and smartphone connectivity enabling local remote communications/display subsystem located nearby or optionally in following vehicles.

The microprocessor wirelessly communicates with the hub via a dedicated communications system enabling multiple wheel identity, interchangeability or data recognition. Individual wheel data uploads or downloads automatically update through the system. The microprocessor provides communications relay data display updates to subsystem mantras all metrics of the bike and rider performance. The microprocessor is also synchronized and includes additional sensors including, but not limited to, GPS, accelerometers, and temperature sensors.

The microprocessor is a modular encapsulated electronic systems hardware including voltage regulation, pulse detection, rectifiers and filters, voltage regulators, systems interface, network, memory storage, and embedded communications firmware which orchestrates communication, and manages metrics and instructions governing interconnectivity between communication protocols.

Systems interface describes the onboard systems and function library that determine the communications protocol. Firmware is retained in a separate non-volatile memory chip and data upload and download can be performed by the memory. Both these functions are controlled by the microprocessor. The power sensing and regulation is also performed through a separate power management chip that orchestrates battery charging and voltage supply. An onboard gyroscopic accelerometer chip manages a range of GPS, speed, gradient, acceleration, motion, aerodynamic sensors, cadence, tire and G sensing functions. Firmware and memory chips can be upgradeable and interchangeable solid-state socket mounted hardware devices. Analog to digital input/output provides expandability. The microprocessor wirelessly networks and share systems interface functionality.

The arrangement of the hub embodiments described herein is particularly well suited for combination with a self-powered wheel sensor system. The system includes a molded modular self-powered electronic controller and communication system and electrical voltage generator designed as an add-on or permanent element of the hub system. The sensor electronics measure various aspects of the bike including torque, velocity, acceleration, gradient, cadence and other digital metrics and convert electrical signals into transmittable digital data protocol.

The system may also include a rotating voltage and signal generator that uses a neodymium magnet array and excitation coils to generate AC voltage, electronically modified digital signal pulses, internal and external DC electronic circuit and cell phone voltage supply and battery charging capability. The system may be configured to extract phase shift excitation currents to create a square wave signal generator. The system may further include an onboard microprocessor and communication system for wheel modules or a smartphone using proprietary digital data protocol communications protocol optimized for the rotational environment of the hub. The system may also utilize an onboard communication and frequency based communication protocol. The system may also include an accelerometer and gyroscopic sensor and GPS device embedded in the wheel for providing geosynchronous data for programming.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What is claimed is:

1. A bicycle wheel system for a bicycle having a frame and a gear set, comprising:
    a hub assembly, said hub assembly further comprising:
        a body;
        a collet rotatably housed within said hub body and wherein said body and collet have a common axis;
        a first hub mating member connected with one end of said collet;
        a second hub mating member connected with an opposite end of said collet; and
        wherein each of said first and said second hub mating members are provided with one of a first surface pattern or a receptacle having a first engagement member; and
        a first torque transfer flange at a first end of said body and a second torque transfer flange at a second end of said body;
    a first axle assembly, said first axle assembly further comprising:
        a first axle mountable to said frame of said bicycle;
        one of a second surface pattern or a second engagement member, said second surface pattern corresponding to and operable for selective locking engagement with said first engagement member and said second engagement member corresponding to, and being operable for selective locking engagement with said first surface pattern; and
    a third torque transfer flange;
    a second axle assembly, said second axle assembly further comprising:
        a second axle mountable to said frame of said bicycle;
        one of said second surface pattern or said second engagement member, said second surface pattern corresponding to and operable for selective locking engagement with said first engagement member and said second engagement member corresponding to and being operable for selective locking engagement with said first surface pattern;
        a gear collet operable for connection with said gear set of said bicycle;
        a ratchet gear drive operable for selective connection with said gear collet, said ratchet gear having a fourth torque transfer flange;
        a locking release mechanism operable to release engagement of said second surface pattern with said first engagement member and said second engagement member with said first surface pattern;
    first and second single spoke flange assemblies, each of said single spoke flange assemblies further comprising a spoke mount, said spoke mount having on one side a first surface corresponding to and operable for mating engagement with said first or second torque transfer flanges and having on an opposite side a second surface corresponding to and operable for mating engagement with said third or fourth torque transfer flanges.

2. The bicycle wheel system of claim 1, wherein said locking release mechanism further comprises:
    a hub lock anchor having a shoulder and a first spring into which said hub lock anchor is inserted such that said shoulder engages said spring, said hub lock anchor inserted into said collet, with said first spring between said hub lock anchor and said collet, said hub lock anchor being connected with said first hub mating member, said first spring permitting lateral movement of said collet along said hub lock anchor relative to said first hub mating member;
    said first hub mating member provided with said first surface pattern;
    said second hub mating member provided with said first engagement member and being connected to said collet, said first engagement member comprising a first cylindrical receptacle having at least one spring-loaded member in a wall thereof for engagement with said second surface pattern;
    said first axle provided with said second engagement member, said second engagement member comprising a second cylindrical receptacle with at least one fixed member in a wall thereof for engagement with said first surface pattern; and a second spring acting on said second engagement member to bias said second engagement member toward said hub assembly.

3. The bicycle wheel system of claim 1, wherein said ratchet gear drive further comprises:
a ratchet drive mount having a plurality of sockets around a perimeter thereof and further having said fourth torque transfer flange at one end thereof;
a plurality of pawl fingers pivotally mounted within said sockets; and
a magnetized ratchet gear having a gear profile on a surface thereof, said magnetized ratchet gear having an outer profile that corresponds to and drivingly engages an inner profile of said gear collet, said magnetized ratchet gear operable to draw said pawl fingers into position to engage said gear profile, said gear profile including teeth that each have an edge for positive engagement with one of said pawl fingers during rotation of said ratchet gear drive in one direction and a sloped surface to allow said teeth to slide by said pawl fingers during rotation of said ratchet gear drive in an opposite direction.

4. The bicycle wheel system of claim 3, wherein said pawl fingers are oriented parallel to said axis.

5. The bicycle wheel system of claim 3, wherein said pawl fingers are oriented perpendicularly to said axis.

6. The bicycle wheel system of claim 1, wherein said ratchet gear drive further comprises:
a ratchet drive mount having a plurality of gear teeth arranged on a perimeter of a first face of said ratchet drive mount and further having said fourth torque transfer flange at one end thereof opposite said first face; and
a ratchet gear having a plurality of gear teeth on a first face thereof, said first face of said ratchet gear being oriented to face said first face of said ratchet drive mount, said ratchet gear having an outer profile that corresponds to and drivingly engages an inner profile of said gear collet, said gear teeth of said ratchet drive mount and said ratchet gear having a matching gear profile with teeth that each have an edge for positive engagement with a corresponding part of a tooth on the other of the ratchet drive mount or ratchet gear during rotation of said ratchet gear drive in one direction and a sloped surface to allow said teeth to slide over each other during rotation of said ratchet gear drive in an opposite direction.

7. The bicycle wheel system of claim 1, wherein said locking release mechanism further comprises:
a spring loaded actuator arranged in said body and selectively engageable with said collet to prevent rotation of said collet relative to said body;
said first hub mating member provided with said first surface pattern, said first surface pattern comprising a first screw thread;
said second hub mating member provided with said first engagement member, said first engagement member comprising a first cylindrical receptacle having a second screw thread on an interior wall thereof;
said first axle provided with said second engagement member, said second engagement member comprising a second cylindrical receptacle having said first screw thread on an interior wall thereof for engagement with said first hub mating member;
said second axle provided with said second surface pattern, said second surface pattern comprising a second screw thread for engagement with said second hub mating member; and
wherein engagement of said spring loaded actuator and manual rotation of said hub engages said first axle with said first hub mating member and said second axle with said second hub mating member.

8. The bicycle wheel system of claim 1, wherein said locking release mechanism further comprises:
a spring loaded actuator arranged in said body and selectively engageable with said collet to prevent rotation of said collet relative to said body;
said first hub mating member provided with said first surface pattern;
said second hub mating member provided with said first surface pattern;
said first axle provided with said second engagement member, said second engagement member comprising a first cylindrical receptacle having at least one spring-loaded member in a wall thereof for engagement with said first surface pattern;
said second axle provided with said second engagement member, said second engagement member comprising a second cylindrical receptacle with at least one fixed member in a wall thereof for engagement with said first surface pattern; and
wherein engagement of said spring loaded actuator and manual rotation of said hub engages said first axle with said first hub mating member and said second axle with said second hub mating member.

9. The bicycle wheel system of claim 1, further comprising a single spoke flange assembly comprising:
a first spoke mount drivingly engaging said first torque transfer flange on one side of the said first spoke mount and drivingly engaging said third torque transfer flange on said opposite side of said first spoke mount;
a second spoke mount drivingly engaging said second torque transfer flange on one side of the said first spoke mount and drivingly engaging said fourth torque transfer flange on said opposite side of said first spoke mount, and wherein said first and second spoke mounts are driven together with said first, second, third, and fourth torque transfer flanges; and
at least one spoke connect connected to said spoke mount and operable for securing one or more spokes to said spoke mount.

10. The bicycle wheel system of claim 9, wherein said spoke connect is integrally formed with said spoke mount.

11. The bicycle wheel system of claim 9, wherein said spoke connect is separately formed from said spoke mount and is connected to said spoke mount.

12. The bicycle wheel system of claim 11, further comprising an anchor pin connecting said spoke connect with said spoke mount.

13. The bicycle wheel system of claim 9, further comprising a rim and a plurality of rim connects connected to said rim, each of said rim connects operable for connecting a spoke with said rim.

14. The bicycle wheel system of claim 13, wherein said rim comprises first and second rim bodies, said first and second rim bodies being mirror images of one another and adhered together to form said rim.

15. The bicycle wheel system of claim 1, further comprising:
an axle generator connected with said collet; said axle generator further comprising:
a microprocessor; and
at least one excitation coil;
a rotating sensor connected and rotating with said body during movement of said bicycle wheel, said rotating sensor further comprising a magnet array; and wherein said rotating sensor and said axle generator are coaxial with one another and wherein rotation of said rotating sensor around said axle generator results in a magnetic field being created by said magnet array and inducing an electric current in said excitation coils for powering said microprocessor.

16. The bicycle wheel system of claim 15, further comprising:
at least a first spoke mount drivingly engaging one of said first torque transfer flange or said second torque transfer flange on one side of the said first spoke mount and drivingly engaging one of said third torque transfer flange or said fourth torque transfer flange on said opposite side of said first spoke mount; and
a strain gauge incorporated into and rotating with one of said first spoke mount, said first torque transfer flange, said second torque transfer flange, said third torque transfer flange, or said fourth torque transfer flange and being in electrical communication with said rotating sensor.

17. The bicycle wheel system of claim 1, wherein said first and second surface patterns comprise at least one groove.

18. The bicycle wheel system of claim 9, wherein said spoke connect is integrally formed with a spoke operable for connection to said spoke mount.

19. The bicycle wheel system of claim 13, wherein said rim comprises a plurality of recesses around an interior perimeter of said rim, said recesses provided with a shape corresponding to said rim connects and operable for accepting said rim connects within said recesses.

* * * * *